United States Patent
Saitoh

(10) Patent No.: US 8,707,814 B2
(45) Date of Patent: Apr. 29, 2014

(54) SHIFT MECHANISM, AND VEHICLE EQUIPPED THEREWITH

(71) Applicant: Yamaha Hatsudoki Kabushiki Kaisha, Iwata (JP)

(72) Inventor: Tetsushi Saitoh, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/756,797

(22) Filed: Feb. 1, 2013

(65) Prior Publication Data

US 2013/0139627 A1 Jun. 6, 2013

Related U.S. Application Data

(63) Continuation of application No. 12/609,591, filed on Oct. 30, 2009, now abandoned.

(30) Foreign Application Priority Data

| Oct. 30, 2008 | (JP) | 2008-280586 |
| Oct. 30, 2008 | (JP) | 2008-280587 |
| Oct. 30, 2008 | (JP) | 2008-280588 |
| Dec. 26, 2008 | (JP) | 2008-335062 |

(51) Int. Cl.
*F16H 59/00* (2006.01)
*F16H 61/00* (2006.01)
*F16H 63/00* (2006.01)

(52) U.S. Cl.
USPC ...... 74/337.5; 74/335; 74/473.36; 74/473.37; 180/230

(58) Field of Classification Search
USPC ............. 74/337.5, 339, 371, 473.1, 473.21, 74/473.24, 473.36, 473.37, 335; 474/80; 180/230
See application file for complete search history.

(56) References Cited

U.S. PATENT DOCUMENTS

| 5,724,856 | A | * | 3/1998 | Back | 74/335 |
| 6,315,096 | B1 | * | 11/2001 | Dairokuno et al. | 192/35 |
| 6,439,362 | B2 | * | 8/2002 | Reik et al. | 192/3.56 |
| 7,418,883 | B2 | * | 9/2008 | Hara | 74/325 |
| 7,717,007 | B2 | * | 5/2010 | Hiroi et al. | 74/335 |
| 7,841,254 | B2 | * | 11/2010 | Ho | 74/337.5 |
| 2007/0074594 | A1 | * | 4/2007 | Mizuno et al. | 74/337.5 |
| 2007/0240963 | A1 | * | 10/2007 | Kosugi | 192/30 W |
| 2010/0107792 | A1 | * | 5/2010 | Saitoh | 74/337.5 |

OTHER PUBLICATIONS

Saitoh, "Shift Mechanism, and Vehicle Equipped Therewith," U.S. Appl. No. 12/609,591, filed Oct. 30, 2009.

* cited by examiner

*Primary Examiner* — Troy Chambers
*Assistant Examiner* — Alexander Vu
(74) *Attorney, Agent, or Firm* — Keating & Bennett, LLP

(57) ABSTRACT

A shift mechanism that provides a shift mechanism for enabling smooth gear shifting by a transmission, and a vehicle equipped therewith. With this mechanism, a shift drum, to which shift forks are connected via grooves on an outer periphery, is held every predetermined rotation angle. When differences are produced in the degree of rotation between a third rotating member that rotates by motor rotation and a second rotating member that rotates in accordance with the third rotating member, bias is accumulated in a torsion spring. Bias that is accumulated is released when the rotation angle of the third rotating member equals or exceeds a predetermined angle of rotation, rotating a first rotating member via a second rotating member, and rotating the shift drum quickly.

13 Claims, 55 Drawing Sheets

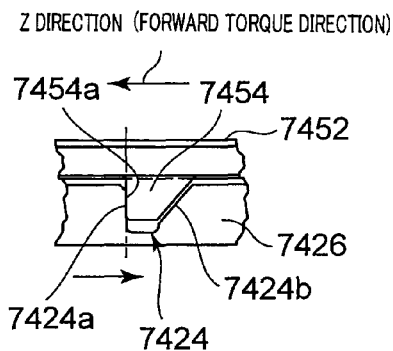 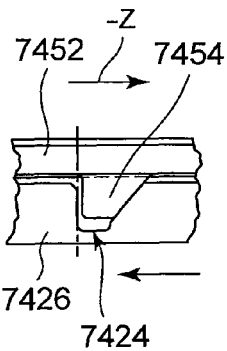 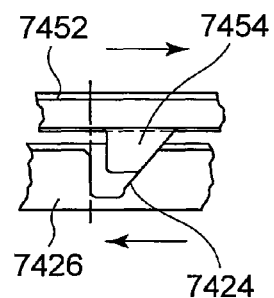
FIG.12A          FIG.12B          FIG.12C
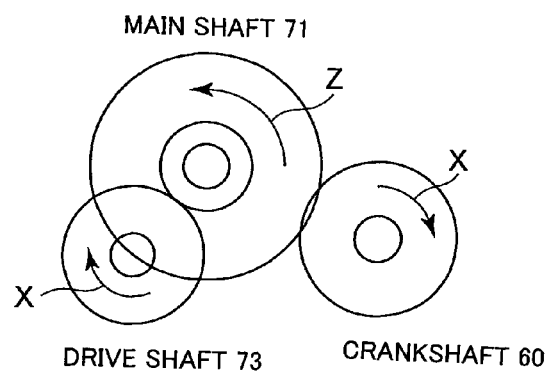
FIG.13

| CORRESPONDING DRAWING | GEAR POSITION | STANDARD STATE | FIRST CLUTCH | SECOND CLUTCH | SHIFT CAM | ODD-NUMBERED GEAR | EVEN-NUMBERED GEAR |
|---|---|---|---|---|---|---|---|
| (FIG. 2) | N | ○ | ○ | ○ | STOPPED | N | N |
| | N | | × | ○ | STOPPED | N | N |
| | N⇔1ST GEAR | | × | ○ | 30° ROTATION | N⇔1 | N |
| | 1ST GEAR | | × | ○ | STOPPED | 1 | N |
| | 1ST GEAR | | △ | ○ | STOPPED | 1 | N |
| FIG. 23 | 1ST GEAR | ○ | ○ | ○ | STOPPED | 1 | N |
| | 1ST GEAR | | ○ | × | STOPPED | 1 | N |
| | 1ST GEAR | | ○ | × | 30° ROTATION | 1 | N⇔2 |
| | 1ST GEAR | | ○ | × | STOPPED | 1 | 2 |
| | 1ST GEAR⇔2ND GEAR | | △ | △ | STOPPED | 1 | 2 |
| | 2ND GEAR | | × | ○ | STOPPED | 1 | 2 |
| | 2ND GEAR | | × | ○ | 30° ROTATION | 1⇔N | 2 |
| | 2ND GEAR | | × | ○ | STOPPED | N | 2 |
| FIG. 16 | 2ND GEAR | ○ | ○ | ○ | STOPPED | N | 2 |
| FIG. 17 | 2ND GEAR | | × | ○ | STOPPED | N | 2 |
| | 2ND GEAR | | × | ○ | 30° ROTATION | N⇔3 | 2 |
| FIG. 18 | 2ND GEAR | | × | ○ | STOPPED | 3 | 2 |
| FIG. 19 | 2ND GEAR⇔3RD GEAR | | △ | △ | STOPPED | 3 | 2 |
| FIG. 20 | 3RD GEAR | | ○ | × | STOPPED | 3 | 2 |
| | 3RD GEAR | | ○ | × | 30° ROTATION | 3 | 2⇔N |
| FIG. 21 | 3RD GEAR | | ○ | × | STOPPED | 3 | N |
| FIG. 22 | 3RD GEAR | ○ | ○ | ○ | STOPPED | 3 | N |
| | 3RD GEAR | | ○ | × | STOPPED | 3 | N |
| | 3RD GEAR | | ○ | × | 30° ROTATION | 3 | N⇔4 |
| | 3RD GEAR | | ○ | × | STOPPED | 3 | 4 |
| | 3RD GEAR⇔4TH GEAR | | △ | △ | STOPPED | 3 | 4 |
| | 4TH GEAR | | × | ○ | STOPPED | 3 | 4 |
| | 4TH GEAR | | × | ○ | 30° ROTATION | 3⇔N | 4 |
| | 4TH GEAR | | × | ○ | STOPPED | N | 4 |
| FIG. 24 | 4TH GEAR | ○ | ○ | ○ | STOPPED | N | 4 |
| | 4TH GEAR | | × | ○ | STOPPED | N | 4 |
| | 4TH GEAR | | × | ○ | 30° ROTATION | N⇔5 | 4 |
| | 4TH GEAR | | × | ○ | STOPPED | 5 | 4 |
| | 4TH GEAR⇔5TH GEAR | | △ | △ | STOPPED | 5 | 4 |
| | 5TH GEAR | | ○ | × | STOPPED | 5 | 4 |
| | 5TH GEAR | | ○ | × | 30° ROTATION | 5 | 4⇔N |
| | 5TH GEAR | | ○ | × | STOPPED | 5 | N |
| FIG. 25 | 5TH GEAR | ○ | ○ | ○ | STOPPED | 5 | N |
| | 5TH GEAR | | ○ | × | STOPPED | 5 | N |
| | 5TH GEAR | | ○ | × | 30° ROTATION | 5 | N⇔6 |
| | 5TH GEAR | | ○ | × | STOPPED | 5 | 6 |
| (FIG. 3) | 5TH GEAR⇔6TH GEAR | | △ | △ | STOPPED | 5 | 6 |
| | 6TH GEAR | | × | ○ | STOPPED | 5 | 6 |
| | 6TH GEAR | | × | ○ | 30° ROTATION | 5⇔N | 6 |
| | 6TH GEAR | | × | ○ | STOPPED | N | 6 |
| FIG. 26 | 6TH GEAR | ○ | ○ | ○ | STOPPED | N | 6 |

FIG. 15

| GEAR POSITION | ODD-NUMBERED GEAR | EVEN-NUMBERED GEAR | STANDARD STATE |
|---|---|---|---|
| N | N | N | ○ |
| 1 | 1 | | ○ |
| 2 | N | 2 | ○ |
| 3 | 3 | N | ○ |
| 4 | N | 4 | ○ |
| 5 | 5 | N | ○ |
| 6 | N | 6 | ○ |

FIG.28

SHIFT MECHANISM, AND VEHICLE EQUIPPED THEREWITH

CROSS REFERENCE TO RELATED APPLICATIONS

This application is entitled to and claims the benefit of Japanese Patent Application No. 2008-280586, filed on Oct. 30, 2008, and Japanese Patent Application No. 2008-280587, filed on Oct. 30, 2008, Japanese Patent Application No. 2008-280588, filed on Oct. 30, 2008, and Japanese Patent Application No. 2008-335062, filed on Dec. 26, 2008, the disclosures of which including the specifications, drawings and abstracts are incorporated herein by reference in their entirety.

BACKGROUND OF THE INVENTION

1. Field of the Invention

The present invention relates to a shift mechanism and a vehicle or motorcycle equipped therewith. More particularly, the present invention relates to a shift mechanism used in a twin clutch transmission and a vehicle equipped therewith.

2. Description of the Related Art

Heretofore, a transmission has been known that is equipped with a plurality of clutches in order to make possible speedy transmission operations of an automobile (see Unexamined Japanese Patent Publication No. SHO58-124851, for example).

A vehicular multi-speed transmission of Unexamined Japanese Patent Publication No. SHO58-124851 is equipped with an input shaft by which a driving force of an engine is input, a first auxiliary shaft provided rotatably with respect to the input shaft, a second auxiliary shaft provided on the same axis line as the input shaft, a counter shaft provided parallel to the input shaft, an output shaft connected to the counter shaft, a first clutch provided between the input shaft and the first auxiliary shaft, and a second clutch provided between the input shaft and the second auxiliary shaft.

The input shaft that inputs and engine driving force is passed through the inside of the first auxiliary shaft and is connected to the second auxiliary shaft via the second clutch. With this vehicular multi-speed transmission, the first auxiliary shaft rotates through having the torque of the input shaft transferred by connection of the first clutch, and the second auxiliary shaft rotates through having the torque of the input shaft transferred by connection of the second clutch.

Furthermore, on the first auxiliary shaft and the counter shaft, a plurality of gear sets corresponding to odd-numbered gears that transfer power from the first auxiliary shaft to the counter shaft, are provided. On the second auxiliary shaft and the counter shaft, a plurality of gear sets corresponding to even-numbered gears that transfer power from the second auxiliary shaft to the counter shaft, are arranged. Transfer of power via these gear sets corresponding to odd-numbered and even-numbered gears is performed with switching of the first and second dog-clutch gear ratio switching units that are placed on the counter shafts so as to rotate integrally with the counter shafts and be able to slide on splines.

The first and second switching units are operated by actuators and so on according to the switching of connected and disconnected states of the first and second clutches, and switch the gear sets to transfer power to the counter shafts to gear sets corresponding to predetermined transmission gears.

Thus, with a conventional vehicular multi-speed transmission, torque of an input shaft is transferred to counter shafts at varying gear ratios, by alternately connecting and disconnecting the first and second clutches in accordance with the transmission operations of gear switches, without interrupting engine drive transfer. As a result of this structure and arrangement, it is possible to vary the rotation speed of the output shaft and enable transmission in the vehicular multi-speed transmission accordingly.

The first and second gear ratio switching units are generally operated by shift forks of a shift unit that is driven by an actuator, and, for the shift unit, there is, for example, the shift unit disclosed in Unexamined Japanese Patent Publication No. HEI7-139627.

With this shift unit, shift forks that engage with the first and second gear ratio switching units respectively at the front end are provided slidably on two fork axes that are parallel to an input shaft, first auxiliary shaft, second auxiliary shaft, and counter shaft. These shift forks are internally fitted in grooves, in a slidable fashion, provided in the outer periphery of a shift drum. By rotation of this shift drum, the shift forks move on the fork axis, and the first and second gear ratio switching units at the front end move accordingly on the counter shaft in the direction of splines, allowing gear shifting. When the first switching unit is in a neutral position, torque of the first auxiliary shaft is not transferred to the counter shaft. Likewise, when the second switching unit is in a neutral position, torque of the second auxiliary shaft is not transferred to the counter shaft.

Now, with a vehicular multi-speed transmission with a plurality of clutches such as the one disclosed in Unexamined Japanese Patent Publication No. SHO58-124851, every time the gear ratio changes one gear, the first and second gear ratio switching units move to a neutral position alternately.

Consequently, when one of the first and second gear ratio switching units and the gear of one of the first and second auxiliary shafts corresponding to this one of the gear ratio switching units are connected by a dog mechanism, cases might occur where, upon connection, the dog of the gear ratio switching unit and the dog of the gear do not synchronize and mesh. To help support such cases, substantial force is required in order to connect one of the first and second gear ratio switching units from the neutral position to a gear.

However, according to the conventional shift unit disclosed in Unexamined Japanese Patent Publication No. HEI7-139627, it is not possible to apply large torque to a shift cam, and, consequently, there is a threat that poor connection between the first and second gear ratio switching units and the corresponding gears makes smooth gear shifting difficult.

SUMMARY OF THE INVENTION

Preferred embodiments of the present invention provide a shift mechanism that makes possible smooth gear shifting by a transmission and a vehicle equipped therewith.

A shift mechanism according a preferred embodiment of the present invention moves shift forks connected to a gear of a transmission and changes a gear position of the transmission, the shift mechanism including a shift cam arranged, on an outer periphery, cam grooves to which the shift forks are connected, and rotates at a predetermined rotation angle and moves the shift forks at a certain rotation angle; a cam phase holding section arranged to hold the shift cam at phases determined per the certain rotation angle; a rotating section arranged to rotate in forward and reverse directions from a reference position, and to rotate and to move the shift cam through the certain rotation angle; a transferring section arranged to rotate by section of motor rotation, to rotate in one of the forward and reverse directions from the reference rotation position, and, by transferring the rotation to the rotating section, to rotate the rotating section; a regulating section arranged to, while the transferring section is rotating in one direction, regulate the rotation of the rotating section until a predetermined rotation angle is reached, and to allow the rotation of the rotating section at or above the certain rotation angle; a bias accumulating section including a biasing member that increases bias following an increase in a rotation angle of the transferring section in the one direction; and an accumulated torque releasing section arranged to, when the rotation angle of the transferring section reaches the predetermined rotation angle, release the bias accumulated in the bias accumulating section and to transfer torque to the transferring section. In the shift mechanism, the rotating section makes the shift cam held in the cam phase holding section rotate by section of rotation of the transferring section to which torque is applied from the accumulated torque releasing section.

Bias by the biasing member that increases following the rotation of the transferring section in one direction, is accumulated until the rotation angle of the transferring section reaches a predetermine angle of rotation, and, when the predetermined angle of rotation is reached, bias that is accumulated is released in the form of large torque and transferred to the transferring section. As a result of this structure and arrangement, large torque is transferred to a shift cam via a rotating section and moves shift forks and gears connected to the shift forks with great force.

Furthermore, a vehicle according to a preferred embodiment of the present invention includes a shift mechanism of the above configuration. Furthermore, a motorcycle according to a preferred embodiment of the present invention includes a shift mechanism of the above configuration.

According to preferred embodiments of the present invention, even when transmission gears are connected by a dog mechanism and such, it is possible to connect the gears dependably and allow smooth gear shifting of the transmission.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 12A, 12B, and 12C are schematic diagrams showing the relationship between an operating cam of a press boss section and a follower cam of a boss section.

FIG. 13 is a schematic diagram showing an axis arrangement of a crankshaft, main shaft, and drive shaft in a transmission with a shift mechanism, according to a preferred embodiment, viewed from the right side of the vehicle.

FIG. 15 is a table showing states of the first clutch, second clutch, shift cam, and first gear through sixth gear in each gear position of the transmission mechanism.

FIG. 28 is a simplified table of the relationships between the gear positions, odd-numbered gears, and even-numbered gears shown in FIG. 15.

DETAILED DESCRIPTION OF THE PREFERRED EMBODIMENTS

With reference now to the accompanying drawings, preferred embodiments of the present invention will be explained in detail below. A case will be described below according to a preferred embodiment where the vehicle on which a transmission with a shift mechanism is mounted, is a motorcycle. Also, the terms front, rear, left, and right in this preferred embodiment mean front, rear, left, and right from the viewpoint of the rider seated on the seat of the above motorcycle.

A transmission with shift mechanism 701 according to this preferred embodiment is equipped with a plurality of friction drive clutches that implement seamless gear changing by performing power transfer alternately between odd-numbered gears and even-numbered gears, and is mounted on a motorcycle as a vehicle as a drive unit together with a single engine. First, an outline description will be given of a motorcycle on which a drive unit having a transmission is mounted.

(1) Configuration of Motorcycle

Figure 1:
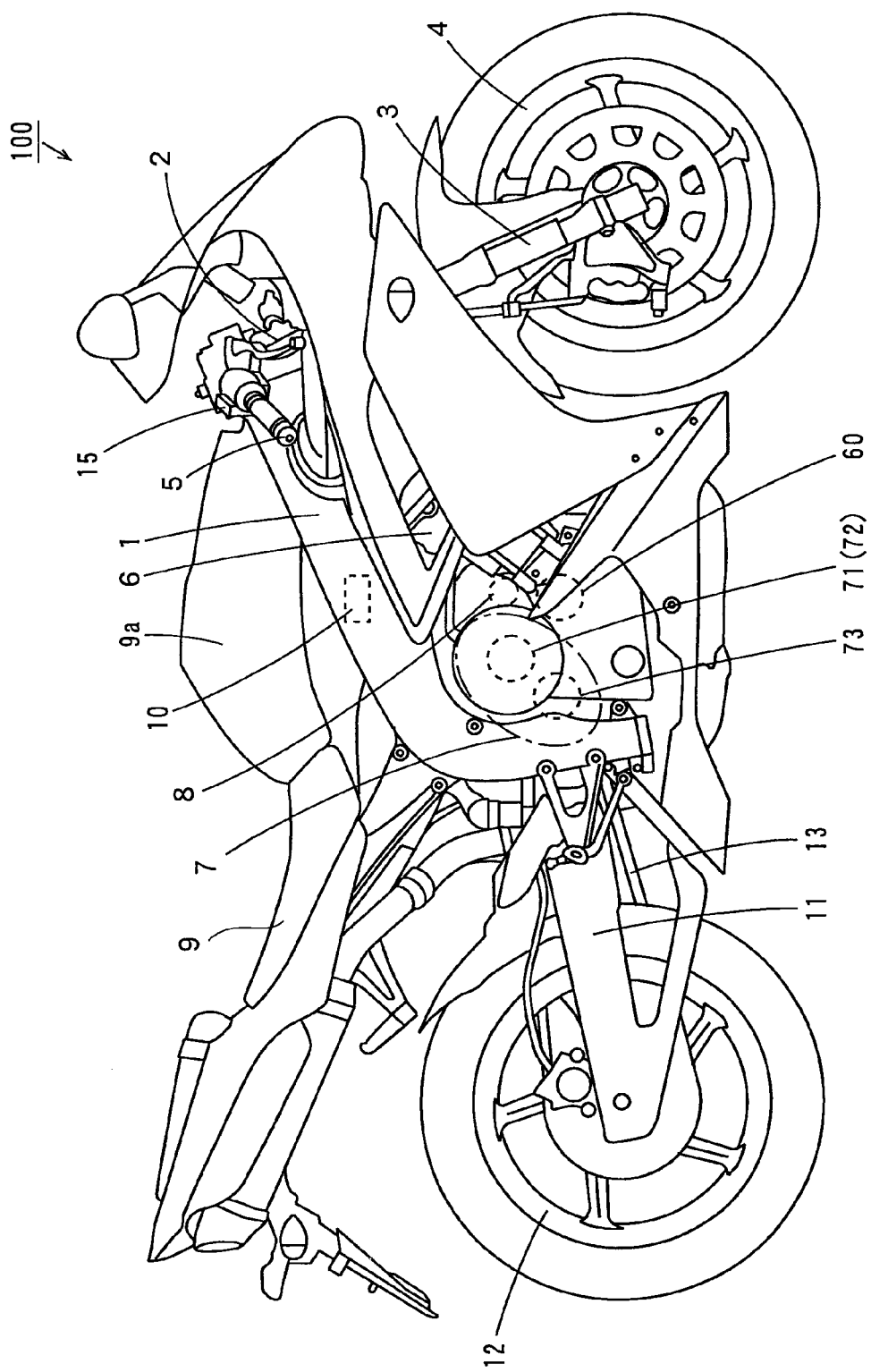
FIG. 1 is a side view of a vehicle equipped with a shift mechanism according to a preferred embodiment of the present invention.

FIG. 1 is a side view of a vehicle equipped with a shift mechanism according to a preferred embodiment of the present invention.

As shown in FIG. 1, motorcycle 100 is equipped with main frame 1 that is provided with head pipe 2 at the front end, and that extends rearward while sloping downward, and in which a drive unit including engine 6, transmission 7, motor 8, and so forth, is placed internally. Front fork 3, to which handle 5 is attached at the top, is provided on head pipe 2 in a rotatable fashion, and supports front wheel 4 attached rotatably at the lower end of this front fork 3.

This handle 5 is provided with shift switch 15 that causes a gear change operation by transmission 7 of the drive unit (see FIG. 2) by an operation by the rider. Shift switch 15 has a shift-up button and shift-down button (not shown). When the shift-up button is depressed by the rider, transmission 7 executes a shift-up operation, and when the shift-down button is depressed by the rider, transmission 7 executes a shift-down operation.

In the drive unit located inside main frame 1, engine 6 is provided in approximately the center portion of the vehicle, with crankshaft 60 extending approximately horizontally in a direction (a lateral direction) perpendicular or substantially perpendicular to the front-back direction of the vehicle below the cylinder head. At the rear of engine 6, transmission 7 is provided that is connected to crankshaft 60 and uses power input via crankshaft 60. Between engine 6 and transmission 7, motor 8 is arranged that causes a gear shift by transmission 7, and this motor 8 performs a gear shift by rotary driving of shift cam 14 of shift mechanism 701 of transmission 7 (see FIG. 2).

Rear arm 11 is joined and extends rearward from the rear end side of main frame 1, sloping downward. Rear arm 11 supports rear wheel 12 and a driven sprocket (not shown) in a rotatable fashion.

On motorcycle 100, seat 9 and fuel tank 9a are placed above the drive unit, and ECU (Electronic Control Unit) 10 that controls the operation of the elements of motorcycle 100 is placed between seat 9 and fuel tank 9a, and the drive unit. This ECU 10 controls the operation of twin clutch transmission 7 equipped with two friction drive clutches that perform odd-numbered and even-numbered transmission gear (transmission gear mechanism) power transfer respectively, for a single engine.

In the vehicle, transmission 7 is provided such that the center in the lateral direction of transmission mechanism 700 and the center in the lateral direction of motorcycle 100 are close to each other.

(2) Configuration of Transmission

Figure 2:
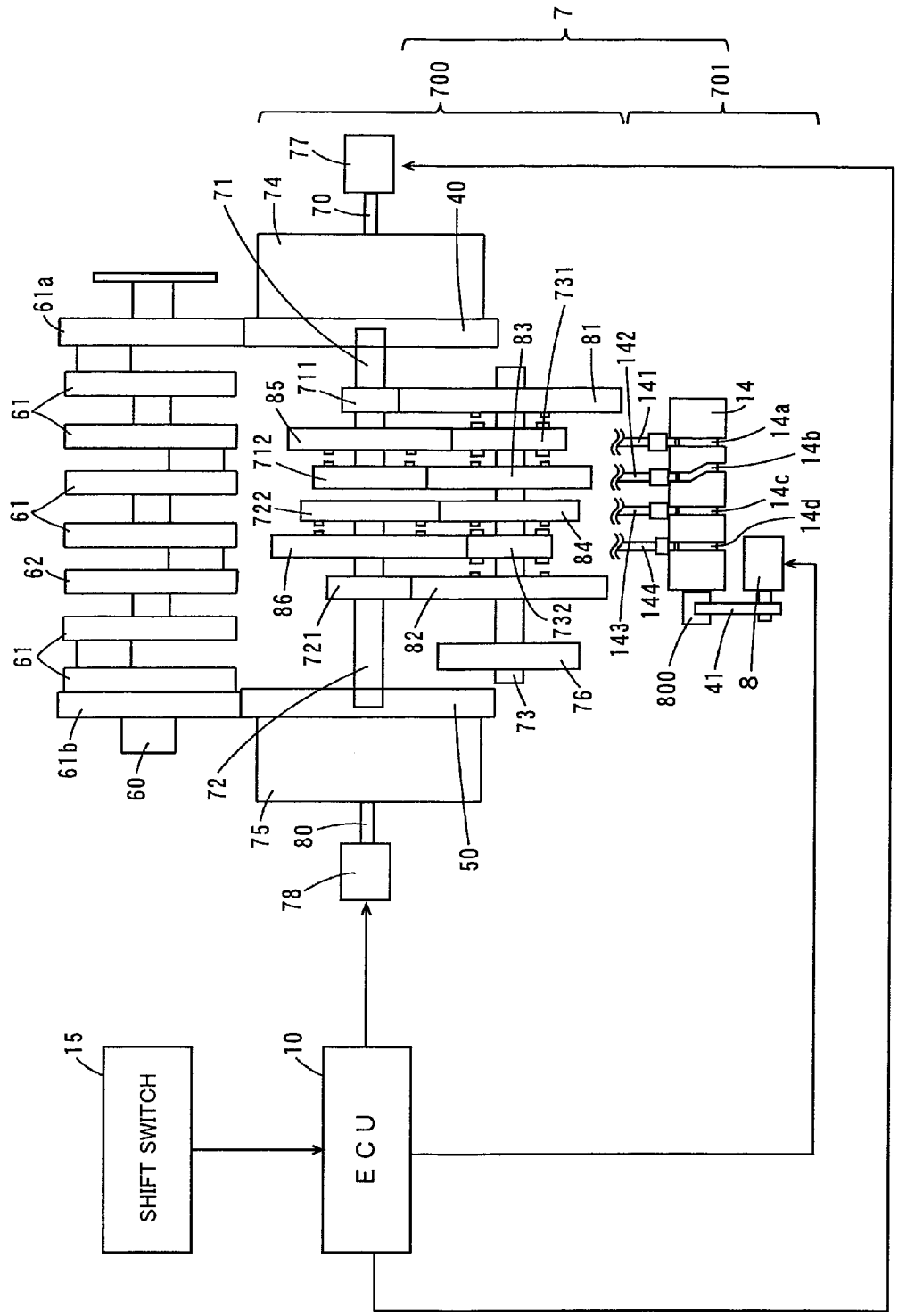
FIG. 2 is a schematic diagram explaining the configuration of the shift mechanism in FIG. 1.

FIG. 2 is a schematic diagram explaining the configuration of transmission 7 with shift mechanism 701 in FIG. 1, and, more specifically, is a schematic diagram of a drive unit with a transmission. The engine unit is omitted from FIG. 2.

Transmission 7 shown in FIG. 2 is connected to crankshaft 60 of engine 6, and has transmission mechanism 700 that varies torque transferred from crankshaft 60 and transfers it to the rear wheel 12 side, and shift mechanism 701 that performs various operations in transmission mechanism 700.

Transmission mechanism 700 has first main shaft 71, second main shaft 72, and drive shaft (output shaft) placed parallel or substantially parallel to crankshaft 60 placed approximately horizontally in a direction perpendicular or substantially perpendicular to the vehicle, first clutch 74, and second clutch 75. Furthermore, transmission mechanism 700 has gears 81 through 86, 711, 712, 721, 722, 731, and 732 that perform power transfer between shafts 71 through 73, drive sprocket (hereinafter referred to as "sprocket") 76, first and second clutch actuators 77 and 78, and so forth.

In transmission mechanism 700, output transferred to first and second main shafts 71 and 72 is transferred to drive shaft 73 placed in the rear by selecting gears 81 through 86, 711, 712, 721, 722, 731 and 732 as appropriate. Sprocket 76 is fixed to one end (the left end) of drive shaft 73, and drive chain 13 wound around a gear provided on a rotating shaft of rear wheel is wound around this sprocket 76. Driving force is transferred to rear wheel (driving wheel) 12 via drive chain 13 through the rotation of sprocket 76 due to the rotation of drive shaft 73.

The transmitting portion of driving force output to rear wheel 12 via odd-numbered transmission gears (gears 81, 83, 85, 711, 712, and 731) on first main shaft 71, and the transmitting portion of driving force output to rear wheel 12 via even-numbered transmission gears (gears 82, 84, 86, 721, 722, and 732) on second main shaft 72, have approximately the same outer diameter. Also, the transmitting portion of first main shaft 71 driving force and the transmitting portion of second main shaft 72 driving force are placed not to overlap concentrically. In this transmission mechanism 700, first main shaft 71 and second main shaft 72 having the same outer diameter are placed side by side laterally on the same axis line, and rotate independently of each other.

First main shaft 71 is coupled to first clutch 74, and second main shaft 72 is coupled to second clutch 75. First clutch 74 and second clutch 75 are placed at a distance from each other in a direction (here, the lateral direction) perpendicular or substantially perpendicular to the front-back direction of the vehicle.

First clutch 74 has its operation controlled by ECU 10 via first clutch actuator 77, and performs power transfer of odd-numbered gears including a group of odd-numbered gears (first gears 711 and 81, third gears 712 and 83, and fifth gears 85 and 731).

Second clutch 75 has its operation controlled by ECU 10 via second clutch actuator 78, and performs power transfer of even-numbered gears including a group of even-numbered gears (second gears 721 and 82, fourth gears 722 and 84, and sixth gears 86 and 732).

Gear shifting performed for gears 81 through 86, 711, 712, 721, 722, 731, and 732 in transmission mechanism 700 is performed by shift forks 141 through 144 that are movable by the rotation of shift cam 14 in shift mechanism 701.

Thus, in motorcycle 100 using transmission 7, engine 6 driving force from crankshaft 60 is output from two independent systems having first and second clutches 74 and 75, and first main shaft 71 and second main shaft 72, is transferred to a driven sprocket via chain 13, and rotates rear wheel 12. In other words, drive shaft 73 outputs to rear wheel 12 power transferred via an odd-numbered transmission gear mechanism (gears 81, 83, 85, 711, 712, and 731) or an even-numbered transmission gear mechanism (gears 82, 84, 86, 721, 722, and 732) by selecting between first clutch 74 and second clutch 75.

Transmission mechanism 700 of transmission 7 will now be described in detail.

(2-1) Transmission Mechanism of Transmission

Figure 3:
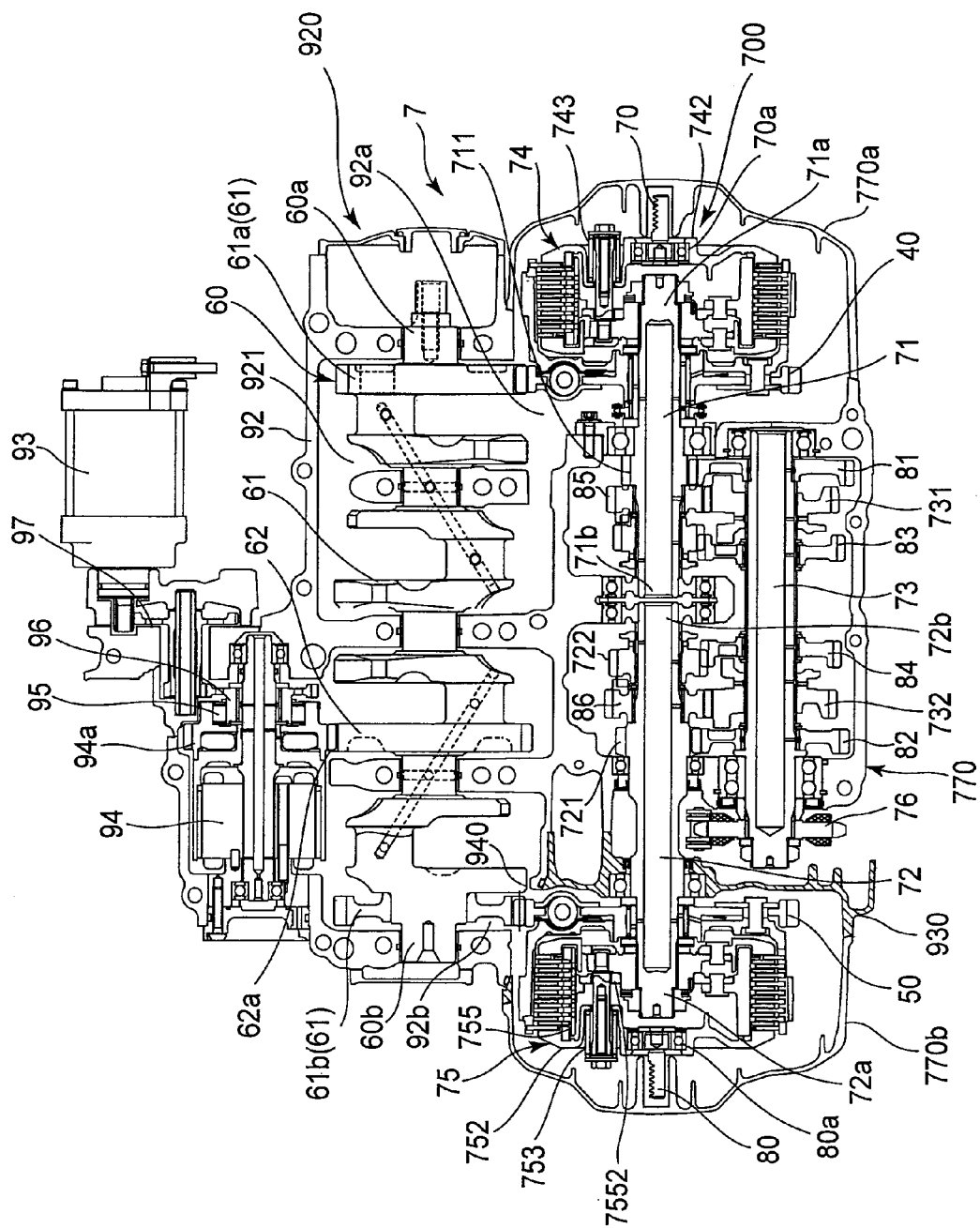
FIG. 3 is a drawing provided to explain the transmission mechanism of a vehicle shown in FIG. 1.

FIG. 3 is a drawing provided to explain the transmission of a vehicle shown in FIG. 1, being a partial cross-sectional plan view showing the principal portions of a drive unit equipped with a transmission. For convenience, hatching indicating a cross-section of configuration members is omitted in FIG. 3.

Transmission mechanism 700 of transmission 7 is placed in an area in which crankshaft 60 is adjacent to shaft accommodating section 921 placed facing in a lateral direction in crank case 92 of the drive unit, and that includes mission case (also referred to as "unit case") 770 arranged in the lengthwise direction of shaft accommodating section 921.

Mission case 770 forms drive unit chassis 920 together with shaft accommodating section 921 and crank case 92.

Side cover section (clutch cover) 770a, bell housing 930, and side cover section (clutch cover) 770b are attached to this drive unit chassis 920. Side cover section (clutch cover) 770a is attached detachably to one side surface (the right side surface) of mission case 770 in drive unit chassis 920, and covers first clutch 74 from one side (the right side). Also, bell housing 930 is attached detachably to the other side surface (the left side surface) of mission case 770. Side cover section (clutch cover) 770b is provided detachably on the other side of bell housing 930 so as to cover that bell housing 930, and covers second clutch 75 from the other side (the left side).

Mission case 770 is arranged parallel or substantially parallel to the direction in which shaft accommodating section 921 extends in crank case 92. Mission case 770 accommodates portions of first and second main shafts 71 and 72, drive shaft 73, and gears through 86, 711, 712, 721, 722, 731, and 732.

Side cover sections 770a and 770b are each arranged in a bell shape, and cover first clutch 74 and second clutch 75 from both sides (the left and right sides) of crank case 92.

Of side cover sections 770a and 770b, one (left side) side cover section 770a is attached detachably to one side surface (here, the right side surface) of mission case 770, and together with this one side surface, forms a clutch case that accommodates first clutch 74.

Also, side cover section 770b, together with bell housing 930 attached detachably to the other side surface (the left side surface) of mission case 770, forms a clutch case (casing member) that accommodates second clutch 75. For convenience, bell housing 930 is shown hatched in FIG. 3.

Starter motor 93 is attached to crank case 92 of drive unit chassis 920, and idler gear 97 and starter gear are driven by this starter motor 93. Gear 94a is connected to gear 62a provided on crank web 62 of crankshaft 60, and is also connected to starter gear 96 rotated by the drive of starter motor 93 via one-way clutch 95. As a result of this structure and arrangement, when starter motor 93 drives, gear 94a rotates integrally with starter gear 96 via one-way clutch 95, and rotates crankshaft 60.

Generator 94 is attached to crank case 92, and this generator 94 rotates integrally with gear 94a. As stated above, gear 94a is connected to gear 62a provided on crank web 62 of crankshaft 60. Thus, generator 94 is driven when crankshaft 60 rotates.

As shown in FIG. 2 and FIG. 3, crankshaft 60 of engine 6 (FIG. 1) has a plurality of crank webs 61 and 62. As shown in FIG. 3, crankshaft 60 is placed inside shaft accommodating section 921 of crank case 92 in such a way that the center portion in the direction of extension is approximately in the center in the vehicle width direction.

Of the plurality of crank webs 61 in crankshaft 60, crank webs 61a and 61b placed at one end and the other end of crankshaft 60 are external gears on which gear grooves are arranged on the outer periphery. These crank webs 61a and 61b are placed at positions facing the inside of both clutch cases (side cover sections 770a and 770b) from openings 92a and 92b that open on the first clutch and second clutch 75 sides (here, rearward) on both sides (both sides axially) of crank case 92 in shaft accommodating section 921.

Of crank webs 61a and 61b on which gear grooves are provided in crankshaft 60, crank web 61a provided at one end meshes with first primary driven gear (also referred to as "first input gear") 40 in first clutch 74 inside shaft accommodating section 921. Through this meshing, power transferred to first input gear 40 from crank web 61a at one end of crankshaft 60 is transferred to first main shaft 71 of transmission 7 from one end of crankshaft 60 via first clutch 74.

On the other hand, of crank webs 61a and 61b on which gear grooves are provided in crankshaft 60, crank web 61b provided at the other end meshes with second primary driven gear (also referred to as "second input gear") 50 in second clutch 75 inside the clutch case. Through this meshing, power transferred to second input gear 50 from crank web 61b at the other end of crankshaft 60 is transferred to second main shaft 72 of transmission from the other end of crankshaft 60.

A meshing portion between gear grooves of crank web 61b and second input gear 50 is placed in a communicating portion that communicates inside the clutch case at the other end (the left end) of shaft accommodating section 921 in drive unit chassis 920. This communicating portion is arranged by opening 92b at the other end of shaft accommodating section 921 and throughhole 940 arranged in a junction section of bell housing 930 forming the clutch case.

First clutch 74 and second clutch 75 are placed rearward of crankshaft 60, and opposite the two ends 60a and 60b of crankshaft 60 respectively. Base ends 71a and 72a of first main shaft 71 and second main shaft 72 are coupled respectively to first clutch 74 and second clutch 75.

First main shaft 71 and second main shaft 72 extend in mutually opposite directions from first clutch and second clutch 75, and are placed in a direction (here, a lateral direction) intersecting the front-back direction of motorcycle 100 approximately at a right angle.

First and second main shafts 71 and 72 are placed so as to position the end surface portions of mutually opposite front ends 71b and 72b approximately in the center in the vehicle width direction of motorcycle 100 in drive unit chassis 920 of the drive unit.

Specifically, the first main shaft 71 front end (other end) 71b side and second main shaft 72 front end (other end) 72b side are inserted into hollow mission case 770 connected to crank case 92 of the drive unit. Here, first main shaft 71 and second main shaft 72 are placed in crank case 92 with the respective base end (one end) 71a/71b sides projecting left and right from both sides of mission case 770.

On the same axis line, mutually facing first main shaft 71 front end 71b and second main shaft 72 front end 72b are inserted into bearings 771 and 772 inside mission case 770, and are pivoted rotatably. These bearings 771 and 772 fit inside an opening in flange 773 that rises from the inner peripheral surface of mission case 770.

Flange 773 rotatably supports the end surfaces of front ends 71b and 72b of first main shaft 71 and second main shaft 72 via bearings 771 and 772 so as to face each other in the center portion of that flange 773.

Front ends 71b and 72b of first main shaft 71 and second main shaft 72 are pivoted rotatably in crank case by being inserted into bearings 771 and 772 inside flange 773 inside mission case 770, but this is not a limitation. For example, a configuration will be assumed in which only one or other of front ends 71b and 72b of hollow first main shaft 71 and second main shaft 72 is received by a bearing inside a flange provided inside mission case 770. With this configuration, a configuration will be assumed in which a needle bearing is attached to the inner periphery of one or other of front ends 71b and 72b, and the other one of front ends 71b and 72b is inserted into this needle bearing. That is to say, the other end of adjacent ends is inserted rotatably into one end in coaxially aligned first main shaft 71 and second main shaft 72, and the one end only is supported in flange 773 rising from that unit case 770 via a bearing.

To summarize, of two main shafts placed coaxially, an end of one main shaft is inserted into an end of the other main shaft, and only that end of the one main shaft is supported rotatably inside mission case 770. According to this configuration, if both main shafts are made hollow and the respective hollow portions are made lubricating oil channels, lubricating oil can be made to flow satisfactorily inside both main shafts simply by providing an inflow of lubricating oil at an end at which the two main shafts overlap, or a point near that end.

Of the ends of first and second main shafts 71 and 72 placed on the same axis line in this way, first clutch 74 and second clutch 75 are placed at ends (base ends) 71a and 72a on the sides farthest from each other in a lateral direction.

These first and second clutches 74 and 75 are connected outwardly in the axial direction to base end (one end) 71a and base end (one end) 72a of first and second main shafts 71 and 72 projecting axially outward from both side surfaces of mission case 770. Base end 72a of second main shaft 72 projects farther axially outward than the other side surface of mission case 770 and bell housing 930 attached detachably to the other side surface, and is positioned farther axially outward than the same-side (left-side) end of adjacent drive shaft 73.

First clutch 74 is placed farther axially outward than one side surface of mission case 770, and is covered by side cover section 770a attached detachably to one side surface (one side surface in a direction approximately perpendicular or substantially perpendicular to the horizontal with respect to the vehicle center axis).

Second clutch 75 is placed farther axially outward than the other side surface of mission case 770 and bell housing 930 attached detachably to the other side surface, and is covered, axially from the outside, by side cover section 770b.

Second clutch 75 is connected detachably to base end 72a of second main shaft 72 at a position overlapping portion of sprocket 76 axially sideways (on the left side) of drive shaft 73.

Between this second clutch 75 and sprocket 76 at a distance therefrom in the axial direction is placed a bottom surface (partition member) of bell housing 930 that is part of the crank case accommodating second clutch and separates second clutch 75 and sprocket 76.

That is to say, by the bottom surface of bell housing 930, the clutch case accommodating second clutch 75, defined by side cover section 770b and bell housing 930, and an area of an externally exposed driving force output portion comprising sprocket 76 and chain 13 wound around sprocket 76 and guided rearward, are separated.

Figure 53:
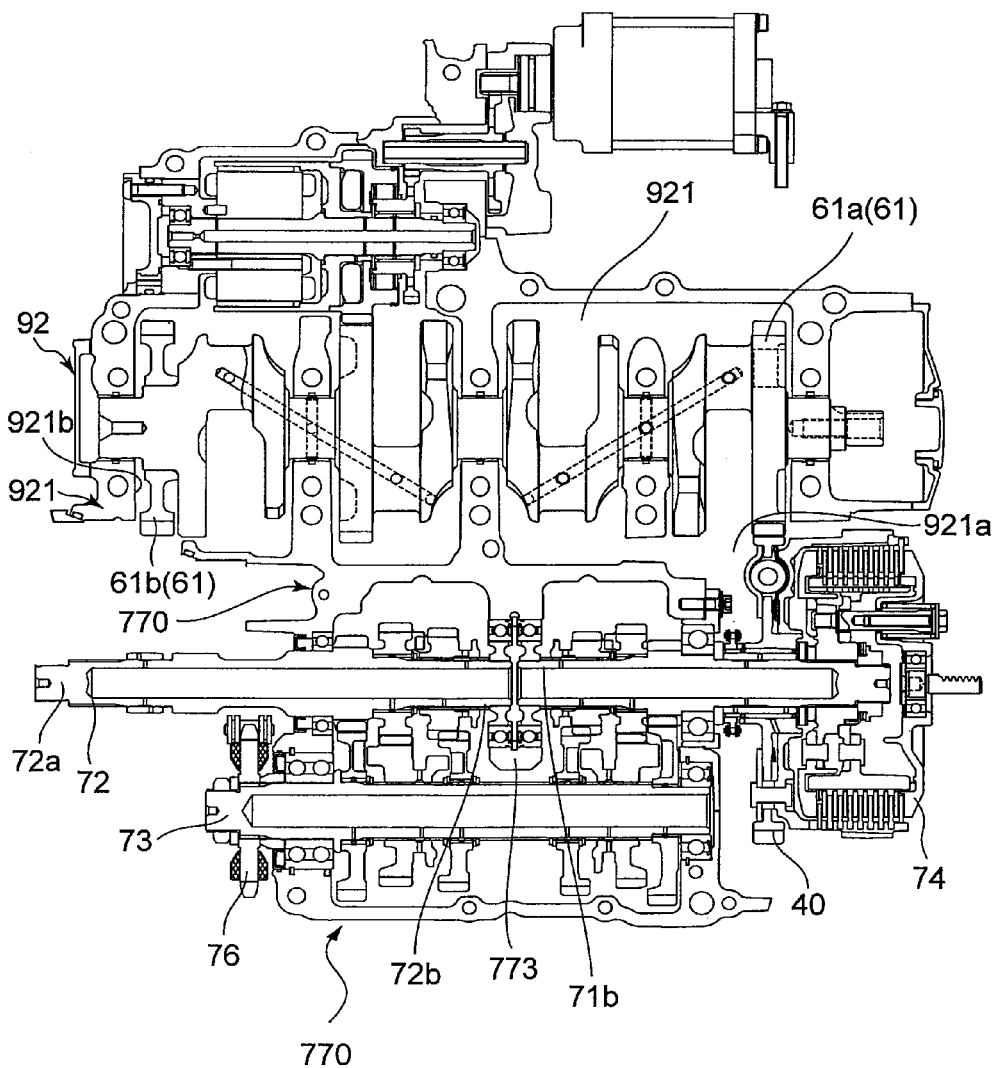
FIG. 53 is a planar cross-sectional view showing a state in which both side cover sections and a bell housing have been removed from a drive unit of a vehicle equipped with a shift mechanism according to a preferred embodiment of the present invention.

FIG. 53 is a planar cross-sectional view showing a state in which both side cover sections, second clutch 75, and bell housing 930 have been removed from a drive unit of a vehicle equipped with shift mechanism 701 according to one preferred embodiment of the present invention.

On one side (the right side) of the drive unit shown in FIG. 53, side cover section 770a has been removed from mission case 770 in drive unit chassis 920.

According to a drive unit having such a transmission 7, first clutch 74 can be exposed on one side (the right side) of a vehicle while mounted on the vehicle simply by removing side cover section 770a, enabling maintenance of first clutch 74 to be performed easily.

Also, on the other side of the drive unit, other side cover section 770b has been removed from crank case equipped with bell housing 930 axially sideways (leftward), and furthermore, second clutch 75 and bell housing 930 have been removed from crank case 92 (specifically, the mission case 770 portion rearward of crank case 92) on the axial side (the left side).

Figure 54:
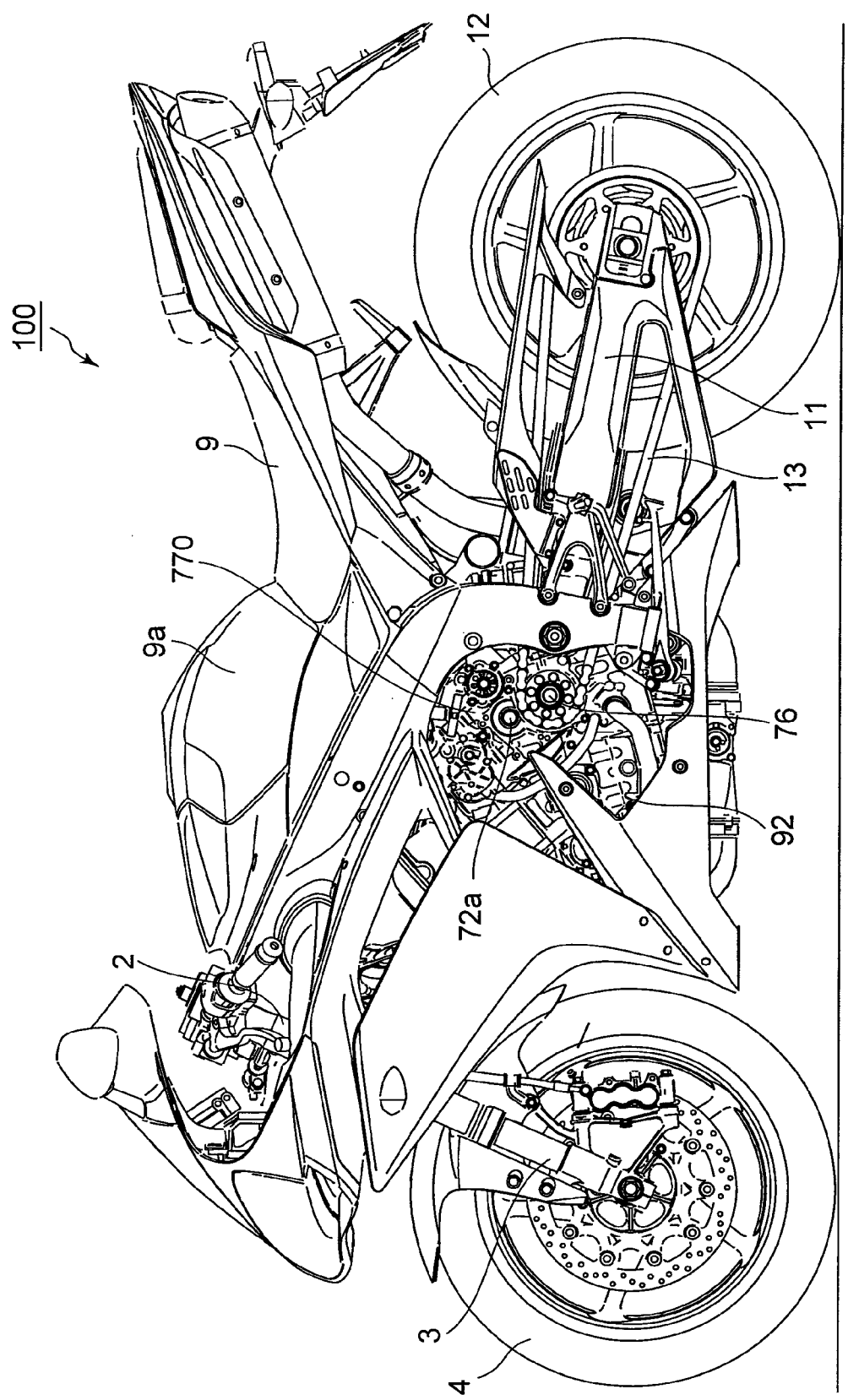
FIG. 54 is a side view showing a state in which a side cover section covering the second clutch, and the second clutch and bell housing, have been removed from a vehicle equipped with a shift mechanism according to a preferred embodiment of the present invention.

FIG. 54 is a side view showing a state in which a side cover section covering the second clutch, and the second clutch and bell housing, have been removed from a vehicle equipped with shift mechanism 701 according to a preferred embodiment of the present invention.

A drive unit equipped with transmission 7 from which side cover section 770b, second clutch 75, and bell housing 930 have been removed in this way, enables sprocket 76 on the other side (here, the left side) and chain 13 wound around sprocket 76 to be exposed while mounted on a vehicle.

Therefore, after a drive unit in which first main shaft 71, second main shaft 72, drive shaft 73, gears 81 through 86, 711, 712, 721, 722, 731, and 732, and so forth, performing power transfer between shafts 71 through 73, are placed has been mounted on a vehicle together with engine 6 and crankshaft 60, assembly of sprocket 76 and chain 13 wound around sprocket 76 can be performed on one side (the left side) of the vehicle.

Also, as shown in FIG. 54, with a vehicle having transmission 7, as well as removing side cover section 770b, second clutch 75 can be removed from base end 72a of second main shaft 72, and furthermore crank case 92 can be removed from bell housing 930, enabling sprocket 76 to be exposed on the other side (the left side) of the vehicle.

As a result of this structure and arrangement, sprocket 76 maintenance, that is, maintenance of the portion providing drive output to rear wheel 12, including drive chain 13, and so forth, can be performed easily while a drive unit equipped with transmission 7 is mounted on the vehicle. Thus, with a vehicle equipped with transmission 7, maintenance of drive chain 13 and sprocket 76 can be performed while the engine is mounted on the vehicle.

Figure 55:
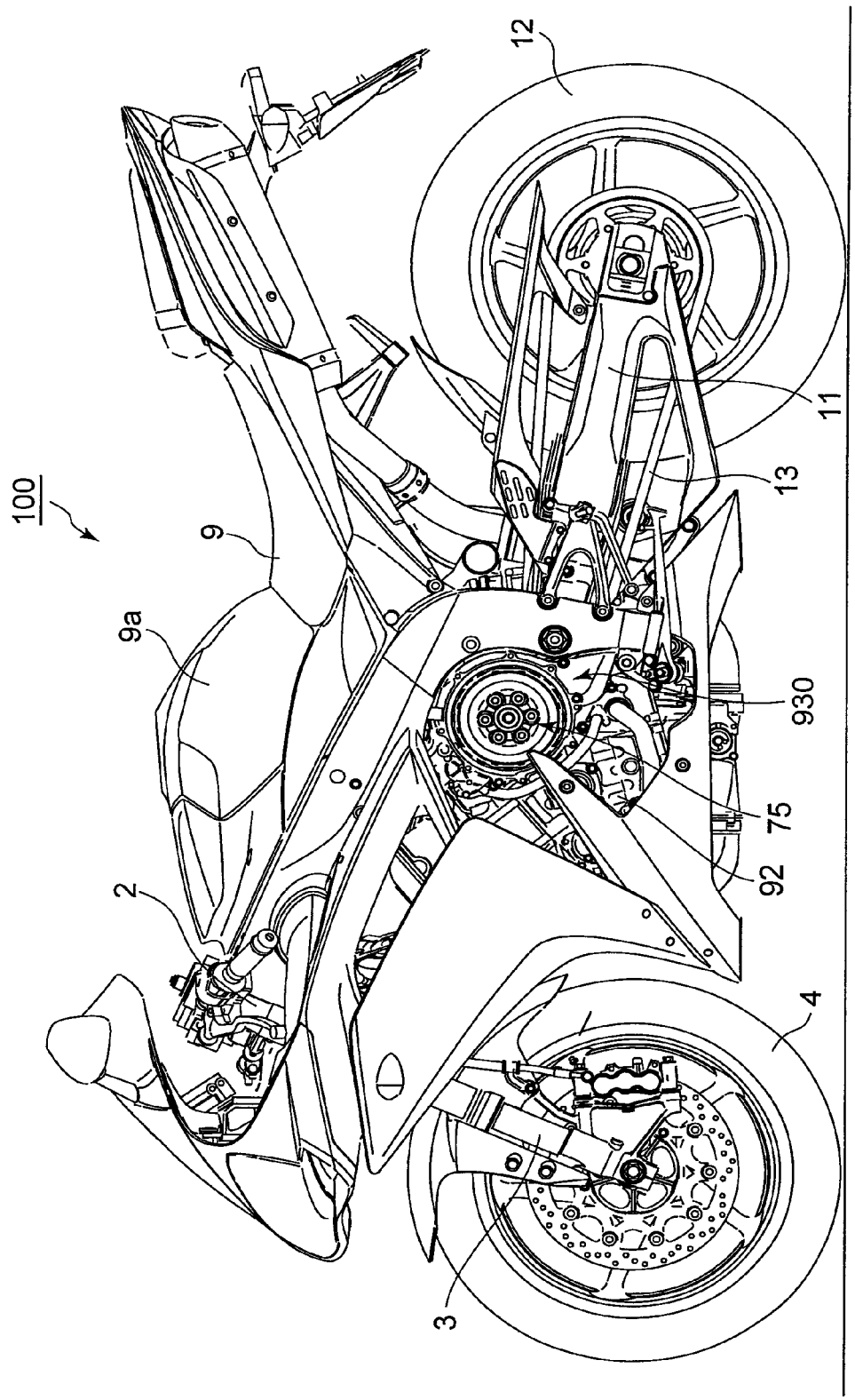
FIG. 55 is a vehicle side view showing a state in which a side covering part covering the second clutch has been removed from a vehicle equipped with a shift mechanism according to a preferred embodiment of the present invention.

FIG. 55 is a vehicle side view showing a state in which a side covering portion covering the second clutch has been removed from a vehicle equipped with shift mechanism 701 according to a preferred embodiment of the present invention.

As shown in FIG. 55, second clutch 75 can be exposed on one side of the vehicle simply by removing side cover section 770b covering second clutch 75 on the axially outward other side (the left side). As a result of this structure and arrangement, second clutch 75 maintenance can be performed easily without removing the drive unit from frame 11 (see FIG. 1) by removing side cover section 770b, which is a portion of the crank case accommodating second clutch 75, even after the drive unit has been mounted on the vehicle.

These first and second clutches 74 and 75 extend in a direction (the vehicle width direction) perpendicular or substantially perpendicular to the vehicle front-back direction via primary driven gears 40 and 50, take power from both ends of crankshaft 60 placed approximately horizontally, and transfer that power to first and second main shafts 71 and 72 respectively.

Also, these first and second clutches 74 and 75 are each equipped with a back torque limiter that limits the application of torque in a direction opposite to that of torque that is transferred to first and second main shafts 71 and 72 by crankshaft 60 and causes the vehicle to move forward. A detailed description of the configuration of first clutch 74 and second clutch 75 equipped with back torque limiters will be given later herein.

In this preferred embodiment, a configuration has been assumed in which first main shaft 71 and second main shaft 72 are placed at a distance from each other on the same axis line, but any kind of configuration may be used as long as transfer paths of torque of crankshaft input via first clutch 74 and second clutch 75 respectively and output to drive shaft 73 are separate systems that do not overlap on the same axis line. In other words, first and second main shafts 71 and 72 may be provided in any way as long as the configuration is such that torque of crankshaft 60 is input from a plurality of input channels, and portions that transfer power output via drive shaft 73 do not overlap coaxially. For example, a configuration may be used in which mutually facing front ends of first main shaft 71 and second main shaft 72 positioned on the same axis line overlap in a rotatable fashion.

Figure 4:
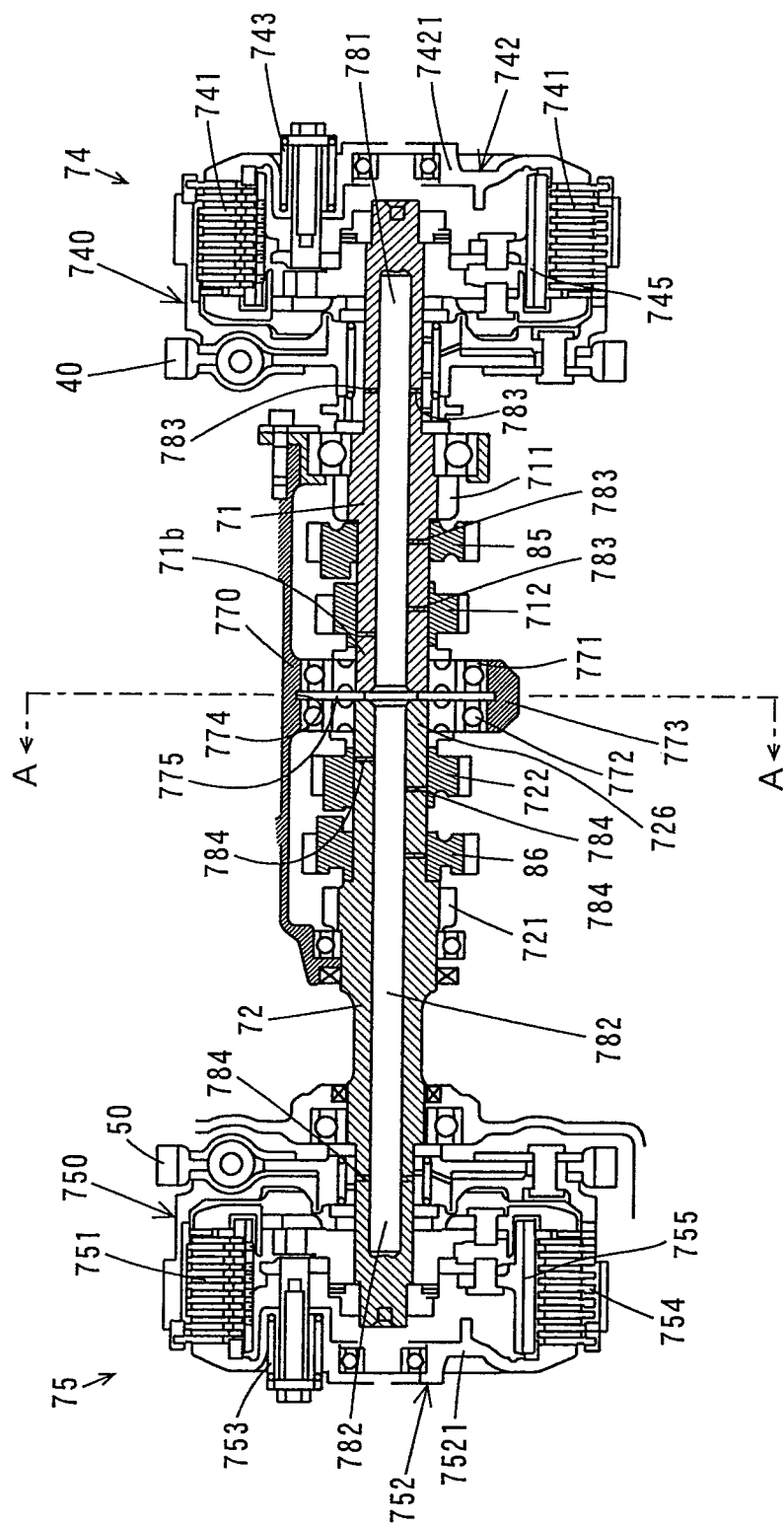
FIG. 4 is a principal-portion cross-sectional view showing first and second clutches and first and second main shafts.

FIG. 4 is a principal-portion cross-sectional view showing first and second clutches 74 and 75 and first and second main shafts 71 and 72.

Here, multi-plate clutches with the same kind of configuration are adopted as first and second clutches 74 and 75 shown in FIG. 2 through FIG. 4.

As shown in FIG. 4, first clutch 74 has first primary driven gear (first input gear) 40, clutch housing 740, plurality of clutch plates 741, plurality of friction plates 744, pressure plate section 742, clutch spring 743 and center hub 745. Furthermore, second clutch 75 has second primary driven gear (second input gear) 50, clutch housing 750, plurality of clutch plates 751, plurality of friction plates 754, pressure plate section 752, clutch spring 753 and center hub 755.

In first clutch 74, as shown in FIG. 4, first pressure plate 7421 of pressure plate 742 is biased toward first input gear 40 by clutch spring 743. As a result, a state normally exists in which plurality of clutch plates 741 and plurality of friction plates 744 are in mutual contact, and the torque of crankshaft 60 (see FIG. 2) is transferred to first main shaft 71 via first input gear 40, clutch housing 740, and center hub 745.

In second clutch 75, first pressure plate 7521 of pressure plate 752 is biased toward second input gear 50 by clutch spring 753. As a result, a state normally exists in which plurality of clutch plates 751 and plurality of friction plates 754 are in mutual contact, and the torque of crankshaft 60 (see FIG. 2) is transferred to second main shaft 72 via second input gear 50, clutch housing 750, and center hub 755.

Furthermore, as shown in FIG. 2, first clutch actuator 77 is connected to first clutch 74 via first pullrod 70. Furthermore, second clutch actuator 78 is connected to second clutch 75 via second pullrod 80.

First pullrod 70 is coupled to pressure plate 742 of first clutch 74 (see FIG. 3 and FIG. 4), and second pullrod 80 is coupled to pressure plate 752 of second clutch 75 (see FIG. 3 and FIG. 4).

First clutch actuator 77 shown in FIG. 2 has, for example, a link (not shown) that pulls first pullrod 70 toward the first clutch actuator 77 side, a hydraulic cylinder (not shown) that operates the link, a motor (not shown) for generating hydraulic pressure in the hydraulic cylinder, and so forth. Second clutch actuator 78 has the same kind of configuration as first clutch actuator 77.

In this preferred embodiment, first pressure plate 7421 in pressure plate 742 (see FIG. 3 and FIG. 4) is pulled toward first clutch actuator 77 due to the fact that first pullrod 70 is pulled toward first clutch actuator 77 by first clutch actuator 77. As a result, plurality of clutch plates 741 and plurality of friction plates 744 (see FIG. 4) are separated from each other, and the transfer of torque from first input gear 40 to first main shaft 71 is disconnected.

Also, first pressure plate 7521 of pressure plate 752 (see FIG. 3 and FIG. 4) is pulled toward second clutch actuator 78 due to the fact that second pullrod 80 is pulled toward second clutch actuator 78 by second clutch actuator 78. As a result, plurality of clutch plates 751 and plurality of friction plates 754 (see FIG. 4) are separated from each other, and the transfer of torque from second input gear 50 to second main shaft 72 is disconnected.

Thus, first and second clutches 74 and 75 are normally connected, and are disconnected when first and second clutch actuators 77 and 78 are driven.

These first and second clutches 74 and 75 each have a back torque limiter that limits the application of torque in first and second main shafts 71 and 72 in a direction opposite to the forward direction (the direction in which the engine drives so as to accelerate the vehicle) that is the direction in which rotation is performed in accordance with the rotation of crankshaft by engine drive.

Specifically, first clutch 74 is equipped with a back torque limiter that limits back torque applied to first main shaft 71, and second clutch 75 is equipped with a back torque limiter that limits back torque applied to second main shaft 72. It is assumed that the capacity of these back torque limiters is set so that [absolute value of reverse torque capacity (decelerating torque capacity)<forward torque capacity (accelerating torque capacity)].

The configuration of clutches (first clutch 74 and second clutch 75) equipped with a back torque limiter will now be described in detail.

First clutch 74 and second clutch 75 have the same basic configuration but with mirror-symmetric structures. Thus, second clutch 75 is also equipped with a back torque limiter having the same basic configuration as that of first clutch 74, but with a mirror-symmetric structure. Therefore, only the configuration of first clutch 74 is described below, and a description of the configuration of second clutch 75 is omitted.

Figure 5:
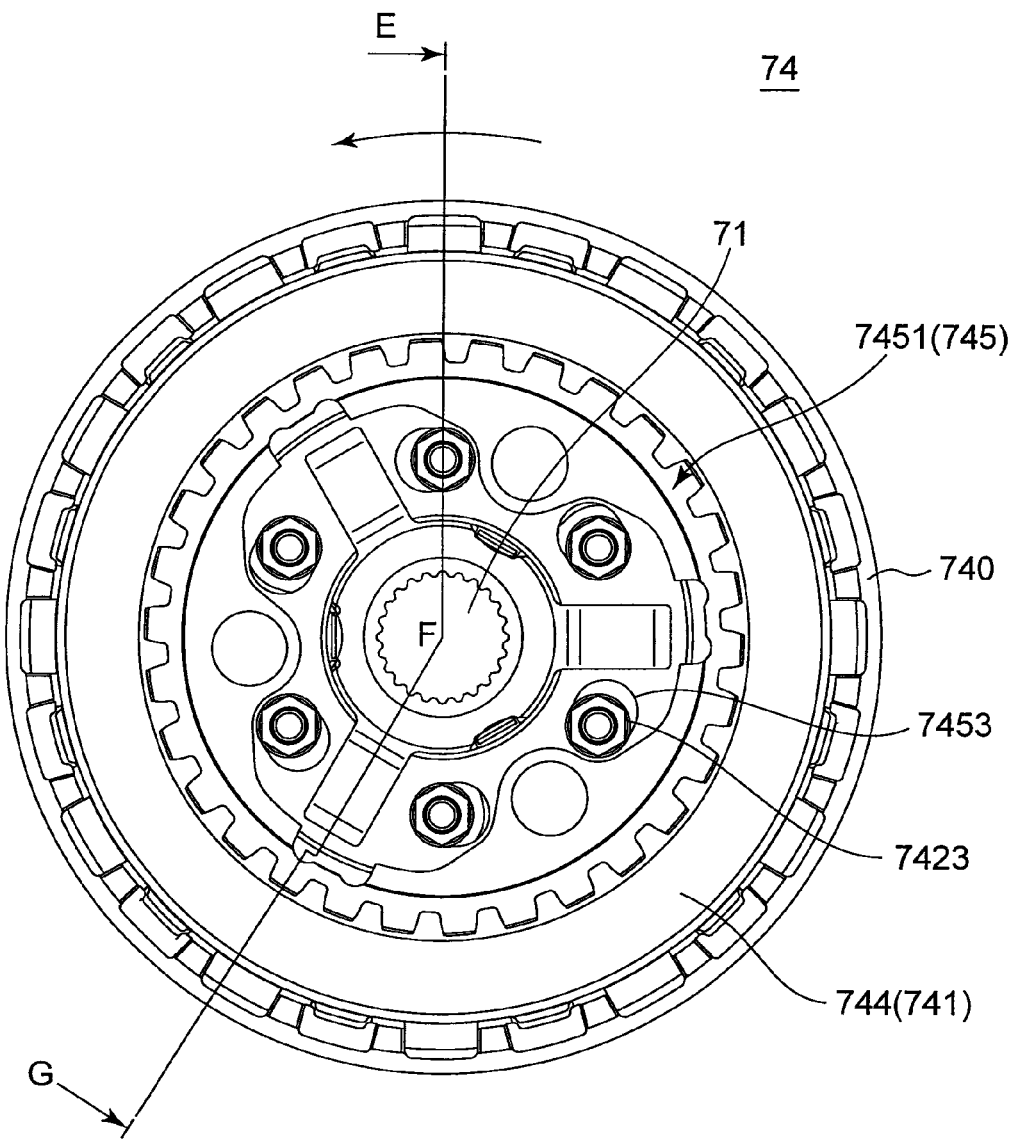
FIG. 5 is a drawing of the first clutch in the transmission mechanism shown in FIG. 3, viewed from the right side.
Figure 6:
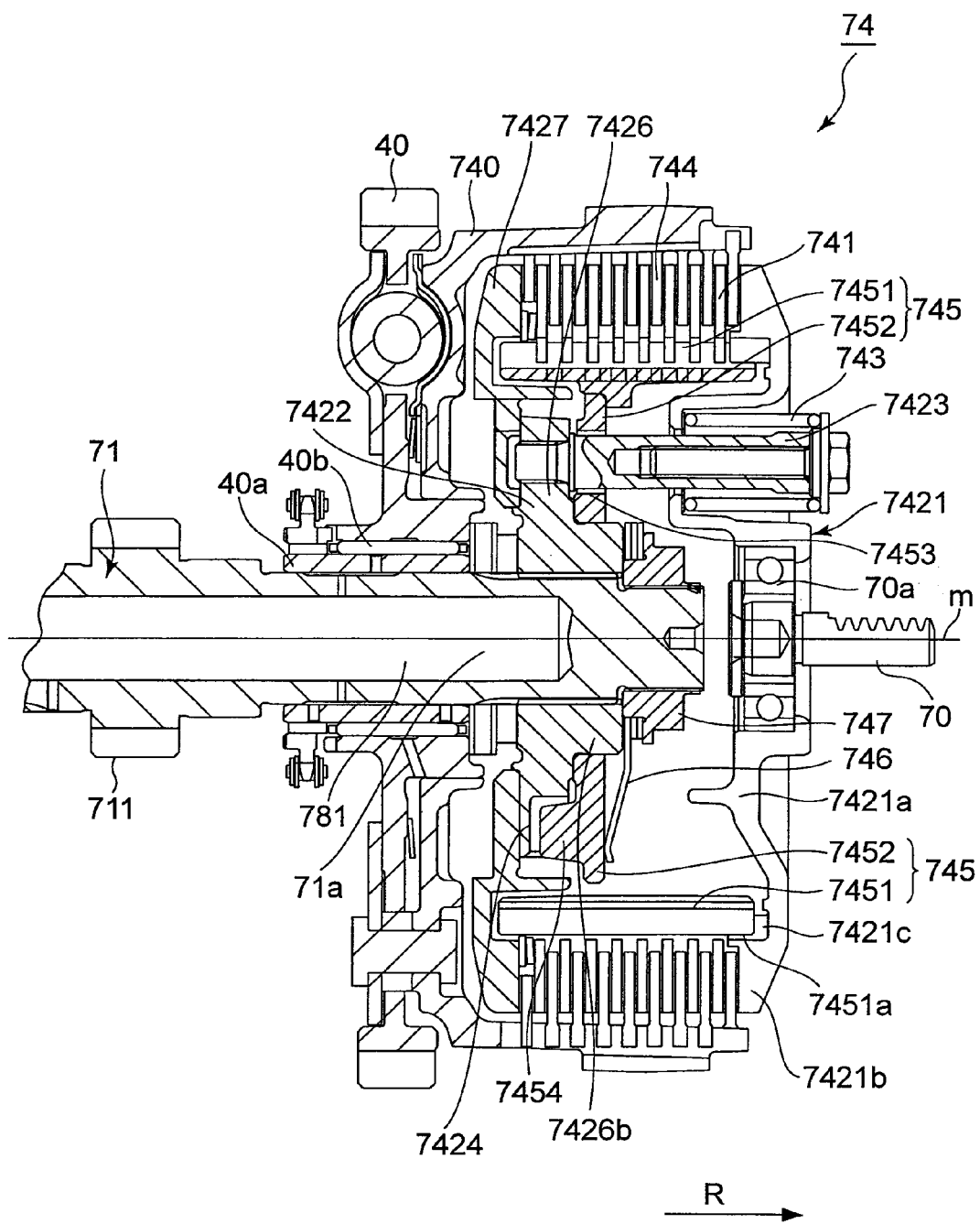
FIG. 6 is an E-F-G-line principal-portion partial cross-sectional view of the first clutch in the transmission shown in FIG. 5.
Figure 7:
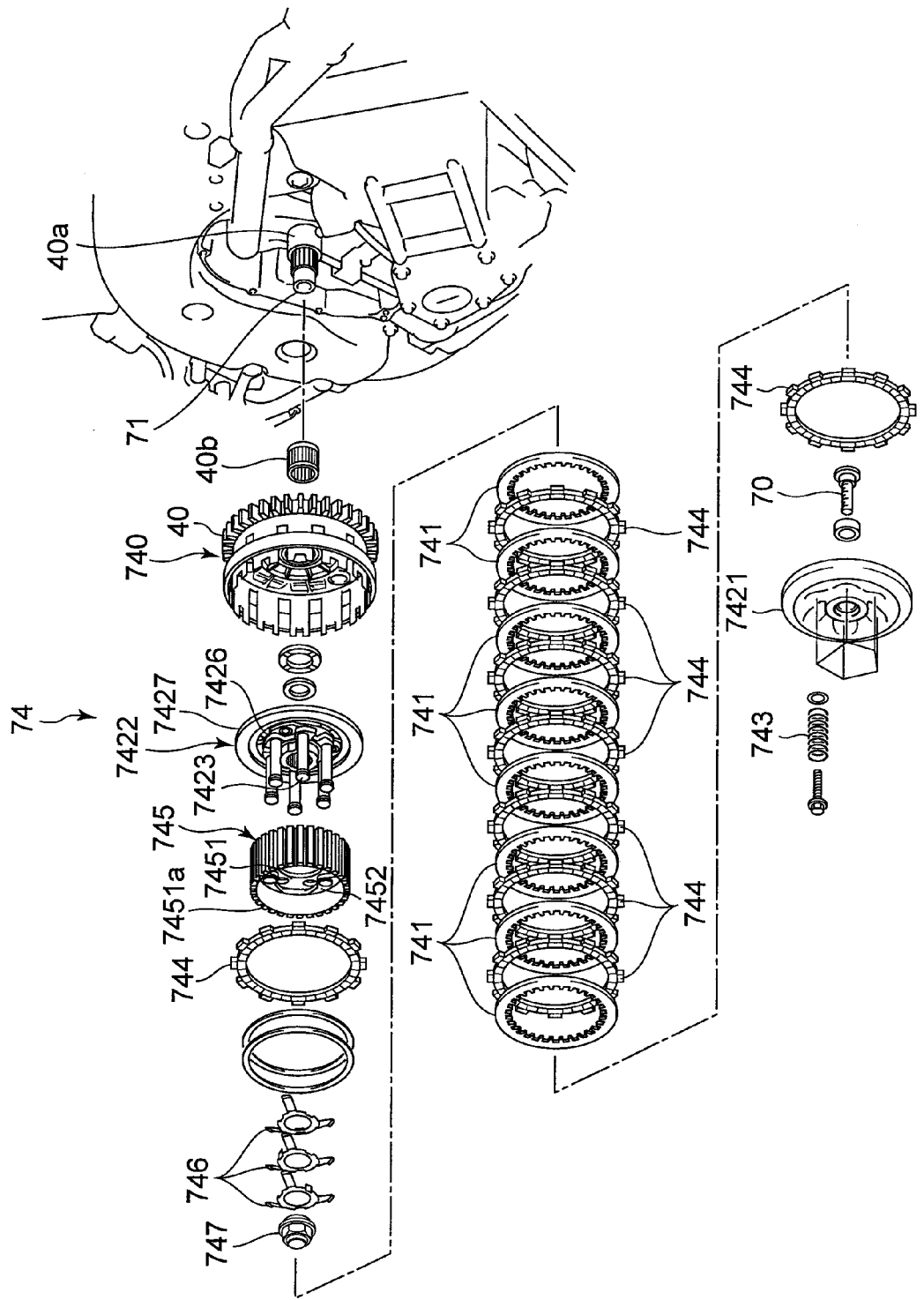
FIG. 7 is an exploded perspective view showing the principal-portion configuration of the first clutch in the transmission shown in FIG. 6.

FIG. 5 is a drawing showing a state in which clutch spring 743 and pressure plate 742 have been removed from first clutch 74 in transmission mechanism 700 shown in FIG. 3, viewed from the right side, and FIG. 6 is a partial cross-sectional view through line E-F-G of the first clutch shown in FIG. 5. FIG. 7 is an exploded perspective view showing the principal-portion configuration of the first clutch shown in FIG. 6. In the case of first clutch 74 shown in FIG. 74, a principal-portion cross-section is shown of different parts above and below rotation center m.

As shown in FIG. 6 and FIG. 7, first input gear 40 that transfers torque of crankshaft 60 to first clutch 74 is fitted over externally fitted collar 40a and needle bearing 40b fitted around collar 40a, on other end (base end) 71a of first main shaft 71. As a result of this structure and arrangement, first input gear 40 becomes rotatable on first main shaft 71.

On this first input gear 40, clutch housing 740 is provided integrally so as to be rotatable together with input gear 40.

Clutch housing 740 has a bottomed cylindrical shape, and is attached integrally to a hub portion of input gear 40 fitted externally in a rotatable fashion on an end (base end 71a) of first main shaft 71, with first main shaft 71 inserted through the center of that bottom portion and the inside opened at one end. Thus, clutch housing 740 is rotatably attached coaxially with first main shaft 71 together with first input gear 40 to the outer periphery of an end (base end 71a) of first main shaft 71 together with first input gear 40.

On the inside of clutch housing 740 are provided annular friction plates 744 and clutch plates 741 placed alternately and mutually separably in the axial direction. Furthermore, on the inside of clutch housing 740 are provided center hub 745 placed inside friction plates 744 and clutch plates 741, and second pressure plate 7422 sandwiching friction plates 744 and clutch plates 741 together with first pressure plate 7421.

Center hub 745 and second pressure plate 7422 form a clutch hub section placed inside clutch housing 740.

Annular friction plates 744 are placed so as to be coaxial with first main shaft 71, and outer diameter splines arranged on the outer periphery are meshed with inner diameter splines arranged on the inner peripheral surface of clutch housing 740. As a result of this structure and arrangement, friction plates 744 become rotatable about the axial center of first main shaft 71 together with clutch housing 740.

The plurality of annular clutch plates 741 placed between these friction plates 744 are meshed with center hub 745 placed inside plurality of clutch plates 741 via the inner diameter splines arranged on the inner periphery. As a result of this structure and arrangement, clutch plates 741 rotate together with center hub 745.

As shown in FIG. 6, center hub 745 is placed, separably in the axial direction, adjacent to second pressure plate 7422 attached in a flange shape extending radially outward from first main shaft 71 projecting inside clutch housing 740. Stepped nut (muffler) 747 is attached to an end (to be specific, the base end) of this first main shaft 71 via externally fitted leaf spring 746.

This stepped nut 747 fixes second pressure plate 7422 to an end of first main shaft 71 and prevents its detachment from that first main shaft 71, and also inhibits movement of leaf spring 746 in the axial direction.

Center hub 745 is placed so as to surround an end of first main shaft 71, and is arranged in a bottomed cylindrical shape by cylindrical section 7451 on which outer diameter splines are arranged that mesh with inner diameter splines of clutch plates 741 on the outer peripheral surface, and boss section 7452 of a disk shape, placed on press boss section 7426 of second pressure plate 7422. Here, cylindrical section 7451 is equipped with an attachment piece having a rivet hole (not shown) that extends inside the inner wall on one opening side, and boss section 7452 is attached to the back surface of this attachment piece.

Cylindrical section 7451 shown in FIG. 6 is connected movably in the axial direction in a state in which movement in the rotation direction is regulated by being mortised to first pressure plate 7421 at the open end edge of one end. Specifically, outer diameter splines 7451a arranged on the outer peripheral surface on the open end edge of cylindrical section 7451 mesh with inner diameter splines 7421c arranged along the axial direction of annular projection 7421b projecting toward second pressure plate 7422 from the outer periphery of body 7421a of first pressure plate 7421, so that movement in the circumferential direction is regulated, and movement in the axial direction is not restricted.

The opening at the other end of this cylindrical section 7451 is closed by boss section 7452, and this boss section 7452 is biased toward second pressure plate 7422 by leaf spring 746 from one end of first main shaft 71.

Leaf spring 746 is fixed by stepped nut 747 attached to first main shaft 71 projecting and passing through press boss section 7426 of second pressure plate 7422 inside center hub 745. Inside clutch housing 740, leaf spring 746 presses boss section 7452 (center hub 745) placed separably in the axial direction with respect to second pressure plate 7422 toward second pressure plate 7422 from the stepped nut 747 side.

Boss section 7452 has elongated hole 7453 through which stud 7423 rising from second pressure plate 7422 in the axial direction passes movably in the circumferential direction, and convex follower cam 7454 that engages with concave operating cam 7424 arranged on second pressure plate 7422 disengageably about the axis. A plurality of these elongated holes 7453 and follower cams 7454 are placed at predetermined intervals in the circumferential direction of boss section 7452.

This boss section 7452 is rotatably fitted over press boss hub section 7426b of press boss section 7426 of second pressure plate 7422 attached to an end of first main shaft 71. Also, follower cam 7454 of boss section 7452 in center hub 745 is in an engaged state placed inside operating cam 7424 of press boss section 7426. With boss section 7452 in this state, stud 7423 rising from outer periphery 7426a is inserted into an elongated hole so as to be movable by a predetermined distance in the circumferential direction.

In boss section 7452, follower cam 7454 is provided on the surface opposite press boss section 7426 of second pressure plate 7422 (for convenience, referred to as the "opposing surface"), projecting toward the press boss section 7426 side. Follower cam 7454 is arranged on boss section 7452 so as to engage in the rotation direction with the opposing surface abutting follower cam 7424 when rotating in one direction about the axis, and to rotate with the opposing surface separated from follower cam 7424 when rotating in the other direction.

Figure 8A:
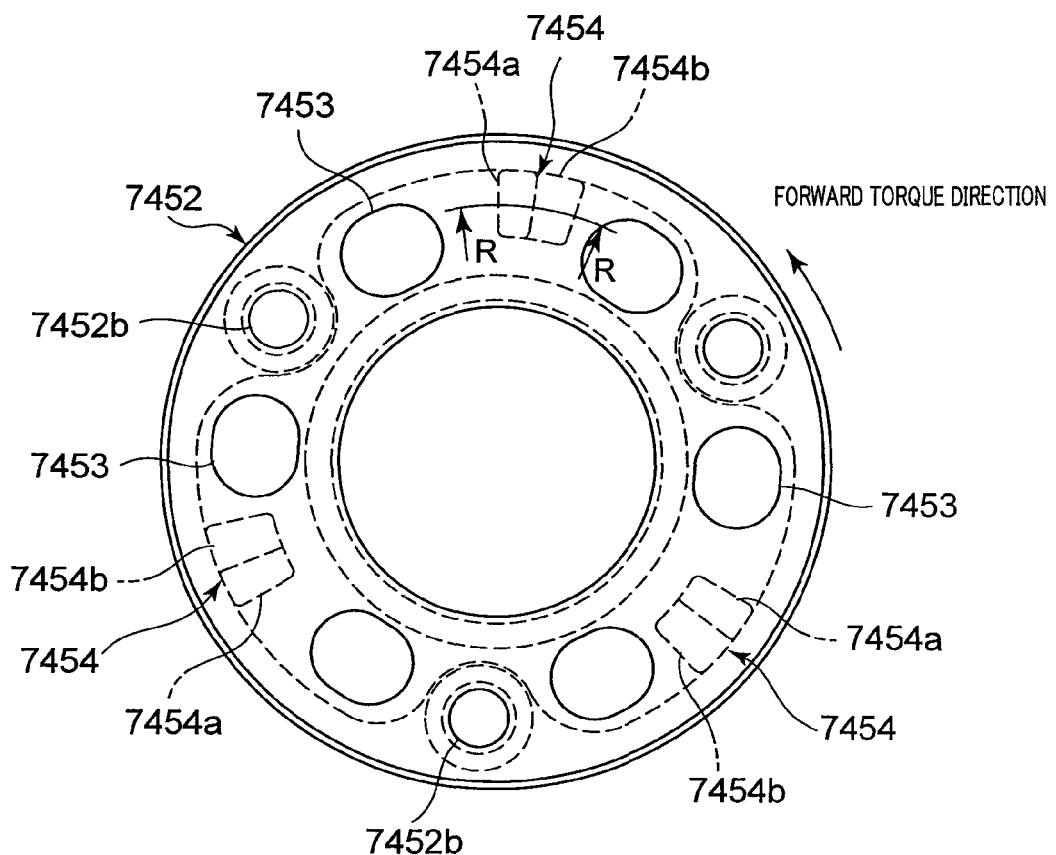
FIGS. 8A and 8B are drawings showing a boss section of a center hub equipped with a follower cam in the first clutch.
Figure 8B:
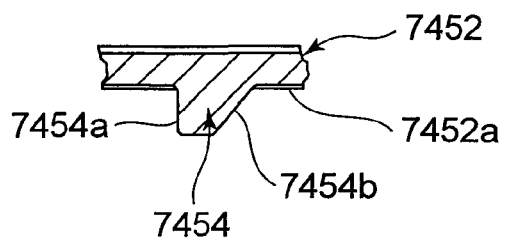

FIG. 8 is a drawing showing boss section 7452 of center hub 745 equipped with follower cam 7454 in first clutch 74, in which FIG. 8A is a drawing of the same boss section 7452 viewed from the opposing surface, that is, from one end of first main shaft 71 (the right side of the vehicle), and FIG. 8B is a partial cross-sectional view through R-R line in FIG. 8A.

As shown in FIG. 8, follower cam 7454 projects from opposing surface 7452a of boss section 7452 suspended inside cylindrical section 7451 in center hub 745. Follower cam 7454 has contact end surface 7454a on the counterclockwise direction side that makes surface contact with operating cam 7424 when output to the rear wheel, which is the driving wheel, by rotation in a counterclockwise direction when viewing the vehicle from the right side, and inclined surface 7454b that is inclined toward the clockwise direction side from the projecting end of contact end surface 7454a. Here, follower cam 7454 preferably has a right-angled trapezium longitudinal shape, with contact end surface 7454a rising perpendicular or substantially perpendicular with respect to opposing surface 7452a, and having inclined surface 7454b inclined toward the opposing surface 7452a side from the periphery of the projection of that contact end surface 7454a.

In boss section 7452 of center hub 745, elongated holes 7453, and rivet holes 7452 joined via rivets to rivet holes (not shown) of an attachment piece extending inward from the inner wall of cylindrical section 7451 (see FIG. 6), are arranged at predetermined intervals around the central opening.

As shown in FIG. 6, with respect to follower cam 7454, operating cam (helical cam) 7424 preferably has a concave shape on the opposing surface of press boss section 7426 facing boss section 7452 of center hub 745 on second pressure plate 7422.

Press boss section 7426 is disk-shaped, and forms second pressure plate 7422 by annular flange 7427 attached around the periphery, and a plurality of studs 7423 attached so as to rise from the top of the opposing surface (see FIG. 6 and FIG. 7).

Figure 9A:
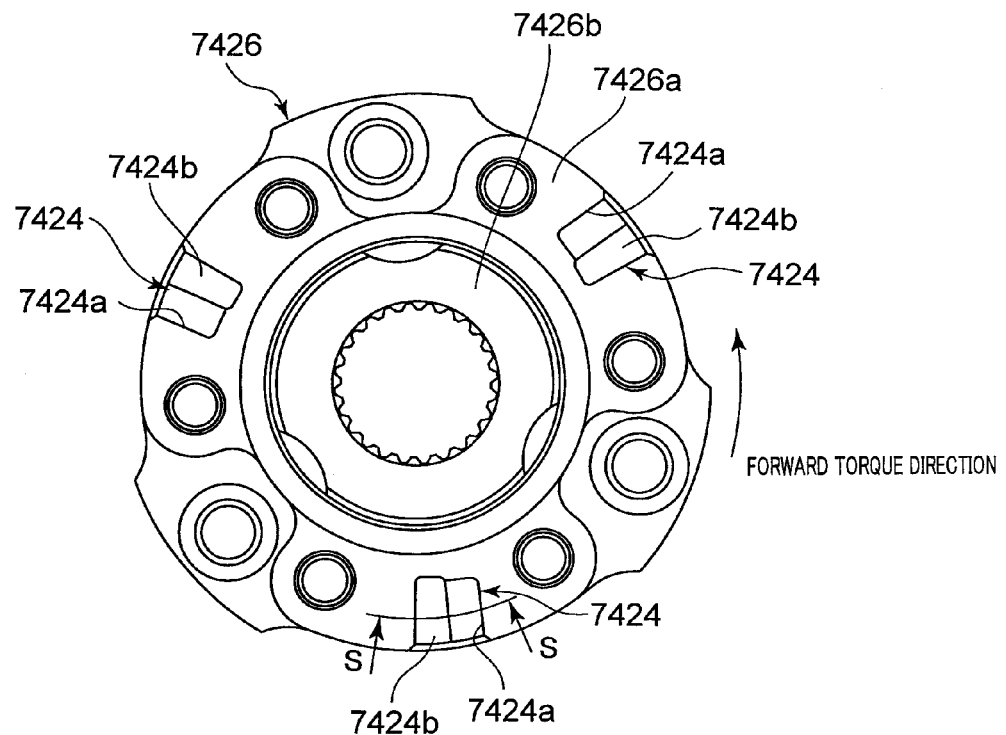
FIGS. 9A and 9B are drawings showing a press boss section of a second pressure plate in the first clutch.
Figure 9B:
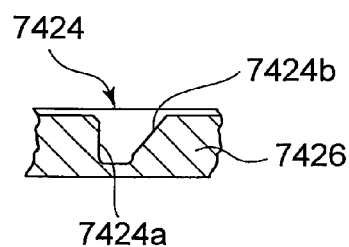

FIG. 9 is a drawing showing press boss section 7426 of second pressure plate 7422 in first clutch 74, in which FIG. 9A is a front view of press boss section 7426 from the opposing surface side, that is, one end of first main shaft 71 (the right side of the vehicle), and FIG. 9B is a partial cross-sectional view through line S-S in FIG. 9A.

Press boss section 7426 shown in FIG. 9 is disk-shaped, and is joined by spline coupling to base end 71a of first main shaft 71 inserted into an opening formed in the center, and rotates integrally and coaxially with first main shaft 71.

Press boss section 7426 has press boss hub section 7426b projecting toward the boss section 7452 side in the center portion around the opening in which first main shaft 71 is inserted in disk-shaped outer periphery 7426a having an opposing surface facing boss section 7452 of center hub 745.

Boss section 7452 of center hub 745 is fitted over this press boss hub section 7426b so as to be movable in the axial direction and in the circumferential direction, and is placed overlapping press boss section 7426 in the axial direction. At this time, convex follower cam 7454 provided on boss section 7452 of center hub 745 fits disengageably inside concave operating cam 7424 arranged on the opposing surface of outer periphery 7426a on press boss section 7426.

Operating cam 7424 corresponds to the shape of follower cam 7454 from the opposing surface, and preferably has a concave shape having vertical end surface 7424a parallel or substantially parallel to the axial direction and perpendicular or substantially perpendicular to the opposing surface, and inclined surface 7424b that is inclined in the circumferential direction.

Operating cam 7424 on second pressure plate 7422 and follower cam 7454 on center hub 745 are arranged so as to engage by rotating in one direction around the axis about the axial center of first main shaft 71, and to disengage through rotation in the other direction around the axis.

Specifically, operating cam 7424 and follower cam 7454 have inclined surfaces 7424b and 7425b that slide against each other formed as surfaces inclined helically about the axial center.

Here, "the other direction around the axis" means the opposite direction to the forward torque direction in which torque is transferred from crankshaft 60 via first clutch 74 and drives the rear wheel. Therefore, "the other direction around the axis" in first clutch 74 here is a clockwise direction, opposite to the counterclockwise direction in which forward torque is transferred to drive shaft 73 as viewed from the right side of the vehicle through rotation of first main shaft 71.

Also, as viewed from the left side of the vehicle, "the other direction around the axis" in second clutch 75 is a counterclockwise direction, opposite to the clockwise direction in which forward torque is transferred to drive shaft 73 through rotation of second main shaft 72.

Figure 10:
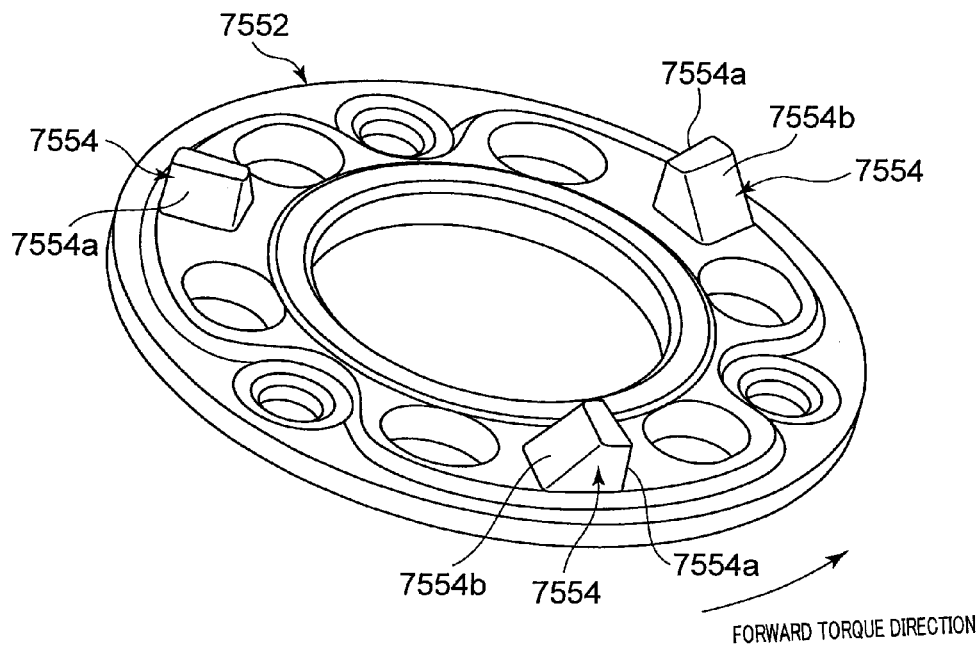
FIG. 10 is a perspective view showing a boss section of a center hub in the second clutch, viewed from the opposite surface side.
Figure 11:
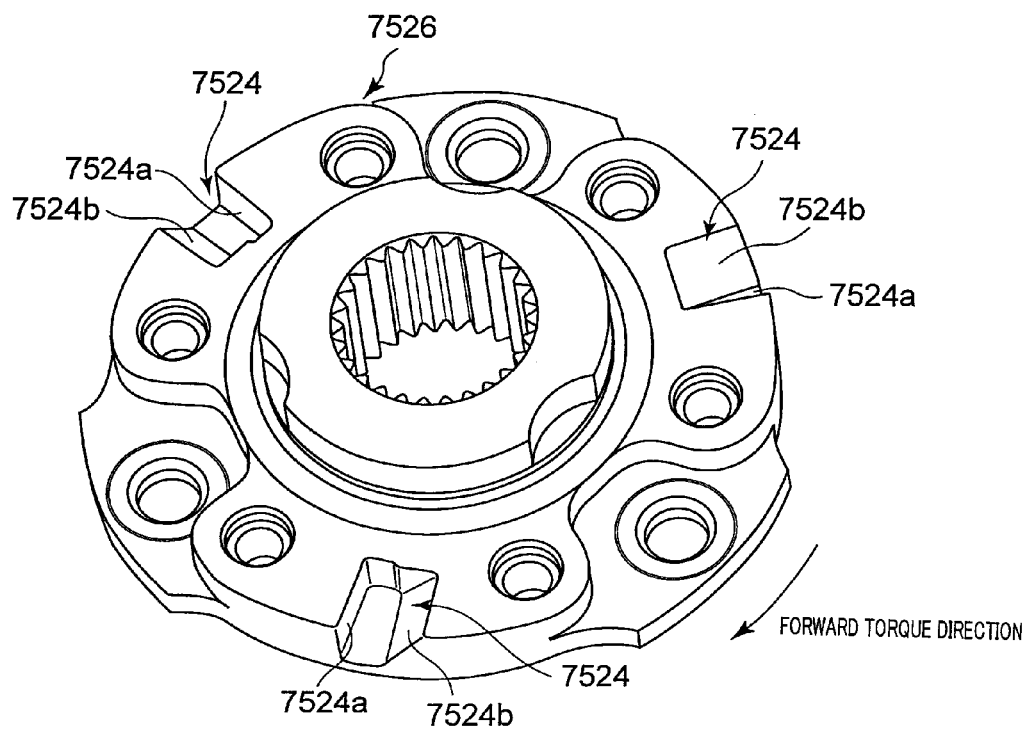
FIG. 11 is a drawing of a press boss section of a second pressure plate located opposite a boss section of a center hub in the second clutch, viewed from the opposite surface side.

Consequently, with second clutch 75 that has a mirror-symmetric structure with respect to first clutch 74, boss section 7552 of center hub 755 shown in FIG. 10 and press boss section 7526 of the second pressure plate shown in FIG. 11 fit rotatably about the base end 72a side of second main shaft 72.

That is to say, with second clutch 75, convex follower cam 7554 and concave operating cam 7524 are located on opposing surfaces of boss section 7552 shown in FIG. 10 and press boss section 7526 shown in FIG. 11. Follower cam 7554 and operating cam 7524 are formed so that, rotating relatively about the axial center of second main shaft 72, the respective opposing surfaces engage with each other in one direction around the axis (the clockwise direction), and disengage from each other in the other direction around the axis (the counterclockwise direction), as viewed from the left side of the vehicle.

Specifically, operating cam 7524 and follower cam 7554 have contact end surfaces 7524a and 7554a that are placed on a flat surface passing through the axial center at the clockwise-side end as viewed from the left side of the vehicle, and make surface contact and engage with each other when rotating relatively. Also, operating cam 7524 and follower cam 7554 have inclined surfaces 7524b and 7554b that are inclined helically about the axial center, and through the sliding against each other of these inclined surfaces 7524b and 7554b, boss section 7552 is distanced from press boss section 7526 in the axial direction.

By the operation of these operating cams and follower cams rotating relatively and coaxially, the clutches restrict back torque.

FIG. 12 is a schematic diagram showing the relationship between an operating cam of a press boss section and a follower cam of a boss section as viewed from the axial center side. Here, a description will be given using an operating cam of a press boss section and a follower cam of a boss section in the first clutch.

When torque is transferred from crankshaft 60 via first input gear 40 while operating cam 7424 and follower cam 7454 are engaged, in clutch 74 boss section 7452 of center hub 745 rotates in one direction that is the Z direction in which torque is applied (the counterclockwise direction of the main shaft as viewed from the right side of the vehicle). At this time, as shown in FIG. 12A, press boss section 7426 is pressed in the Z direction via follower cam 7454 and operating cam 7424, moves in that direction, and rotates first main shaft 71 in the Z direction.

Also, with this configuration, if a larger force than the torque rotating in the Z direction transferred from boss section 7452 of center hub 745 is applied to press boss section 7426 so that rotation is performed in the other direction around the axis, boss section 7452 slides over the inclined surface of operating cam 7424 as shown in FIG. 12B. As a result, boss section 7452 moves in a −Z direction with respect to operating cam 7424.

Then follower cam 7454 of boss section 7452 is distanced from operating cam 7424 of press boss section 7426, as shown in FIG. 12C, by sliding farther over the inclined surface of operating cam 7424. As a result of this structure and arrangement, center hub 745 itself moves axially in a direction that distances it from second pressure plate 7422 (toward the base end of first main shaft 71).

Power is taken from the base end of crankshaft 60 via first clutch 74 and second clutch 75 configured in this way, is transferred selectively to first main shaft 71 and second main shaft 72, and is output to rear wheel 12 (see FIG. 1) from drive shaft 73.

Next, the operation of back torque limiters in clutches 74 and 75 having operating cams 7424 and follower cams 7454 will be described.

This description is based on a view from the right side of the vehicle, so that when forward torque is applied and normal drive is performed in the drive unit having clutches 74 and 75, crankshaft 60 rotates clockwise ("CW") as indicated by the arrow X direction as shown in FIG. 13. Also, the main shafts (first and second main shafts 71 and 72) rotate counterclockwise ("CCW") as indicated by arrow Z, and drive shaft 73 rotates clockwise (CW) as indicated by arrow X.

In the drive unit, of the torque generated by the engine and transferred to clutches 74 and 75, torque that transfers power to drive shaft 73 and that is applied in a direction that rotates rear wheel 12 in the running direction is designated forward torque for clutch 74 for first main shaft 71, and torque applied in the opposite direction to this forward torque is designated reverse torque.

When Forward Torque is Applied to a Clutch

When forward torque is applied, it is assumed, for example, that crankshaft 60 rotates clockwise (in the X direction), the main shaft rotates in the Z direction, and drive shaft 73 rotates in the X direction.

That is to say, power from crankshaft 60 rotating in CW direction X through engine drive is input to clutch housing 740 via first input gear 40, and clutch housing 740 rotates in CCW direction Z about the axial center of first main shaft 71.

When clutch housing 740 rotates in the Z direction, friction plates 744 meshed with inner diameter splines of clutch housing 740 also rotate integrally. Between friction plates 744 are sandwiched a plurality of clutch plates 741 meshed with the outer diameter of center hub 745 by inner diameter splines.

When clutch connection is performed, first pressure plate 7421 is pressed toward second pressure plate 7422 by the force clutch spring 743 tries extend. Consequently, through this pressure, friction plates 744 and clutch plates 741 are pressed toward second pressure plate 7422, pressure operates mutually between friction plates 744 and clutch plates 741, and frictional force is generated.

Through this configuration, when friction plates 744 rotate, center hub 745 rotates via clutch plates 741.

Also, torque from engine crankshaft (crankshaft) 60 is transferred to center hub 745, with torque (that is, a clutch transfer torque capacity) of a magnitude obtained by multiplication of frictional force generated between friction plates 744 and clutch plates 741 and the effective contact perimeter between friction plates 744 and clutch plates 741 (that is, the distance from the approximate center of the contact width to the center of first main shaft 71), as an upper limit.

Cam concavities and convexities are combined on second pressure plate 7422, and center hub 745 is fitted thereto so as to be movable in the axial direction by engagement and disengagement thereof. Specifically, back torque limiter cams (here, concave operating cam 7424 and convex follower cam 7454) are provided on the respective opposing surfaces of boss section 7452 of center hub 745 and press boss section 7426 on second pressure plate 7422. These back torque limiter cams (here, concave operating cam 7424 and convex follower cam 7454) each have one surface formed as a surface approximately parallel or substantially parallel to the center axis of first main shaft 71, and the other surface formed as an approximately helical surface.

In concave operating cam 7424 and convex follower cam 7454, these "one surfaces" are formed on the drive direction Z end of first main shaft 71, and the "other surfaces" are formed so as to incline toward the reverse Z direction side from the "one surface" side.

Consequently, during engine drive, when clutch housing 740, friction plates 744, clutch plates 741, and center hub 745 are transferring torque in the direction (Z direction) for driving second pressure plate 7422 and first main shaft 71, torque is transferred from center hub 745 to press boss section 7426 of second pressure plate 7422 via a surface approximately parallel or substantially parallel to the center axis of cam convexity/concavity first main shaft 71.

Press boss section 7426 of second pressure plate 7422 meshes with outer diameter splines of first main shaft 71 via inner diameter splines formed on an inner peripheral surface forming an opening. Consequently, torque acting on press boss section 7426 of second pressure plate 7422 is transferred to first main shaft 71, the torque is transferred to drive shaft 73 via one of the gears on first main shaft 71 (fixed gear 711, fifth gear 85, and spline gear 712 on first main shaft 71), and driving force is output.

Thus, first clutch 74 has clutch housing 740 coupled to crankshaft 60 in a rotatable fashion via first input gear 40, a clutch hub section (second pressure plate 7422 and center hub 745) coupled rotatably and coaxially to first main shaft 71 and placed inside clutch housing 740, friction plates 744 and clutch plates 741 alternately interposed between clutch housing 740 and the clutch hub section, first pressure plate (pressure plate section) 7421 that presses friction plate 744 in the axial direction and connects friction plates 744 and clutch plates 741, and clutch spring (biasing member) 743 that presses first pressure plate 7421 toward the friction plate 744 side. Also, the clutch hub section is equipped with press boss section (clutch boss section) 7426 of second pressure plate 7422 directly coupled to first main shaft 71, and center hub 745 that supports clutch plates 741 and is also movable in the axial direction, and relatively rotatable, with respect to press boss section 7426.

A back torque limiter is equipped with operating cam (concave section) 7424 formed as a concavity in the axial direction in one of mutually opposing surfaces in press boss section 7426 and center hub 745, follower cam (convex section) 7454 formed projecting in the axial direction on the other surface, and leaf spring (limiting biasing member) 746.

With regard to operating cam (concave section) 7424, a surface on the opposite side in the circumferential direction to the direction in which forward torque that drives rear wheel 12 is applied, is a helical cam surface centered about the rotation center. Follower cam (convex section) 7454 is formed in correspondence to the shape of concave operating cam (concave section) 7424. When press boss section 7426 rotates relatively in the rotational direction of center hub 745 with respect to center hub 745, follower cam (convex section) 7454 disengages the clutch by moving center hub 745 toward the first pressure plate 7421 side.

Also, leaf spring 746 presses center hub 745 toward press boss section 7426, and when reverse torque acting on press boss section 7426 is less than or equal to a predetermined level, follower cam (convex section) 7454 is engaged mutually with operating cam 7424 (concave section) and relative rotation with respect to center hub 745 is disabled, and when reverse torque exceeds predetermined torque, follower cam (convex section) 7454 is made to slide across the cam surface of operating cam 7424 (concave section), and press boss section 7426 and center hub 745 are relatively rotated.

When Reverse Torque is Applied to a Clutch

Here, reverse torque means such torque that makes torque input from engine 6 (see FIG. 1) to clutch housing 740, friction plates 744, clutch plates 741, and center hub 745 via first input gear 40 be in a deceleration direction (the opposite direction to that indicated by arrow Z).

Reverse torque is generated when, in the configuration of the drive unit that takes power from both ends of crankshaft 60 placed horizontally to left and right, left and right clutches 74 and 75 are both connected while power transfer gears on both the left and right are meshed enabling transfer of power in a shift change or the like, and torque is applied to both clutches. Normally, with transmission mechanism 700 of the drive unit, control is performed by ECU 10 so that a shift change is performed instantaneously by switching from one clutch to the other, and therefore there are no effects due to reverse torque. However, if control by ECU 10 is not performed for some reason at the time of a shift change, torque in the reverse of the rotation direction may be applied to one clutch taking power from one of the two ends of crankshaft 60, via crankshaft 60 and drive shaft 73, from the power transfer having the other clutch.

Here, a case will be described in which reverse torque is applied from one clutch (here, first clutch 74) in the power transfer having the other clutch (for example, second clutch 75 with respect to first clutch 74).

FIG. 13 is a drawing provided to explain a back torque limiting operation in transmission mechanism 701 according to a preferred embodiment of the present invention, being a schematic diagram showing an axis arrangement of a crankshaft, main shaft, and drive shaft in a transmission with shift mechanism 701 according to this preferred embodiment, viewed from the right side of the vehicle. When the vehicle is moving forward (running in the normal forward direction) crankshaft 60, first main shaft 71, and drive shaft 73 in FIG. 13 rotate in the X direction, in the Z direction, and in the X direction, respectively. Also, as stated above, when the vehicle is moving forward, that is, when running in the normal forward direction, reverse torque acts on first clutch 74.

With first clutch 74 in this state (see FIG. 6), reverse torque is transferred to center hub 745 from press boss section 7426 of second pressure plate 7422 via an approximately helical surface centered on the center axis of first main shaft 71 that is the other surface that slides in operating cam 7424 and follower cam 7454. That is to say, when reverse torque is transferred in the order drive shaft 73, first main shaft 71, second pressure plate 7422, follower cam 7454 of center hub 745 moves so as to swell in a helical shape along operating cam 7424 of second pressure plate 7422 due to reverse torque. When follower cam 7454 moves along operating cam 7424 in this way, press boss section 7426 of second pressure plate 7422 and center hub 745 move so as to become distanced from each other on the axis line of first main shaft 71 (see FIG. 12).

That is to say, boss section 7452 of center hub 745 having follower cam 7454 rotates about first main shaft 71 and moves toward first pressure plate 7421 in the axial direction of first main shaft 71.

Boss section 7452 of center hub 745 is biased in a direction in which a projection (convexity) of follower cam 7454 is accommodated by a depression (concavity) of operating cam (helical cam) 7424, that is, a direction in which center hub 745 is restrained toward the second pressure plate 7422 side, by leaf spring 746 via nut 747.

Consequently, in clutch 74 prior to the operation of the back torque limiter, center hub 745 continues rotating in the R direction from operating cam (helical cam) 7424 and swells until the R direction component (see FIG. 6) of resistance arising at the other surface (helical cam surface) due to reverse torque, and the pressing force of leaf spring 746, are in balance.

Until one end surface (the opening-side end surface of the cylindrical shape) of center hub 745 that swells in this way reaches first pressure plate 7421, reverse torque is transferred successively to crankshaft 60, that is, engine 6 (see FIG. 1), from drive shaft 73 via first main shaft 71, press boss section 7426 of second pressure plate 7422, and the helical cam surfaces of operating cam 7424 and follower cam 7454, and via plurality of friction plates 754, clutch plates 741, friction plates 744, clutch housing 740, and first input gear 40.

When reverse torque further increases, the limiter in clutch 74 operates.

Specifically, when reverse torque further increases, and the end surface (the opening-side end surface of the cylindrical section) of center hub 745 reaches first pressure plate 7421, center hub 745 continues rotating and swells the helical cam surface in the R direction up to a position at which the R direction component of resistance arising at the helical cam surface due to reverse torque, and the resultant force of pressing force of clutch spring 743 added to the bias of leaf spring 746, are in balance.

As a result of this structure and arrangement, the pressing force of clutch spring 743 pressing friction plates 744 and clutch plates 741 against second pressure plate 7422 via first pressure plate 7421 is decreased. Thus, frictional force operating between friction plates 744 and clutch plates 741 is reduced, and the transfer torque capacity of the clutch decreases. At this time, clutch 74 continues reverse torque transfer within a range in which the magnitude of the reverse torque is less than the transfer torque capacity of the clutch for which the pressing force of clutch spring 743 has been reduced. On the other hand, when the magnitude of the reverse torque exceeds the transfer torque capacity of the clutch for which the pressing force of clutch spring 743 has been reduced, friction plates 744 and clutch plates 741 rotate relatively, that is, the clutch slips and reverse torque transfer is limited.

As a result of this structure and arrangement, the clutch transfer torque capacity with respect to reverse torque attains its upper limit while the clutch is slipping, and greater reverse torque than that is not transferred.

Thus, if a predetermined capacity is exceeded when reverse torque is applied to a clutch, the transfer torque capacity with respect to reverse torque can be limited by the operation of a back torque limiter whereby first pressure plate 7421 and clutch plates 741 slip with respect to friction plates 744.

In a recovery from this back torque limiter operation, when reverse torque diminishes or when a transition is made to a forward torque state as a result of operating the throttle of engine 6 (see FIG. 1), a change in the rotation speed of drive shaft 73, operating the clutch actuator (78) that operates the other clutch (for example, second clutch 75) or shift mechanism 701, or the like, center hub 745 is pressed back by leaf spring 746 in a direction opposite to the R direction along the inclined surface of the helical cam.

That is to say, center hub 745 moves toward the second pressure plate 7422, the reduced pressing force due to clutch spring 743 is restored, and the transfer torque capacity of first clutch 74 recovers. At this time, mutual boss section cam surfaces 7454b and 7424b or 7454a and 7424a engage, and a state in which torque is transferred by these engaging surfaces is restored.

Through selective connection of first and second clutches 74 and 75 to first and second main shafts 71 and respectively configured in this way, transmission mechanism 700 performs power transfer for odd-numbered gears and even-numbered gears. Gear shifting of transmission gears in transmission mechanism 700 is performed by an operation of shift mechanism 701 controlled by ECU 10 together with transmission mechanism 700.

A description will now be given of the gears that connect first main shaft 71 and second main shaft 72 that output engine power, and drive shaft 73, by selective connection of a clutch having a back torque limiter in this way.

As shown in FIG. 2 through FIG. 4, gears 711, 721, 85, 86, 712, and 722 that mesh with gears 81, 82, 731, 732, 83, and 84 of drive shaft 73 are placed on first main shaft 71 and second main shaft 72 respectively.

Specifically, the following gears are arranged on first main shaft 71 in order from the base end to which first clutch 74 is connected: fixed gear (also referred to as "first-equivalent gear") 711, fifth gear 85, and spline gear (also referred to as "third-equivalent gear") 712. Fixed gear 711 is formed integrally with first main shaft 71, and rotates together with first main shaft 71. Fixed gear 711 meshes with first gear 81 of drive shaft 73, and therefore is also referred to as "first-equivalent gear."

Fifth gear 85 is attached to first main shaft 71, so as to be rotatable about the axis of first main shaft 71 and with its movement regulated in the axial direction, at a position between and at a distance from first-gear fixed gear 711 and third-gear spline gear 712.

Fifth gear 85 meshes with spline gear 731 (also referred to as "fifth-equivalent gear") of drive shaft 73.

Spline gear 712 is attached to first main shaft 71 at the front end of first main shaft 71, that is, at the distant end from first clutch 74, so as to be movable in the axial direction, and rotates together with the rotation of first main shaft 71.

Specifically, spline gear 712 is attached to first main shaft 71, so as to be able to slide in the axial direction while its rotation is regulated, by splines formed along the axial direction on the outer periphery of the front end of first main shaft 71, and meshes with third gear 83 of drive shaft 73. This spline gear 712 is coupled to shift fork 142, and moves on first main shaft 71 in the axial direction through movement of shift fork 142. Spline gear 712 is also referred to here as "third-equivalent gear."

Spline gear 712 moves toward fifth gear 85 on first main shaft 71 and engages with fifth gear 85, and regulates rotation (idling) about the axis of fifth gear on first main shaft 71. Through the engagement of spline gear 712 with fifth gear 85, fifth gear 85 is fixed to first main shaft 71, and is made integrally rotatable together with the rotation of first main shaft 71.

On the other hand, the following gears are arranged on second main shaft 72 in order from the base end to which second clutch 75 is connected: fixed gear (also referred to as "second-equivalent gear") 721, sixth gear 86, and spline gear (also referred to as "fourth-equivalent gear") 722.

Fixed gear 721 is formed integrally with second main shaft 72, and rotates together with second main shaft 72.

Fixed gear 721 meshes with second gear 82 of drive shaft 73, and therefore is also referred to as "second-equivalent gear."

Sixth gear 86 is attached to second main shaft 72, so as to be rotatable about the axis of second main shaft 72 and with its movement regulated in the axial direction, at a position between and at a distance from second-gear fixed gear 721 and fourth-gear spline gear 722. This sixth gear 86 meshes with spline gear 732 (also referred to as "sixth-equivalent gear") of drive shaft 73.

Spline gear (fourth-equivalent gear) 722 is attached to second main shaft 72 at the front end of second main shaft 72, that is, at the distant end from second clutch 75, so as to be movable in the axial direction, and rotates together with the rotation of second main shaft 72.

Specifically, spline gear 722 is attached to second main shaft 72, so as to be able to slide in the axial direction while its rotation with respect to second main shaft 72 is regulated, by splines formed along the axial direction on the outer periphery of the front end of second main shaft 72, and meshes with fourth gear 84 of drive shaft 73. This spline gear 722 is coupled to shift fork 143, and moves on second main shaft 72 in the axial direction through movement of shift fork 143.

Spline gear 722 moves toward sixth gear 86 on second main shaft 72 and engages with sixth gear 86, and regulates rotation (idling) about the axis of sixth gear on second main shaft 72. Through the engagement of spline gear 722 with sixth gear 86, sixth gear 86 is fixed to second main shaft 72, and is made integrally rotatable together with the rotation of second main shaft 72.

Meanwhile, the following gears are arranged on drive shaft 73 in order from the first clutch 74 side: first gear 81, spline gear (fifth-equivalent gear) 731, third gear 83, fourth gear 84, spline gear (sixth-equivalent gear) 732, second gear 82, and sprocket 76.

On drive shaft 73, first gear 81, third gear 83, fourth gear 84, and second gear 82 are provided rotatably about drive shaft 73 in a state in which their movement in the axial direction of drive shaft 73 is inhibited.

Spline gear (fifth-equivalent gear) 731 is attached to drive shaft 73 so as to be able to slide in the axial direction while its rotation is regulated by spline engagement. That is to say, spline gear 731 is attached so as to be movable in a sliding direction with respect to drive shaft 73, and also rotates together with drive shaft 73. This spline gear 731 is coupled to shift fork 141, and moves on drive shaft 73 in the axial direction through the movement of shift fork 141.

Spline gear (sixth-equivalent gear) 732 is attached to drive shaft 73 so as to be able to slide in the axial direction while its rotation is regulated by spline engagement. That is to say, spline gear (sixth-equivalent gear) 732 is attached so as to be movable in a sliding direction with respect to drive shaft 73, and also rotates together with drive shaft 73. This spline gear 732 is coupled to shift fork 144, and moves on drive shaft 73 in the axial direction through the movement of shift fork 144.

Sprocket 76, which rotates integrally together with the rotation of drive shaft 73, is provided at one end of drive shaft 73, here, the end located on the second clutch 75 side, and chain 13 in FIG. 1 is attached to sprocket 76.

These spline gears 712, 722, 731, and 732 function as transmission gears, and also function as dog selectors. Spline gears 712, 722, 731, and 732 are coupled by a dog mechanism to respective transmission gears (first gear 81 through sixth gear 86) that are adjacent in the axial direction by moving in the axial direction. That is to say, mutually fitting concave and convex portions are formed on mutually opposing surfaces of spline gears 712, 722, 731, and 732 and transmission gears adjacent in the axial direction, and both gears rotate integrally through the fitting together of the concave and convex sections.

A description will now be given of the gear positions from first gear through sixth gear with gears 711, 721, 85, 86, 712, and 722 placed on first and second main shafts 71 and 72 and gears 81, 82, 731, 732, 83, and placed on drive shaft 73.

In the first gear position, spline gear (third-equivalent gear) 712 on first main shaft 71 is distanced from fifth gear 85, and meshes with third gear on drive shaft 73. Also, spline gear (fifth-equivalent gear) 731 on drive shaft 73 moves toward first gear 81 and is distanced from third gear 83, and fits together and coupled with first gear 81. As a result of this structure and arrangement, first gear 81 is placed in a state in which it is fixed integrally to drive shaft 73 via spline gear 731. At this time, third gear 83 meshing with spline gear 712 of first main shaft 71 and fifth gear 85 meshing with spline gear 731 of drive shaft 73 enter a state in which they idle about the respective axes.

In the second gear position, spline gear (fourth-equivalent gear) 722 on second main shaft 72 is distanced from sixth gear 86, and meshes with fourth gear on drive shaft 73. Also, spline gear (sixth-equivalent gear) 732 on drive shaft 73 moves toward second gear 82 and is distanced from fourth gear 84, and fits together and coupled with second gear 82. As a result of this structure and arrangement, second gear 82 is placed in a state in which it is fixed integrally to drive shaft 73 via spline gear 732. At this time, fourth gear 84 meshing with spline gear 722 of second main shaft 72 and sixth gear 86 meshing with spline gear 732 of drive shaft 73 enter a state in which they idle about the respective axes.

In the third gear position, spline gear (third-equivalent gear) 712 on first main shaft 71 is distanced from fifth gear 85, and meshes with third gear on drive shaft 73. Also, spline gear (fifth-equivalent gear) 731 on drive shaft 73 moves toward third gear 83 and is distanced from first gear 81, and fits together and is coupled with third gear 83. As a result of this structure and arrangement, third gear 83 is placed in a state in which it is fixed integrally to drive shaft 73 via spline gear 731. At this time, first gear 81 meshing with fixed gear 711 of first main shaft 71 and fifth gear 85 meshing with spline gear 731 of drive shaft 73 enter a state in which they idle about the respective axes.

In the fourth gear position, spline gear (fourth-equivalent gear) 722 on second main shaft 72 is distanced from sixth gear 86, and meshes with fourth gear on drive shaft 73. Also, spline gear (sixth-equivalent gear) 732 on drive shaft 73 moves toward fourth gear 84 and is distanced from second gear 82, and fits together and is coupled with fourth gear 84. As a result of this structure and arrangement, fourth gear 84 is placed in a state in which it is fixed integrally to drive shaft 73 via spline gear 732. At this time, second gear 82 meshing with fixed gear 721 of second main shaft 72 and sixth gear 86 meshing with spline gear 732 of drive shaft 73 enter a state in which they idle about the respective axes.

In the fifth gear position, spline gear (third-equivalent gear) 712 on first main shaft 71 moves toward fifth gear 85 and is coupled by fitting together with fifth gear 85, and that fifth gear 85 is placed in a state in which it is fixed integrally to the first main shaft via spline gear 712. Also, spline gear (fifth-equivalent gear) 731 on drive shaft 73 is distanced from both first gear 81 and third gear 83, and meshes with fifth gear 85 at a position at which it is not coupled to either. At this time, first gear 81 and third gear 83 on drive shaft 73 meshing with fixed gear 711 and spline gear 712 of first main shaft 71 enter a state in which they idle about the axis of drive shaft 73.

In the sixth gear position, spline gear (fourth-equivalent gear) 722 on second main shaft 72 moves toward sixth gear 86 and is coupled by fitting together with sixth gear 86, and that sixth gear 86 is placed in a state in which it is fixed integrally to second main shaft 72 via spline gear 722. Also, spline gear 732 on drive shaft 73 is distanced from both second gear 82 and fourth gear 84, and meshes with sixth gear 86 at a position at which it is not coupled to either. At this time, second gear 82 and fourth gear 84 on drive shaft 73 meshing with fixed gear 721 and spline gear 722 of second main shaft 72 enter a state in which they idle about the axis of drive shaft 73.

Thus, gear shifting is performed in transmission by having spline gears 712, 722, 731, and 732 of transmission mechanism 700 moved as appropriate in the axial direction by shift forks 141 through 144.

Next, a description will be given of shift mechanism 701 that performs gear shifting by moving spline gears 712, 722, 731, and 732 of transmission mechanism 700 in the axial direction via shift forks 141 through 144.

(2-2) Shift Mechanism of Transmission

Shift mechanism 701 shown in FIG. 2 has elongated shift forks 141 through 144 coupled to spline gears 731, 712, 722, and 732 at the front end, cylindrical shift cam that has its rotation axis placed parallel or substantially parallel to first and second main shafts 71 and 72 and drive shaft 73, and moves shift forks 141 through 144 in the axial direction of that rotation axis by rotating, shift cam drive unit 800 that provides rotational driving of shift cam 14, motor 8, and drive mechanism 41 that couples motor 8 to shift cam drive unit 800 and transfers the driving force of motor 8.

Shift forks 141 through 144 are installed between spline gears 731, 712, 722, and 732 and shift cam 14, and are placed distanced from each other in the axial direction of first and second main shafts 71 and 72, drive shaft 73, and shift cam 14. These shift forks 141 through 144 are arranged so as to be parallel or substantially parallel to each other, and are each placed movably in the axial direction of the rotation axis of shift cam 14.

Shift forks 141 through 144 have pin sections at the base end, placed so as to be movable respectively within four cam grooves 14a through 14d formed in the outer periphery of shift cam 14. That is to say, shift forks 141 through 144 are follower members of shift cam 14, which is the driving source, and slide in the axial direction of first and second main shafts 71 and 72 and drive shaft 73 in accordance with the shape of cam grooves 14a through 14d of shift cam 14. By this sliding movement, spline gears 731, 712, 722, and 732 coupled to the front end each move in the axial direction on shafts passing through the respective inner diameters.

Shift cam 14 is rotated by the driving force of motor 8 transferred to shift cam drive unit 800 via drive mechanism 41, and through this rotation, at least one of shift forks 141 through 144 is moved in accordance with the shape of cam grooves 14a through 14d.

Figure 14:
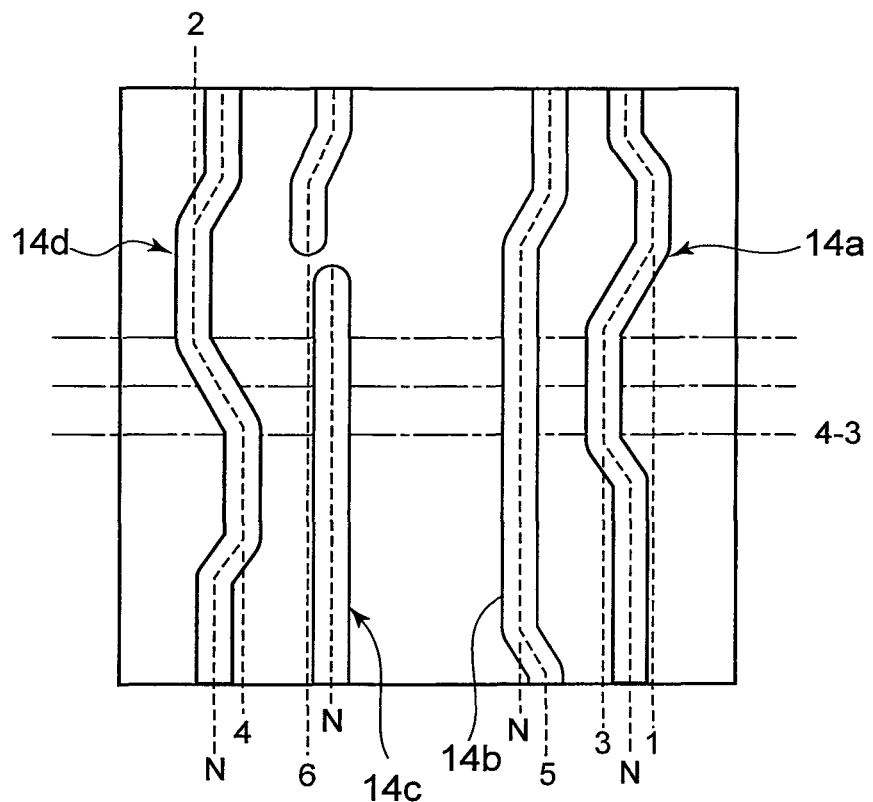
FIG. 14 is a development view of cam grooves of a shift cam in a shift mechanism according to a preferred embodiment.

FIG. 14 is a development view of cam grooves in shift cam 14 in shift mechanism 701 according to this preferred embodiment. Reference codes 1 through 6 and N in FIG. 14 indicate the centers of positions in the axial direction of the rotation axis of shift cam 14 of pin sections in shift forks 141 through 144 that slide inside the cam grooves of the shift cam corresponding to first through sixth gear and N (neutral) gear positions.

By shift forks 141 through 144 that move in response to the rotation of shift cam 14 having cam grooves 14a through 14d, a spline gear coupled to a moved shift fork moves, and a gear shift of transmission 7 (transmission mechanism 700) is performed. Details of shift cam drive unit 800 will be given later herein.

In this preferred embodiment, when the rider depresses the shift-up button or shift-down button of shift switch 15, a signal indicating that fact (hereinafter referred to as a "shift signal") is output from shift switch 15 to ECU 10. Based on the input shift signal, ECU 10 controls first and second clutch actuators 77 and 78 and motor 8. By this control, either first clutch 74 or second clutch 75, or both first and second clutches 74 and 75, is/are disengaged, shift cam 14 rotates, and a gear shift in transmission 7 (transmission mechanism 700) is performed. A shift operation in transmission 7 of a motorcycle is described below.

(2-2-1) Shift Operations

In this preferred embodiment, transmission mechanism 700 has a neutral position and first through sixth gear positions. Based on an above-described shift signal, ECU 10 sets the gear position in transmission mechanism 700 to one from among neutral position and first through sixth gear positions. The gear ratio (gear reduction ratio) in transmission mechanism 700 is largest for first gear, and decreases successively for second gear, third gear, fourth gear, fifth gear, and sixth gear.

In this preferred embodiment, also, a gear position of transmission mechanism 700 in which transfer of torque from first and second main shafts 71 and 72 to drive shaft 73 is blocked is referred to as a "transmission mechanism 700 neutral position."

Furthermore, a gear position of transmission mechanism 700 in which torque of crankshaft 60 is transferred to drive shaft 73 via first gear 81 is referred to as "first gear," and a gear position of transmission mechanism 700 in which torque of crankshaft is transferred to drive shaft 73 via second gear 82 is referred to as "second gear." Similarly, gear positions of transmission mechanism 700 in which torque of crankshaft 60 is transferred to drive shaft 73 via third gear 83, fourth gear 84, fifth gear 85, and sixth gear 86 are referred to as "third gear," "fourth gear," "fifth gear," and "sixth gear," respectively.

A gear position of an odd-numbered gear group in which transfer of torque between first main shaft 71 and drive shaft 73 is blocked is referred to as an "odd-numbered gear group neutral position," and a gear position of an even-numbered gear group in which transfer of torque between second main shaft 72 and drive shaft is blocked is referred to as an "even-numbered gear group neutral position."

Therefore, in this preferred embodiment, when the odd-numbered gear group and even-numbered gear group gear positions are both neutral positions, the gear position of transmission mechanism 700 becomes the neutral position. The gear position of transmission mechanism 700 shown in FIG. 2 is the neutral position.

Shift operations in transmission 7 will now be described in detail using accompanying drawings. Shift operations are performed in the same order in an up-shift and a down-shift.

FIG. 15 is a table showing the states of first clutch 74, second clutch 75, shift cam 14, and first gear through sixth gear 86 in each gear position of transmission mechanism 700 shown in FIG. 2.

In FIG. 15, the "Gear Position" column shows the gear position of transmission mechanism 700, and the "Standard State" column shows the state of first clutch 74, second clutch 75, shift cam 14, odd-numbered gears, and even-numbered gears at the finishing point (starting point) of a shift operation by ECU 10. Therefore, when shift switch 15 (FIG. 1) is operated by the rider, first clutch 74, second clutch 75, shift cam 14, odd-numbered gears, and even-numbered gears are held in the standard state of one of the gear positions. In FIG. 15, the standard state of each gear position is indicated by a "o" symbol in the "Standard State" column.

In FIG. 15, "a" in the "First Clutch" or "Second Clutch" column indicates that first clutch 74 or second clutch 75 is connected, "x" indicates that first clutch 74 or second clutch 75 is disengaged, and "Δ" indicates that first clutch 74 or second clutch 75 is in a half-clutch state.

In FIG. 15, "N" in the "Odd-Numbered Gear" or "Even-Numbered Gear" column indicates that the odd-numbered gear group or even-numbered gear group is in the neutral position.

In FIG. 15, "1" in the "Odd-Numbered Gear" column indicates a state in which spline gear 731 (see FIG. 2) is coupled to first gear 81, "3" indicates a state in which spline gear 731 is coupled to third gear 83, and "5" indicates a state in which spline gear 712 (see FIG. 2) is coupled to fifth gear 85. Spline gears 712 and 731 are not coupled to an odd-numbered gear other than a gear shown in the "Odd-Numbered Gear" column.

In FIG. 15, "2" in the "Even-Numbered Gear" column indicates a state in which spline gear 732 (see FIG. 2) is coupled to second gear 82, "4" indicates a state in which spline gear 732 is coupled to fourth gear 84, and "6" indicates a state in which spline gear 722 (see FIG. 2) is coupled to sixth gear 86. Spline gears 722 and 723 are not coupled to an even-numbered gear other than a gear shown in the "Even-Numbered Gear" column.

In this preferred embodiment, when the rider operates shift switch 15 (FIG. 1), ECU 10 controls first clutch actuator 77, second clutch actuator 78, and motor 8. As a result of this structure and arrangement, the states of odd-numbered gears and even-numbered gears are shifted to a standard state of a gear position one gear higher or one gear lower.

At this time, first clutch 74, second clutch 75, shift cam 14, an odd-numbered gear, and an even-numbered gear are shifted to a standard state of a gear position one gear higher or one gear lower via a state shown between a standard state of an arbitrary gear position and a standard state one gear higher or one gear lower than that gear position in FIG. 15.

In this preferred embodiment, when shift cam 14 rotates approximately 6° from a standard state, a transmission gear and spline gear are brought into contact by a dog mechanism.

The relationships shown in FIG. 15 will now be described in detail, taking a case in which the gear position is shifted up from second gear to third gear as an example.

Figure 16:
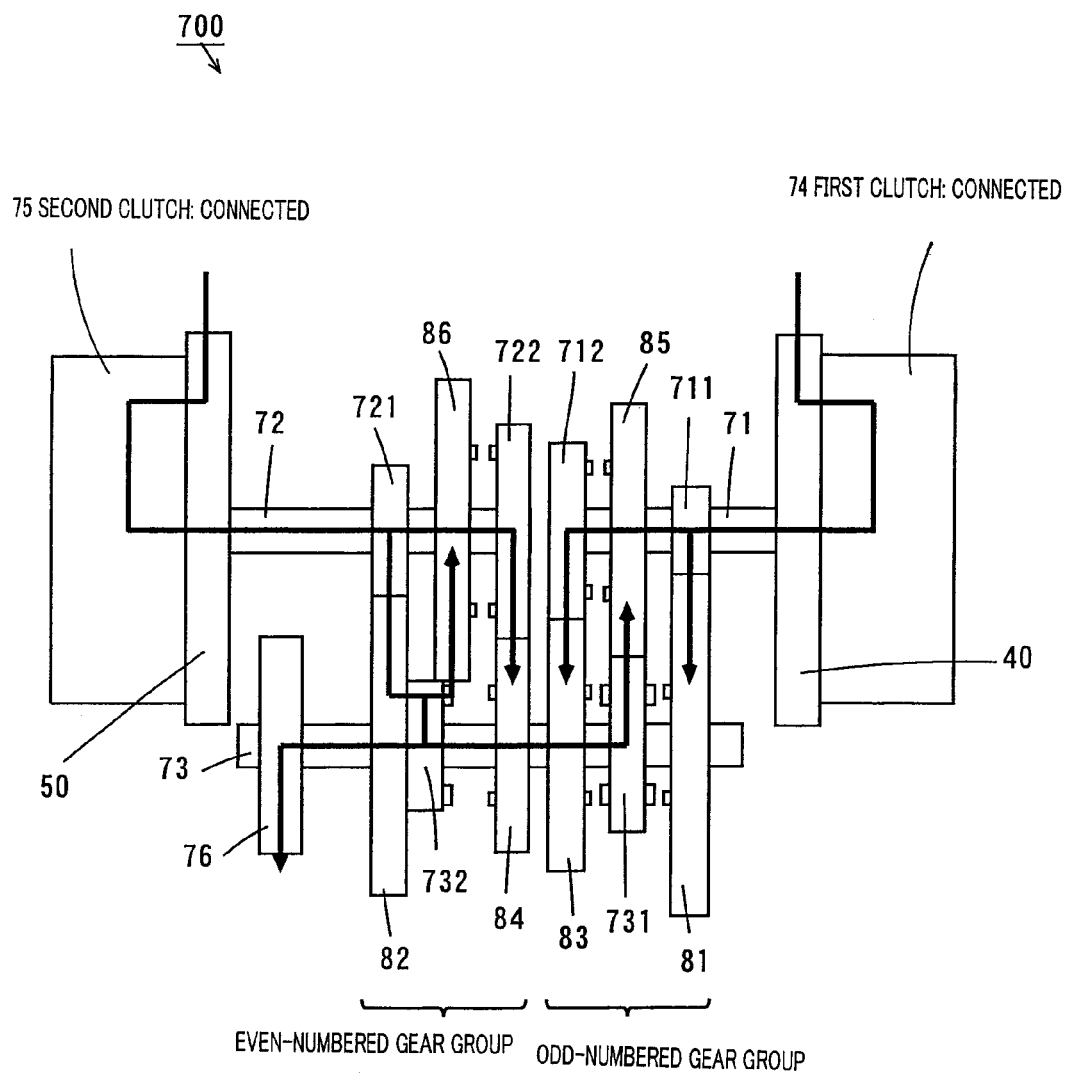
FIG. 16 is a drawing showing the state of the transmission mechanism when the gear position is shifted up from second gear to third gear.
Figure 20:
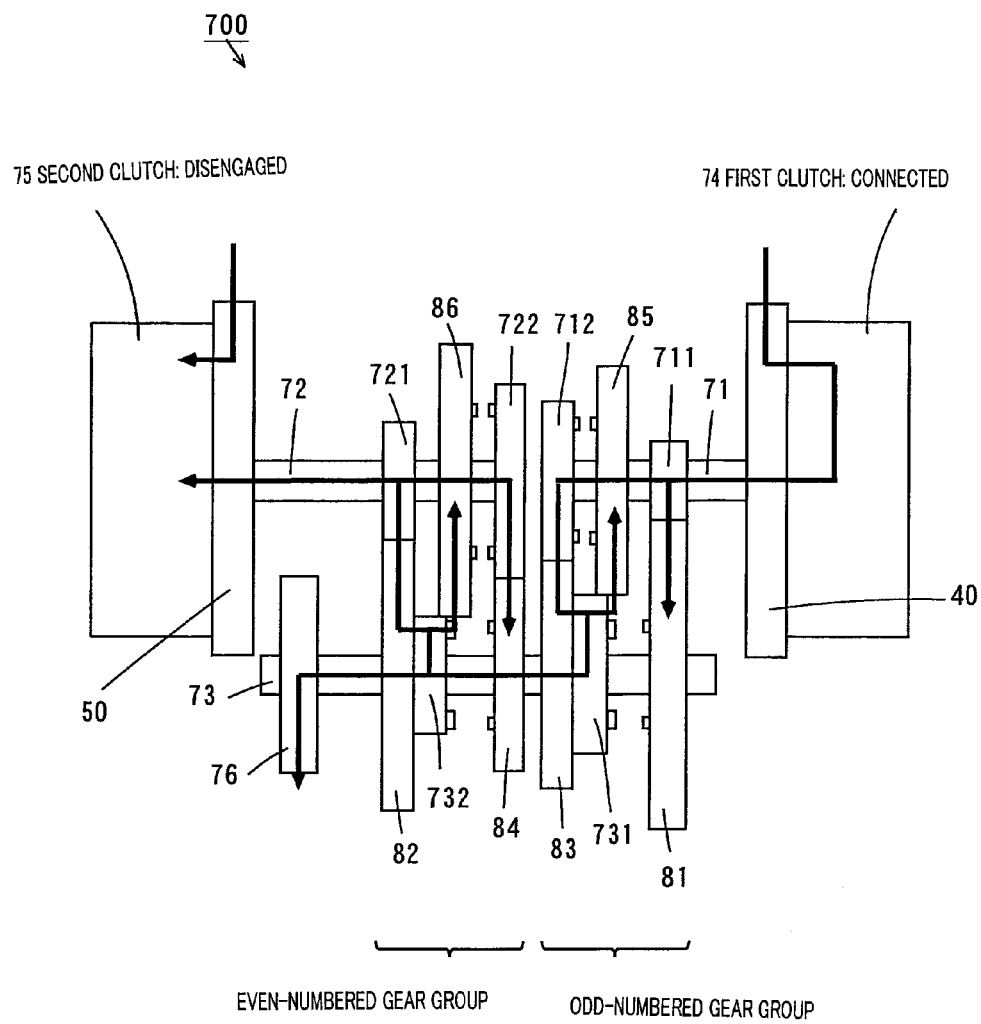
FIG. 20 is a drawing showing the state of the transmission mechanism when the gear position is shifted up from second gear to third gear.
Figure 21:
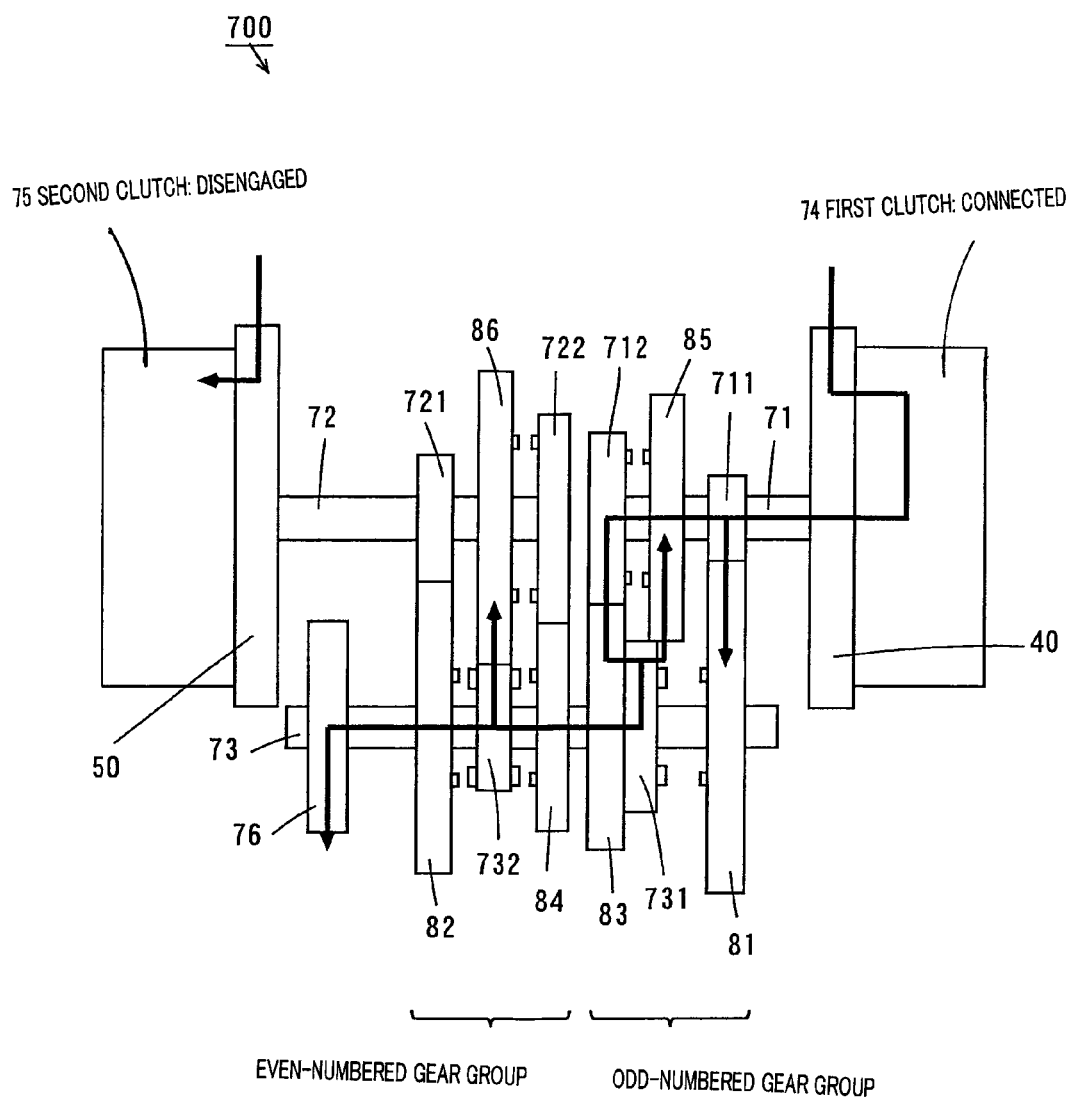
FIG. 21 is a drawing showing the state of the transmission mechanism when the gear position is shifted up from second gear to third gear.
Figure 22:
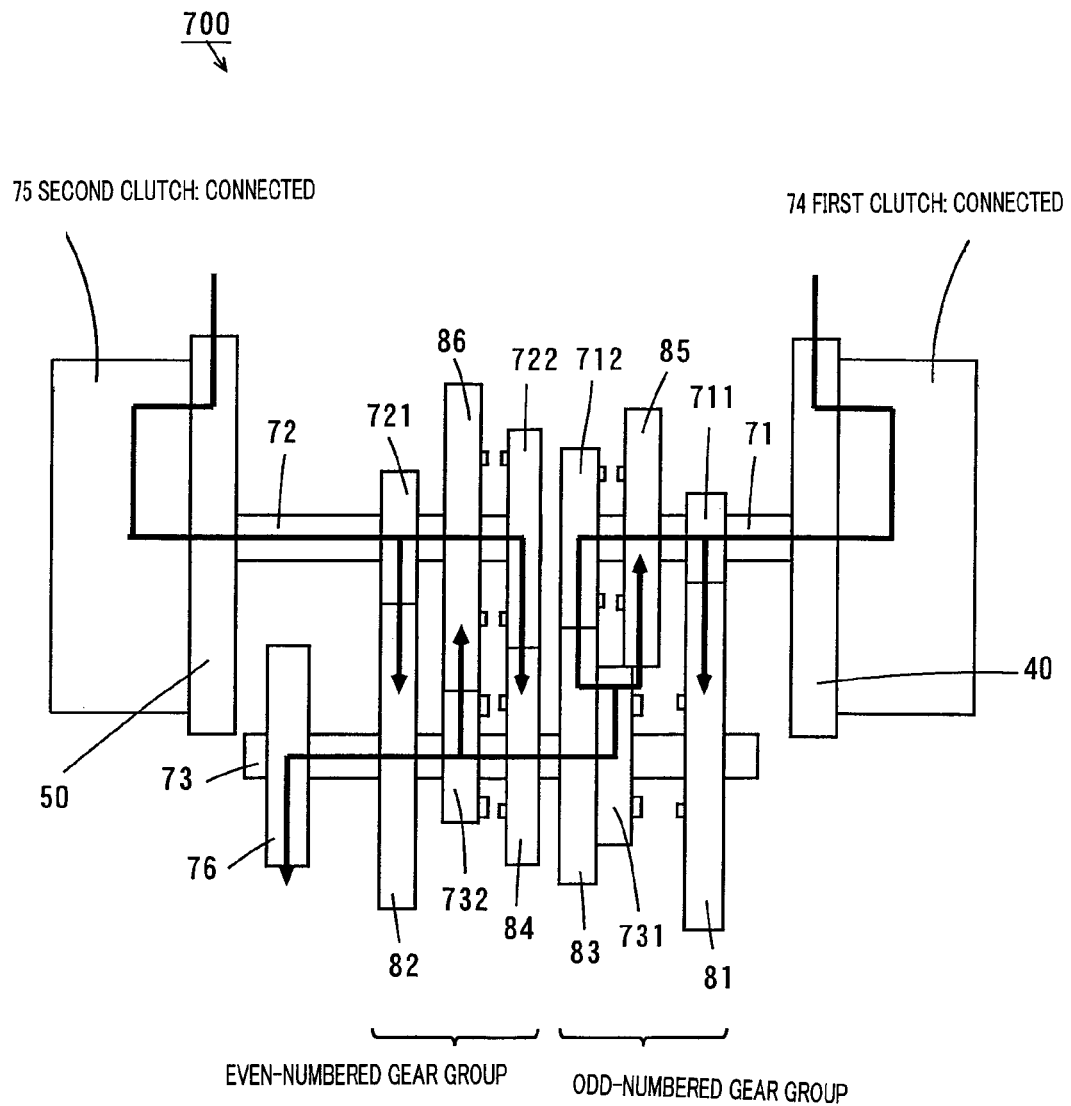
FIG. 22 is a drawing showing the state of the transmission mechanism when the gear position is shifted up from second gear to third gear.

FIG. 16 through FIG. 22 are drawings showing states of transmission mechanism 700 when the gear position is shifted up from second gear to third gear. Transmission mechanism 700 shown in FIG. 16 illustrates the second gear standard state, and transmission mechanism 700 shown in FIG. 22 illustrates the third gear standard state. The arrows in FIG. 16 through FIG. 22 indicate transfer paths of torque of crankshaft 60 (see FIG. 2).

As shown in FIG. 15 and FIG. 16, when the gear position in transmission mechanism 700 is the second gear standard state, first and second clutches 74 and 75 are both connected.

In this case, as shown by the arrows in FIG. 16, the torque of crankshaft 60 (see FIG. 2) is transferred to first and second main shafts 71 and 72 via first and second clutches 74 and 75.

Here, as shown in FIG. 15 and FIG. 16, in the second gear standard state, the odd-numbered gear group is set to a neutral position. Consequently, the torque of first main shaft 71 is not transferred to drive shaft 73.

To be specific, as shown in FIG. 16, first main shaft 71 torque is transferred to first gear 81 via fixed gear 711, and is transferred to third gear 83 via spline gear 712. However, since first gear 81 and third gear are provided rotatably on drive shaft 73, torque of first gear 81 and third gear 83 is not transferred to drive shaft 73. Also, since fifth gear 85 is provided rotatably on first main shaft 71, first main shaft 71 torque is not transferred to fifth gear 85. Therefore, first main shaft 71 torque is not transferred to drive shaft 73.

On the other hand, as shown in FIG. 15 and FIG. 16, the even-numbered gear group is not set to a neutral position, and spline gear 732 fits together and is coupled with second gear 82. In this case, as shown in FIG. 16, torque of second main shaft 72 is transferred to drive shaft 73 via fixed gear 721, second gear 82, and spline gear 732. As a result, sprocket 76 rotates. The torque to sprocket 76 is transferred to rear wheel 12 (FIG. 1) via chain 13 (FIG. 1). As a result, motorcycle 100 runs in second gear.

Since sixth gear 86 is provided rotatably on second main shaft 72, torque of second main shaft 72 is not transferred to spline gear 732 via sixth gear 86. Also, since fourth gear 84 is provided rotatably on drive shaft 73, torque of second main shaft 72 is not transferred to drive shaft 73 via spline gear 722 and fourth gear 84.

Figure 17:
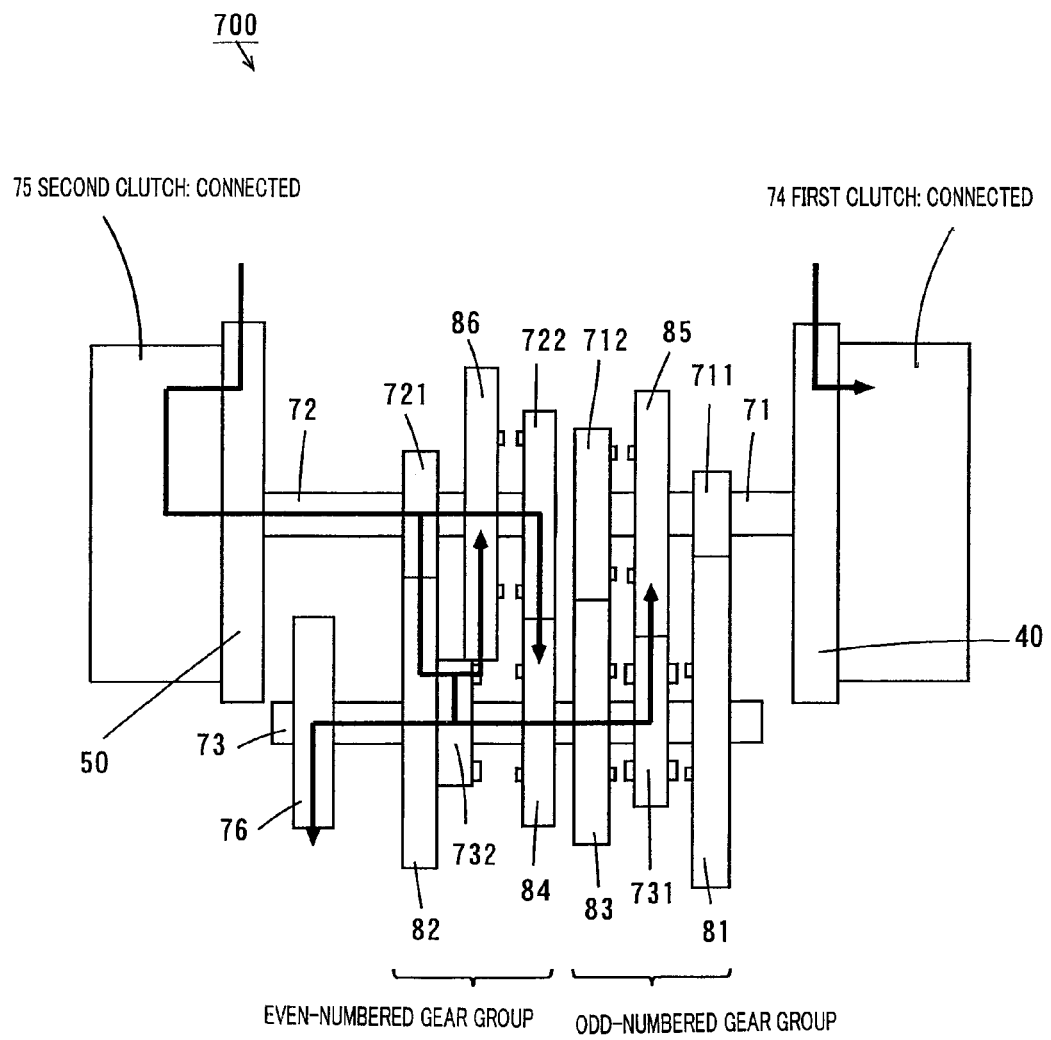
FIG. 17 is a drawing showing the state of the transmission mechanism when the gear position is shifted up from second gear to third gear.

Here, if the rider depresses the shift-up button of shift switch 15 (FIG. 1) in order to set the gear position to third gear, ECU 10 (see FIG. 2) controls first clutch actuator 77 (see FIG. 2). As a result, as shown in FIG. 15 and FIG. 17, first clutch 74 is disengaged, and the transfer of torque from crankshaft 60 (see FIG. 2) to first main shaft 71 is blocked.

Figure 18:
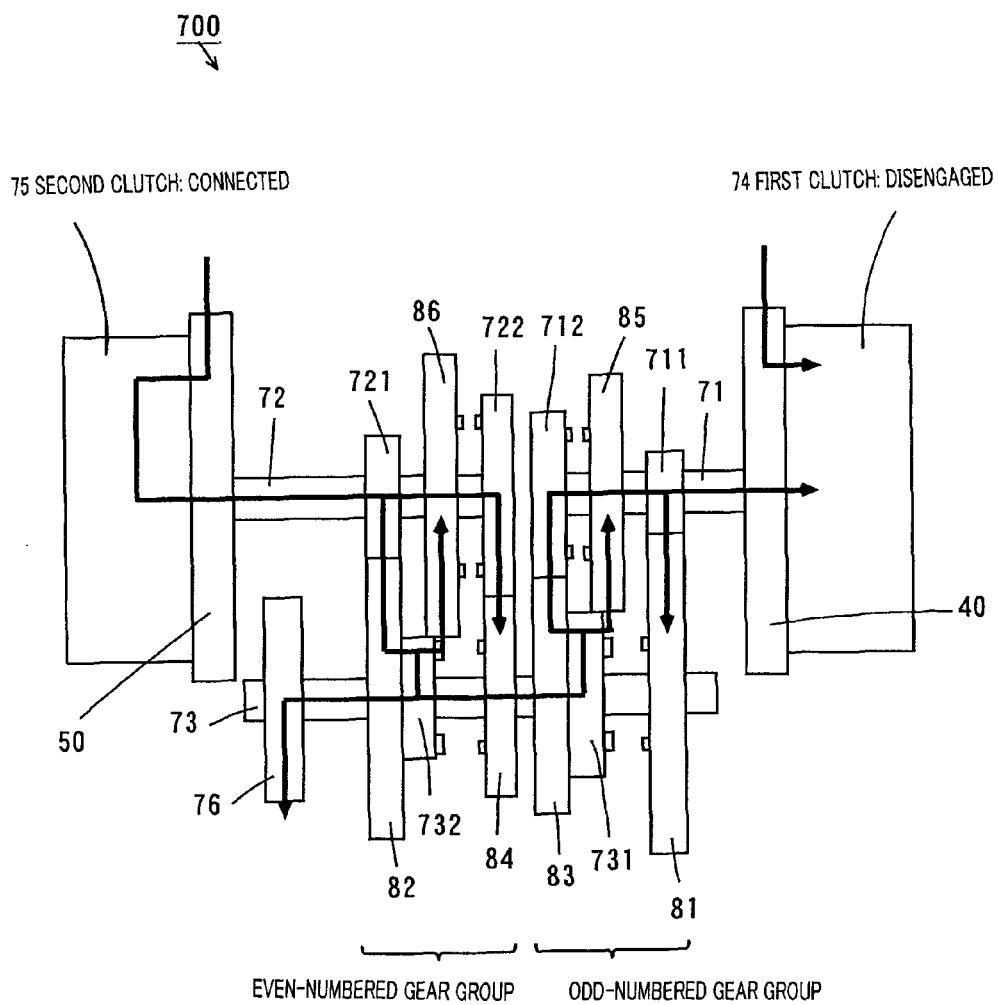
FIG. 18 is a drawing showing the state of the transmission mechanism when the gear position is shifted up from second gear to third gear.

Next, as shown in FIG. 15, ECU 10 rotates shift cam 14 through a predetermined angle (in this preferred embodiment, approximately 30°) by controlling motor 8 (see FIG. 2). Consequently, shift fork 141 (see FIG. 2) moves toward second clutch 75. As a result, as shown in FIG. 18, spline gear 731 moves toward third gear 83, and third gear 83 and spline gear 731 fit together and are coupled.

In this case, rotation is coupled between first main shaft 71 and drive shaft 73 via spline gear 712, third gear 83, and spline gear 731. However, since first clutch 74 is disengaged, torque is not transferred between first main shaft 71 and drive shaft 73. That is to say, as in the second gear standard state (FIG. 16), torque of crankshaft 60 (see FIG. 2) is transferred to sprocket 76 via a path passing through second clutch 75, fixed gear 721, second gear 82, spline gear 732, and drive shaft 73.

Therefore, even though rotation is coupled between first main shaft 71 and drive shaft 73, the rotation speed ratio between crankshaft 60 and sprocket does not change. Consequently, spline gear 731 and third gear 83 can be coupled without causing motorcycle 100 to change its driving force. Since the rotation speed ratio between crankshaft 60 and sprocket 76 does not change in the state shown in FIG. 18, second gear running of motorcycle 100 is maintained.

Next, ECU 10 controls first and second clutch actuators 77 and 78 (see FIG. 2) and, as shown in FIG. 15 and FIG. 18 through FIG. 20, shifts first clutch 74 from a disengaged state to a half-clutch state and connected state, and shifts second clutch 75 from a connected state to a half-clutch state and disengaged state.

Figure 19:
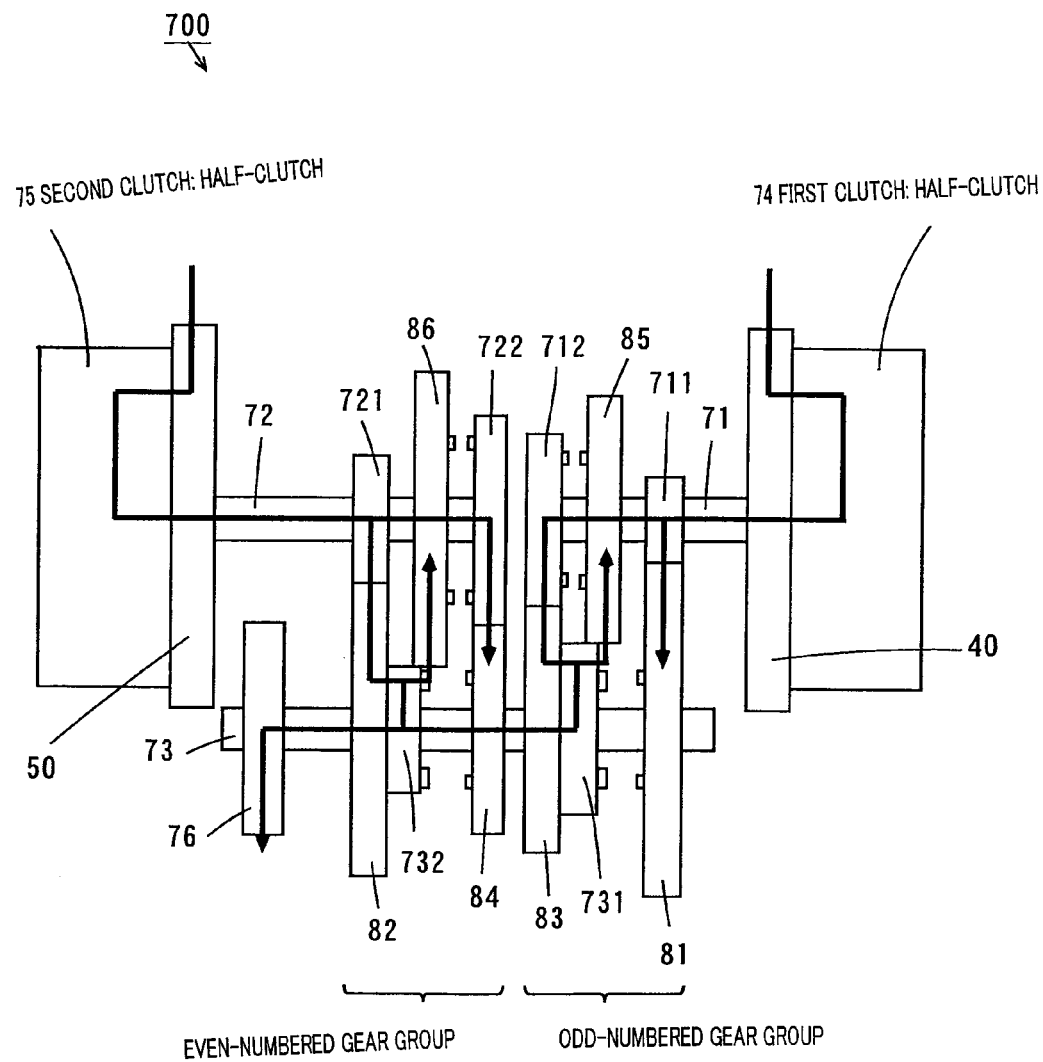
FIG. 19 is a drawing showing the state of the transmission mechanism when the gear position is shifted up from second gear to third gear.

In this case, as shown in FIG. 18 through FIG. 20, torque transferred from crankshaft 60 to drive shaft 73 via first clutch 74, first main shaft 71, spline gear 712, third gear 83, and spline gear 731 gradually increases. On the other hand, torque transferred from crankshaft 60 to drive shaft 73 via second clutch 75, second main shaft 72, fixed gear 721, second gear 82, and spline gear 732 gradually decreases, and becomes 0 through the disengagement of second clutch 75.

In this case, torque transferred from crankshaft to sprocket 76 can be prevented from increasing suddenly when first clutch 74 is connected, and torque transferred from crankshaft 60 to sprocket 76 can be prevented from decreasing suddenly when second clutch 75 is disengaged.

As a result, torque of sprocket 76 can be prevented from changing suddenly when the gear position in transmission mechanism 700 is switched from second gear to third gear. As a result of this structure and arrangement, the driving feeling when the motorcycle changes the speed can be improved. Also, when the gear position is switched from second gear to third gear, transfer of torque from crankshaft 60 to sprocket 76 is not blocked, making a quick and smooth gear change operation possible.

Next, as shown in FIG. 15, ECU 10 rotates shift cam 14 through a predetermined angle (in this preferred embodiment, approximately 30°) by controlling motor 8 (see FIG. 2). Through this rotation of shift cam 14, shift fork 144 (see FIG. 2) moves toward first clutch 74. As a result, as shown in FIG. 21, spline gear 732 moves to a position in which it meshes only with sixth gear 86, and in which it does not fit together with either second gear 82 or fourth gear 84. As a result of this structure and arrangement, the even-numbered gear group is set to a neutral position, and coupling of rotation between second main shaft 72 and drive shaft 73 is blocked.

Following this, ECU 10 connects second clutch 75 by controlling second clutch actuator 78 (see FIG. 2) as shown in FIG. 15 and FIG. 22. As a result of this structure and arrangement, the gear shift from second gear to third gear is completed.

(2-2-2) Standard States of Gear Positions

The standard states of the gear positions will now be briefly described. As the standard states of the neutral position, second gear, and third gear have already been described (see FIG. 2, FIG. 16, and FIG. 22), these will be omitted from the following descriptions.

(a) First Gear

Figure 23:
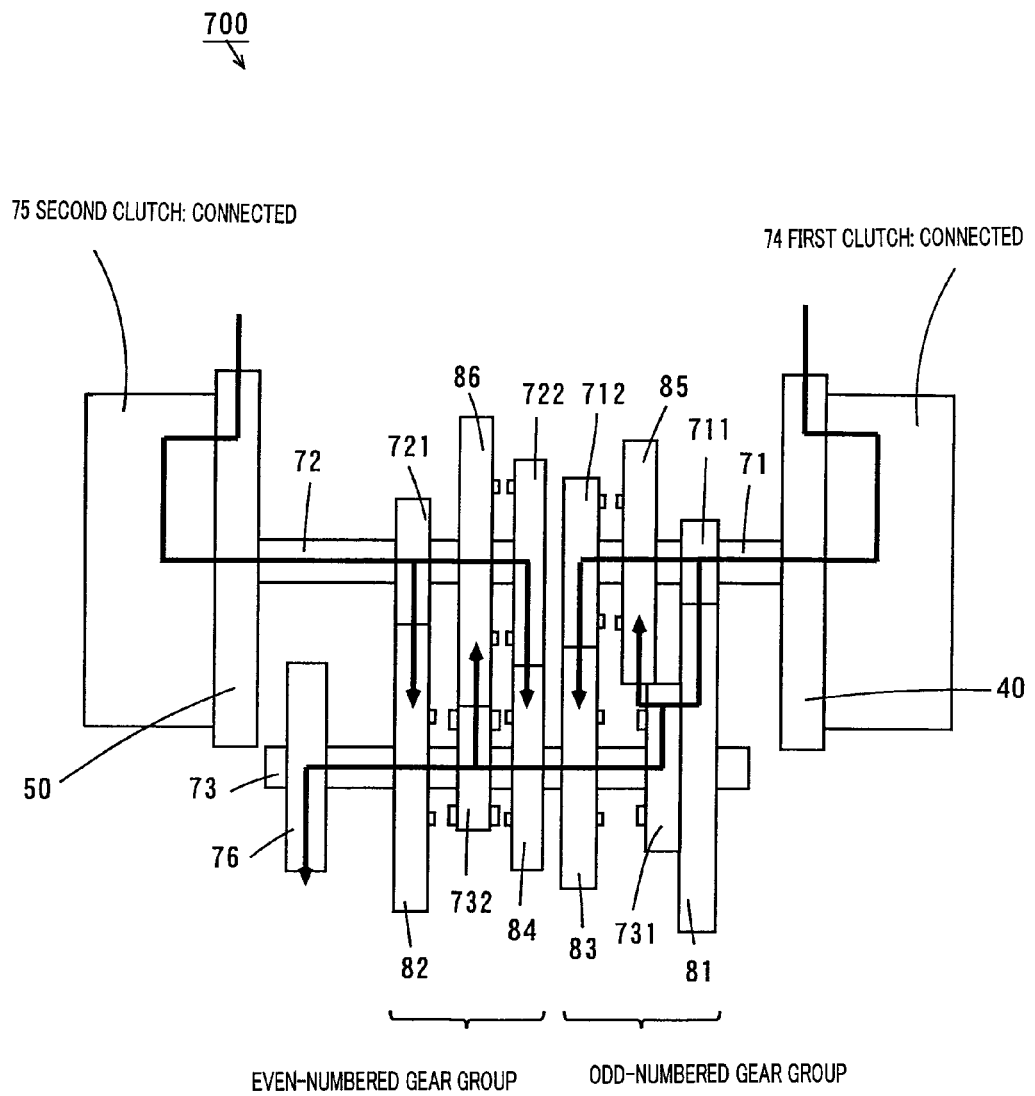
FIG. 23 is a drawing showing the standard state of the transmission mechanism in first gear.
Figure 25:
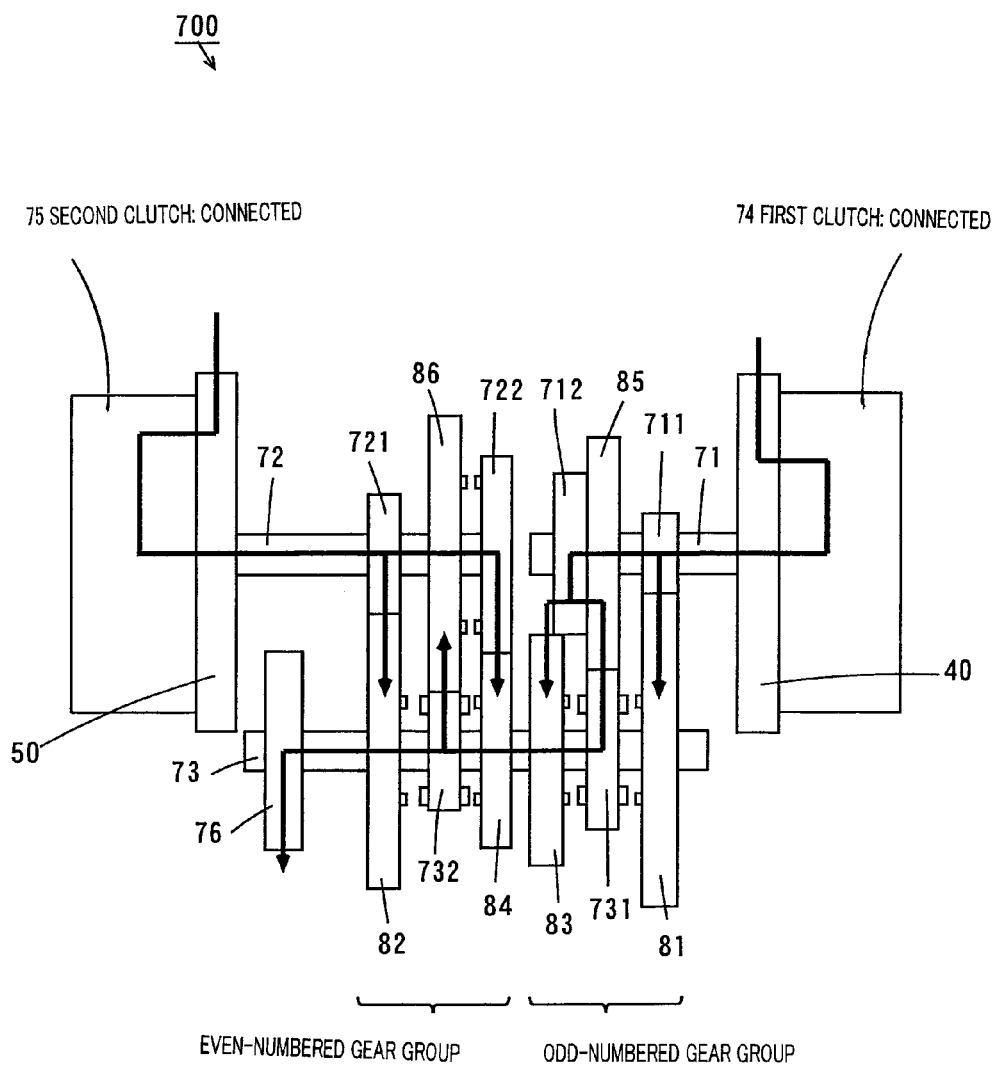
FIG. 25 is a drawing showing the standard state of the transmission mechanism in fifth gear.
Figure 26:
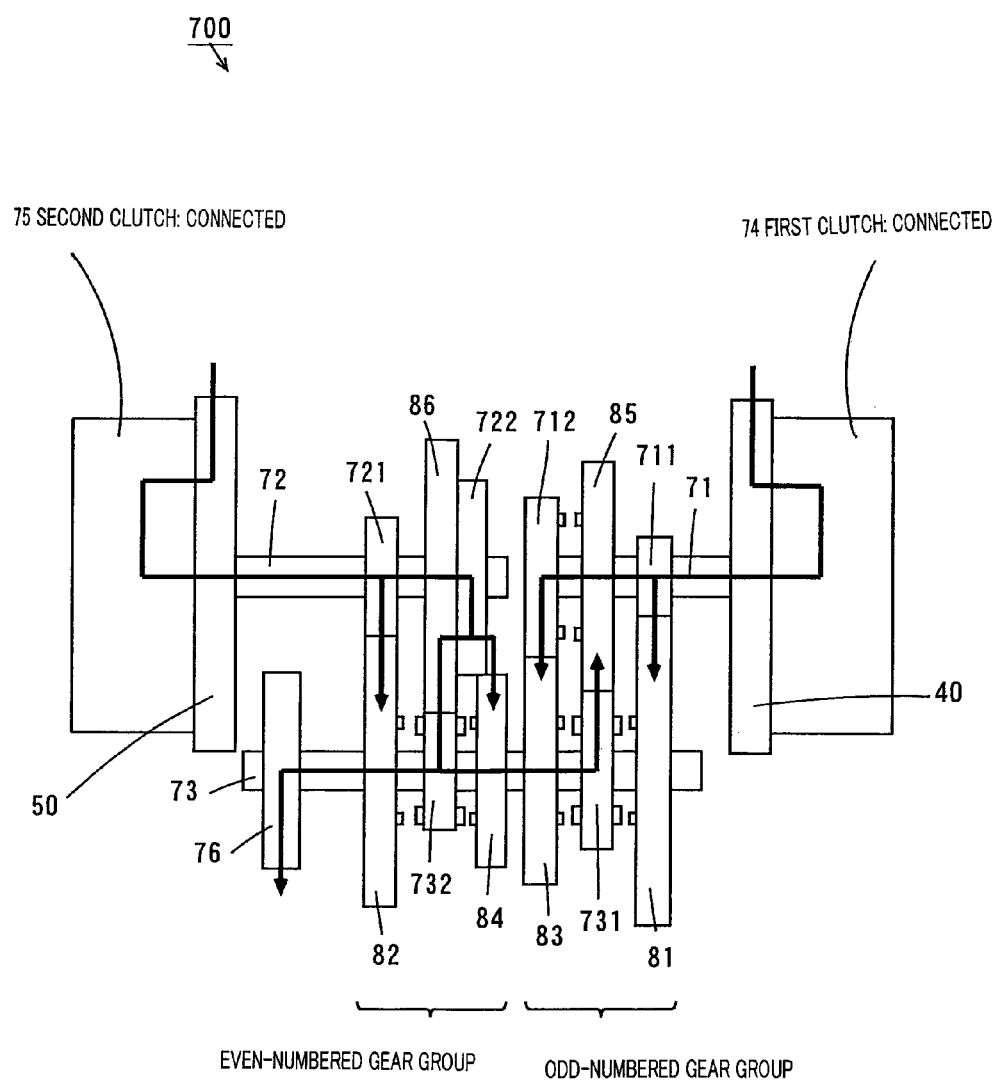
FIG. 26 is a drawing showing the standard state of the transmission mechanism in sixth gear.

FIG. 23 is a drawing showing the standard state of transmission mechanism 700 in first gear. The arrows in FIG. 23, and in FIG. 24 through FIG. 26 shown later, indicate transfer paths of torque from crankshaft 60 (see FIG. 2) to sprocket 76.

As shown in FIG. 15 and FIG. 23, when the gear position in transmission mechanism 700 is the first gear standard state, the even-numbered gear group is set to a neutral position, and spline gear 731 is coupled to first gear 81. In this case, as shown in FIG. 23, torque of crankshaft 60 is transferred to sprocket 76 via first clutch 74, first main shaft 71, fixed gear 711, first gear 81, spline gear 731, and drive shaft 73. The torque transferred to sprocket 76 is transferred to rear wheel 12 via chain 13 (FIG. 1). As a result, motorcycle 100 runs in first gear.

(b) Fourth Gear

Figure 24:
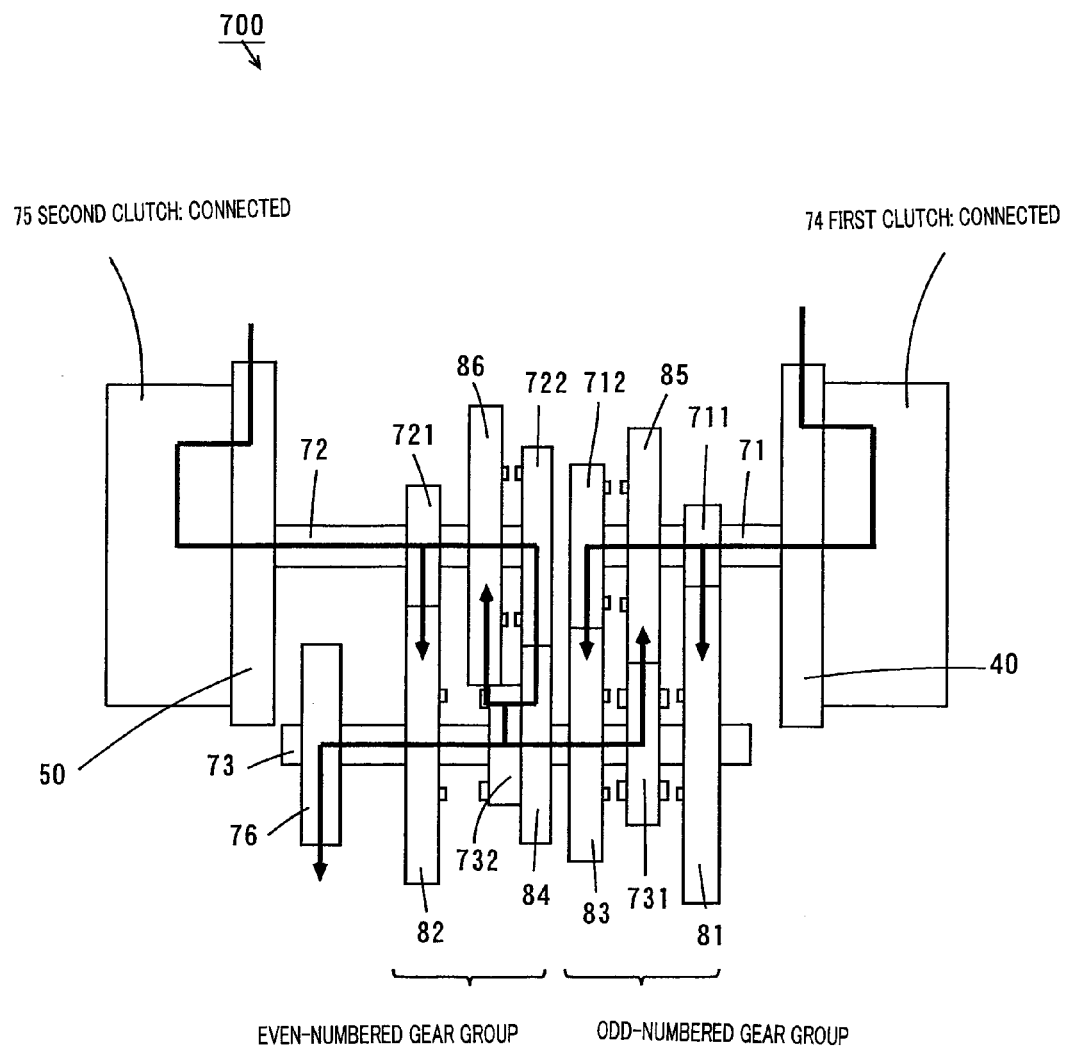
FIG. 24 is a drawing showing the standard state of the transmission mechanism in fourth gear.

FIG. 24 is a drawing showing the standard state of transmission mechanism 700 in fourth gear.

As shown in FIG. 15 and FIG. 24, when the gear position in transmission mechanism 700 is the fourth gear standard state, the odd-numbered gear group is set to a neutral position, and spline gear 732 is coupled to fourth gear 84. In this case, as shown in FIG. 24, torque of crankshaft 60 is transferred to sprocket 76 via second clutch 75, second main shaft 72, spline gear 722, fourth gear 84, spline gear 732, and drive shaft 73. As a result, motorcycle 100 runs in fourth gear.

(c) Fifth Gear

FIG. 25 is a drawing showing the standard state of transmission mechanism 700 in fifth gear.

As shown in FIG. 15 and FIG. 25, when the gear position in transmission mechanism 700 is in the fifth gear standard state, the even-numbered gear group is set to a neutral position, and spline gear 712 is coupled to fifth gear 85. In this case, as shown in FIG. 25, torque of crankshaft 60 is transferred to sprocket 76 via first clutch 74, first main shaft 71, spline gear 712, fifth gear 85, spline gear 731, and drive shaft 73. In this way, torque of crankshaft 60 is transferred to sprocket 76 at a fifth-gear gear ratio. As a result, motorcycle 100 runs in fifth gear.

(d) Sixth Gear

FIG. 26 is a drawing showing the standard state of transmission mechanism 700 in sixth gear.

As shown in FIG. 15 and FIG. 26, when the gear position in transmission mechanism 700 shows the sixth gear standard state, the odd-numbered gear group is set to a neutral position, and spline gear 722 is coupled to sixth gear 86. In this case, as shown in FIG. 26, torque of crankshaft 60 is transferred to sprocket 76 via second clutch 75, second main shaft 72, spline gear 722, sixth gear 86, spline gear 732, and drive shaft 73. As a result, motorcycle 100 runs in sixth gear.

In this way, shift changes to the various gear positions in transmission 7 are controlled by ECU 10. In this preferred embodiment, by ECU 10 to which a shift signal is input, transmission 7 alternately switches selectively between first clutch 74 used for odd-numbered gear power transfer and second clutch 75 used for even-numbered gear power transfer, and performs gear shifting by shift mechanism 701.

When a gear is shifted up or shifted down, that is, when a shift change is performed, before switching the power-transferring clutch from one clutch to the other clutch, transmission 7 performs a gear shift (preshift) in the other clutch to be used next.

When a gear is shifted up or shifted down, one clutch is connected to (engaged with) a main shaft and forms a power transfer that transfers power to drive shaft 73. During this time, the other clutch is connected to the corresponding main shaft with the gears in a neutral position. Then when a shift change is performed by shift signal input to ECU 10, after the other clutch has been switched from a connected state to a disengaged (released) state, and before the one clutch enters a disengaged (released) state and the other clutch enters a connected (engaged) state, a shift operation is performed to a gear to be used as the next gear. After the shift to the next gear, and after connection of the other clutch to the main shaft that transfers power to that gear, the other clutch that has been switched to is again connected to the main shaft on which provided gears are in a neutral position.

As a result of this structure and arrangement, the vehicle runs in a state in which one clutch is connected to a main shaft on which gears are placed in a neutral position while power transfer is performed by the other clutch after connection of that other clutch. Thus, driving force can be output without interruption to rear wheel 12, the driving wheel, even during a gear change.

At the time of a preshift in a shift change while the vehicle is running, there is a possibility of a state arising in which torque from crankshaft 60 is transferred to both left and right clutches 74 and 75 in an engaged (connected) state (duplicate engagement) if, for example, drive control of first and second clutch actuators 77 and is disrupted due to a problem with ECU 10.

That is to say, in a state in which gears forming separate power transfers are meshed with both clutches 74 and 75, that is, in a state of duplicate mesh, inner circulating torque is generated inside the transfer mechanism by crankshaft 60 and transmission mechanism 700 (first and second clutches 74 and 75, first and second main shafts 71 and 72, drive shaft 73, and gears).

FIG. 56 is a drawing provided to explain inner circulating torque in a transmission according to a preferred embodiment of the present invention. To be more specific, FIG. 56 is a schematic diagram showing inner circulating torque generated in a state in which first clutch 74 and second clutch 75 are both engaged in transmission 7 (duplicate engagement) while the vehicle is running. In FIG. 56, a case is shown in which a gear on the first clutch side higher than on the second clutch side has been selected.

Specifically, torque TD similar to that when engine 6 is push-started from the rear wheel 12 side is applied to drive shaft 73. The drive-direction rotation of this drive shaft 73 is transferred to first main shaft 71 via an odd-numbered gear and is transferred to second main shaft 72 via an even-numbered gear. Also, first and second clutches 74 and 75 are constrained at the same rotation speed by crankshaft 60, and until one clutch slips, the relative rotation of both clutches is regulated by their coupling to crankshaft 60. Thus, of the odd-numbered gear and even-numbered gear coupled to drive shaft 73, torque applied to the higher-gear-side main shaft increases in the drive direction, and torque applied to the lower-gear-side main shaft decreases in the drive direction. In FIG. 56, comparing the two clutches, according to inner circulating torque TI or TId, in first clutch 74, torque increases in the forward direction (the same direction as when rear wheel 12 is driven by engine 6), and, in second clutch 75, torque decreases in the forward direction (the same direction as when rear wheel 12 is driven by engine 6), or torque increases in the reverse direction.

Figure 56A:
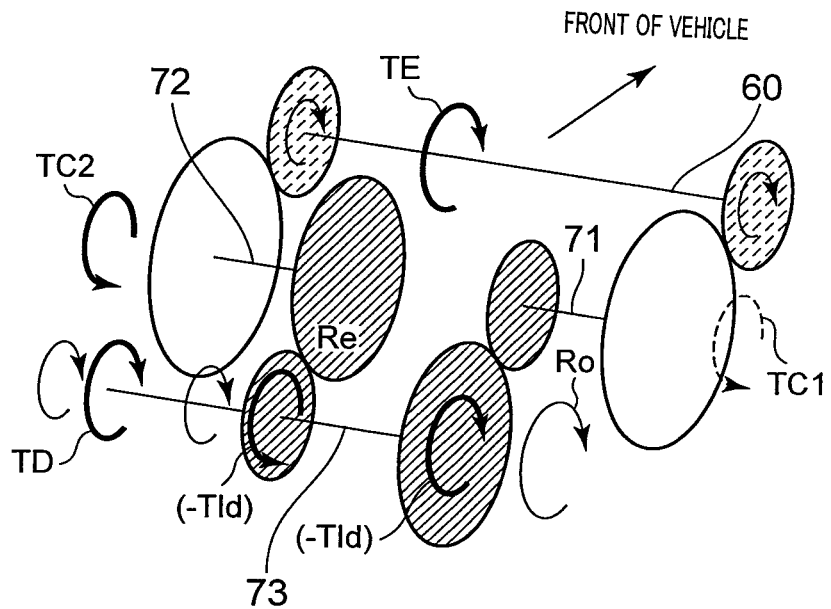
FIGS. 56A and 56B are drawings provided to explain inner circulating torque in a transmission of a vehicle according to a preferred embodiment of the present invention.

If the driving force generated by engine 6 (see FIG. 1) is large as shown in FIG. 56A and the vehicle is accelerating, torque TC1 that increases on the higher-gear-side (for example, first main shaft 71) is forward torque (drive-direction rotational force). In FIG. 56A, TC1+TC2=TE, TC1=(1/2×TD−TId)/Ro, and TC2=(1/2×TD−TId)/Re, and low-speed (Ro) side load torque decreases by the equivalent of the inner circulating torque, and the high-speed (Re) side reaches the forward torque capacity first.

Figure 56B:
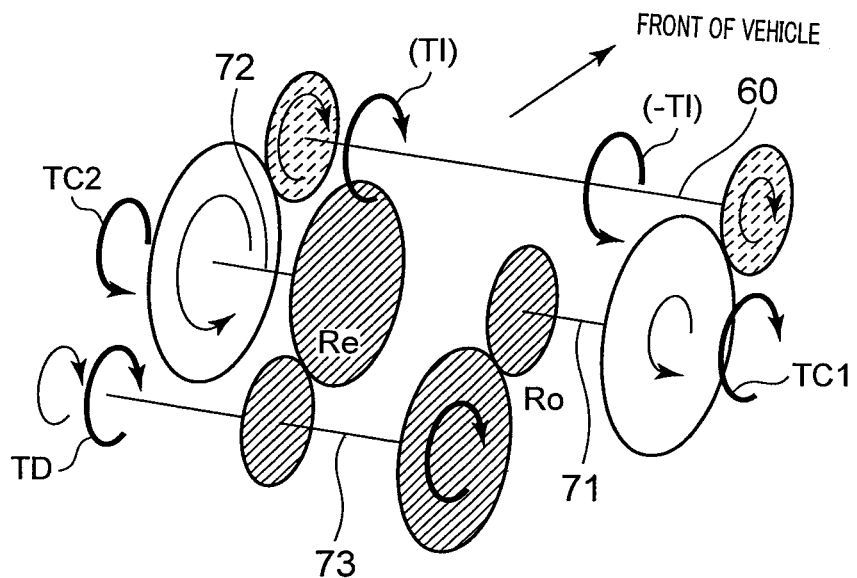

On the other hand, if the driving force generated by engine 6 is small as shown in FIG. 56B and inner circulating torque is generated during gradual acceleration or deceleration, of first and second clutches 74 and 75 taking power from either end of torque of crankshaft 60 in a rotation direction opposite to the rotation direction when forward torque (torque in the same direction as when rear wheel 12 is driven by engine 6) is applied in one clutch on the main shaft side for which a low gear with a large gear reduction ratio has been selected is applied to that one clutch. In FIG. 56B, TC1=−TC2 (<0), and on the low-speed (Ro) side, reverse load torque of the same magnitude as on the high-speed (Re) side operates, and the low-speed (Ro) side reaches the reverse torque capacity first. For example, if, at the time of a preshift during deceleration from an even-numbered gear for which a higher gear has been selected to an odd-numbered gear for which a lower gear has been selected, left and right clutches 74 and 75 are both engaged (duplicate engagement is implemented) and inner circulating torque operates, back torque applied to first clutch 74 increases.

As a provision for a case in which back torque applied to one clutch increases in this way, first clutch 74 and second clutch 75 each have a back torque limiter that strengthens the connected (engaged) state for first main shaft 71 or second main shaft 72 transferring torque to transmission gears in the rotation direction during acceleration, weakens the connected state in the rotation direction during deceleration, and disconnects the connected state when a certain torque is exceeded. That is to say, when back torque exceeding the torque capacity is applied to one clutch (here assumed to be first clutch 74), the above-described back torque limiting function operates.

Specifically, reverse torque is applied to center hub 745 on which operating cam 7424 of press boss section 7426 in second pressure plate 7422 rotating in the forward torque direction is engaged by second pressure plate 7422, and this rotates in the reverse direction to the rotation direction when driven by forward torque.

As a result of this structure and arrangement, second pressure plate 7422 slides over the inclined surface of operating cam 7424, and center hub 745 moves in a direction in which it is distanced in the axial direction from press boss section 7426 of second pressure plate 7422.

Distant center hub 745 moves toward first pressure plate 7421, presses back that first pressure plate 7421 against the pressure of clutch spring 743, and reduces the pressing force being applied by clutch spring 743 on friction plates 744 and clutch plates 741. As a result, frictional force operating between friction plates 744 and clutch plates 741 decreases, and friction plates 744 and clutch plates 741 rotate relatively, that is, the clutch slips and transfer of torque is limited.

By setting the torque capacity of a back torque limiter as smaller than torque capacity for forward torque of a clutch (absolute value of back torque capacity<forward torque capacity) here, the clutch on the side on which back torque operates can be made to slip selectively. That is to say, it becomes possible to select a clutch on the side of the main shaft for which a lower gear with a large gear reduction ratio has been selected, and limit torque transfer via that clutch.

When engine braking is employed during deceleration and a braking force is applied to rear wheel 12, to compare a case in which engine braking is effected by a certain gear with a case in which engine braking is effected by a gear lower than that gear, the effect of engine braking effected by the lower gear is greater. That is to say, the intensity of the effect of engine braking (the magnitude of the braking force) can be adjusted by making an appropriate selection of a gear of transmission 7.

Also, when decelerating, the vehicle tilts forward, the area of contact between rear wheel 12, the driving wheel, and the ground decreases, and the force that rotates drive shaft 73 forcibly from the rear wheel side is weaker than when accelerating. When inner circulating torque is generated during deceleration (see FIG. 56B), in particular, if the torque capacity of a back torque limiter has been set as smaller than torque capacity for forward torque of a clutch (absolute value of back torque capacity<forward torque capacity), the clutch on the side on which back torque operates can be made to slip selectively. That is to say, it is possible to select a clutch on the side of the main shaft for which a lower gear with a large gear reduction ratio has been selected, and limit torque transfer via that clutch. As a result of this structure and arrangement, the problem by the back torque can be decreased.

That is to say, when inner circulating torque is generated during deceleration, torque capacity is exceeded in a lower-gear clutch and that clutch slips selectively, the problem by the back torque can be decreased.

(3) Effects of Transmission 7 of this Preferred Embodiment

Transmission 7 of this preferred embodiment is equipped with first clutch 74 that inputs rotation power transferred from crankshaft 60 to first main shaft 71 and outputs driving force to a driving wheel via an odd-numbered transmission gear mechanism (gears 81, 83, 85, 711, 712, and 731) set as odd-numbered transmission gears, and second clutch 75 that inputs rotation power transferred from crankshaft 60 to second main shaft 72 and outputs driving force to rear wheel 12 via an even-numbered transmission gear mechanism (gears 82, 84, 86, 721, 722, and 732) set as even-numbered transmission gears.

First clutch 74 and second clutch 75 are placed in approximately symmetrical positions approximately equidistant from a central plane passing through the lengthwise center of crankshaft 60 and perpendicular or substantially perpendicular to crankshaft 60, and have power transferred to them from each end of crankshaft 60 respectively. First main shaft 71 and second main shaft 72 are placed in positions on the same axis line parallel or substantially parallel to crankshaft 60, with transmitting portions for driving force when output to the driving wheel via an odd-numbered transmission gear mechanism and even-numbered transmission gear mechanism respectively not overlapping coaxially on first main shaft 71 and second main shaft 72. The outer axial diameters of the driving force transmitting portions on first main shaft 71 and second main shaft 72 are approximately the same.

Consequently, according to this preferred embodiment, unlike the case of a conventional configuration, first main shaft 71 and second main shaft 72 are not formed as a double-tube structure, and it is not necessary to make one of the diameter of first main shaft 71 and the diameter of second main shaft 72 larger than the other. Accordingly, it is not necessary to make the diameters of gears (fixed gears, transmission gears, and spline gears) attached to first main shaft 71 and second main shaft 72 larger.

Also, since the diameters of gears provided on first and second main shafts 71 and 72 can be made smaller, the diameters of gears (gears provided on drive shaft 73) that mesh with those gears can be made smaller. As a result, the distance between first and second main shafts 71 and 72 and drive shaft 73 can be made smaller, and transmission 7 can be reduced in size.

In particular, with transmission 7 of this preferred embodiment, since first main shaft 71 and second main shaft 72 are placed rotatably on the same axis line and facing the respective end surfaces, they are separated from each other, and when mounted on a motorcycle, main shafts having the same outer diameter as an existing main shaft can be used as first main shaft and second main shaft 72.

Also, since first main shaft 71 and second main shaft 72 are provided on approximately the same axis line, the distance between first main shaft 71 and drive shaft 73, or the distance between second main shaft 72 and drive shaft 73, does not become larger.

As a result, a drive unit having transmission 7 can be mounted on an existing motorcycle without changing the distances between the crankshaft, main shafts, and drive shaft in that motorcycle. Therefore, a drive unit having transmission 7 can be mounted without constraints on the vehicle dimensions of an existing motorcycle and without changing the wheel base of the motorcycle, and can be mounted without significantly changing the frame and so forth of the motorcycle.

Also, power transfer portions on first main shaft and second main shaft 72 do not overlap coaxially. That is to say, the freedom of gear ratio settings for gears 711, 85, 712, 721, 86, and 722 placed on first main shaft 71 and second main shaft 72, and gears 81, 731, 83, 82, 732, and 84 placed on drive shaft 73 that mesh with those gears, is not restricted.

Furthermore, in this preferred embodiment, first clutch 74 and second clutch 75 are placed so as to face each other, and first and second main shafts 71 and 72 are provided between first clutch 74 and second clutch 75. As a result, the center of motorcycle 100 in the lateral direction and the position of the center of gravity of transmission mechanism 700 are not significantly distanced from each other.

Therefore, even if transmission 7, that is, a drive unit, is mounted on motorcycle 100, the weight of motorcycle 100 does not deviate to either the left or right and the lateral balance of motorcycle 100 can easily be stabilized, and the driving feeling of motorcycle 100 can be improved.

Also, first clutch 74 and second clutch 75 are placed in approximately symmetrical positions approximately equidistant from a central plane passing through the lengthwise center of crankshaft 60 and perpendicular or substantially perpendicular to crankshaft 60. To be specific, first clutch 74 and second clutch 75 are connected to the ends farthest from each other (the base ends) of first main shaft 71 and second main shaft 72, respectively, placed on the same axis line parallel or substantially parallel to crankshaft 60, and are placed at positions separated by a predetermined distance perpendicular or substantially perpendicular to the axial direction of crankshaft 60 with respect to either end of crankshaft 60 respectively.

As a result, the degrees of projection in the vehicle width direction of parts (clutch case side cover sections 770a and 770b) covering first clutch 74 and second clutch 75 in the chassis of the drive unit accommodating first clutch 74 and second clutch 75 are approximately equal lengths with respect to a central plane passing through the lengthwise center and perpendicular or substantially perpendicular to the axis of crankshaft 60 of the drive unit.

Figure 57:
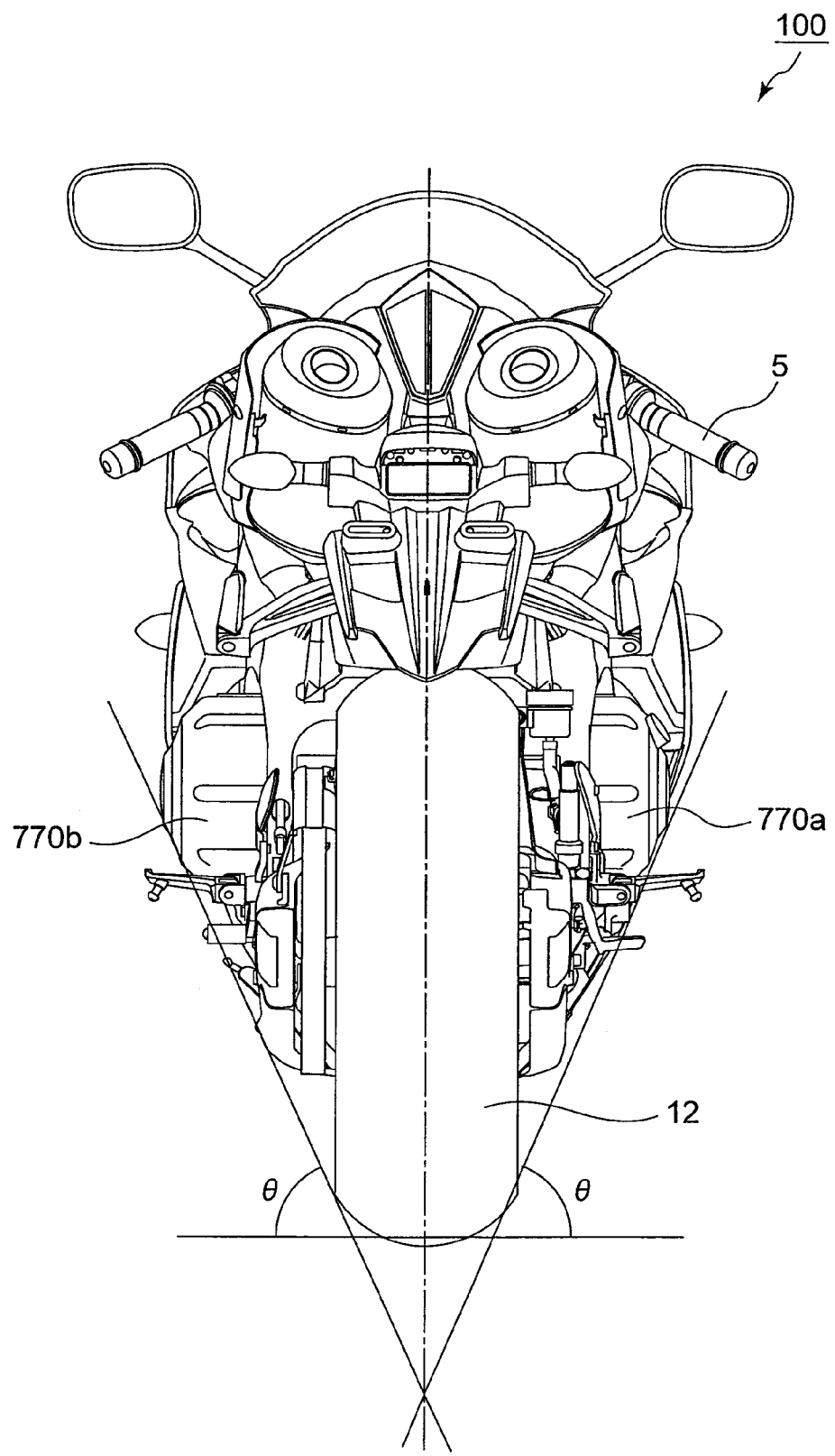
FIG. 57 is a rear view of a vehicle in which a transmission according to a preferred embodiment of the present invention is mounted in a vehicle.

Consequently, the drive unit can be mounted on motorcycle 100 with a perpendicular or substantially perpendicular plane passing through the approximate lengthwise center of crankshaft 60 in the drive unit aligned with the central plane of the body of motorcycle 100. Thus, as shown in FIG. 57, bank angle θ formed by the degree of projection of each of side cover sections 770a and 770b covering first clutch 74 and second clutch 75 from their respective sides can also be made narrow, and the posture of the rider is not constrained.

Also, in this preferred embodiment, first main shaft 71, second main shaft 72, first clutch 74, and second clutch 75 are placed higher than crankshaft 60 and drive shaft 73. In this case, the width of the lower portion of motorcycle 100 can be prevented from becoming large. As a result, the bank angle of motorcycle 100 can be made large, and the driving feeling of motorcycle 100 can be further improved.

Furthermore, since heavy first clutch 74 and second clutch 75 are placed in the drive unit in approximately laterally symmetrical positions about the center of gravity of the drive unit, it is not necessary to make the shape of the frame of motorcycle 100 in which the drive unit is mounted different between the left and the right, and good lateral rigidity can easily be provided in the frame.

Moreover, since first main shaft 71 and second main shaft 72 are provided separately, if one of the two power transfer paths (the path via first main shaft 71 and the path via second main shaft 72) that transfer torque from engine 6 to drive shaft 73 cannot be used, driving force can be output to rear wheel 12 using the other path.

Also, in this preferred embodiment, first input gear 40 meshes with crank web 61a placed at one end of crankshaft 60, and second input gear 50 meshes with crank web 61b placed at the other end of crankshaft 60. In this case, it is possible to prevent the center of gravity of engine 6 and the center of gravity of transmission mechanism 700 being significantly distanced from each other. As a result, the lateral balance of motorcycle 100 can be still more easily stabilized.

Furthermore, in this preferred embodiment, sprocket 76 is placed so that portion of sprocket 76 is in an area between second input gear 50 and second gear arranged in the lateral direction. In this case, sprocket 76 can be provided on drive shaft 73 without the center of transmission mechanism 700 in the lateral direction being significantly distanced from the center of motorcycle 100 in the lateral direction. As a result of this structure and arrangement, the width of motorcycle 100 can be prevented from becoming overly large.

Moreover, as shown in FIG. 3, sprocket 76 is placed so as to be exposed outside drive unit chassis 920. Specifically, sprocket 76 is attached to one end (the left end) of drive shaft 73 that projects rotatably from one side (the left side) of drive unit chassis 920. That is to say, sprocket 76 itself is placed in a state in which it projects externally on one side (the left side) of drive unit chassis 920. Drive unit chassis 920 accommodates crankshaft 60, first main shaft 71, an odd-numbered transmission gear mechanism (gears 81, 83, 85, 711, 712, and 731), first clutch 74, second main shaft 72, an even-numbered transmission gear mechanism (gears 82, 84, 86, 721, 722, and 732), second clutch 75, and drive shaft 73.

In this drive unit chassis 920, bell housing 930 and side cover section 770*b* forming a clutch case that accommodates second clutch 75 are placed on one side (the left side) of sprocket 76.

Bell housing 930 is placed so as to separate second clutch 75 from sprocket 76. To be specific, bell housing 930 is placed so as to separate an area accommodating second clutch 75 from a placement area of a driving force output portion comprising sprocket 76 and chain 13 wound around sprocket 76 and guided toward the back of the vehicle. Bell housing 930 and side cover section 770*b* are attached detachably to drive unit chassis 920 on one side (the left side).

Thus, removing side cover section 770*b*, second clutch 75, and bell housing 930 enables sprocket 76 to be exposed on one side of the vehicle, and maintenance of the drive chain and sprocket 76 can be performed while the drive unit, including engine 6, is mounted on vehicle (motorcycle) 100.

Also, in the drive unit, side cover sections 770*a* and 770*b* covering first clutch 74 and second clutch 75 from their respective sides can each be removed from drive unit chassis 920.

Thus, first clutch 74 and second clutch 75 can be exposed on both sides of vehicle (motorcycle) 100 while the drive unit is mounted on the vehicle, and clutch maintenance can be performed in the same way as with a conventional motorcycle equipped with a single clutch.

That is to say, even though the configuration is equipped with two clutches as opposed to the single clutch of a conventional motorcycle, clutch maintenance can be performed in the same way as with a conventional motorcycle.

Also, in this preferred embodiment, in the standard state of each gear position, either the odd-numbered gear group or the even-numbered gear group is held in a neutral position. This enables motorcycle 100 to be driven while first and second clutches 74 and are both connected.

Therefore, when motorcycle 100 is running in a certain gear position, it is not necessary to keep first and second clutch actuators 77 and 78 driven. This makes it possible to extend the life of first clutch actuator 77, second clutch actuator 78, and release bearings 70*a* and 80*a*, and also enables control of first and second clutch actuators 77 and 78 by ECU 10 to be simplified.

Also, in this preferred embodiment, when the gear position is switched, first and second clutches 74 and 75 are both placed in a half-clutch state. In this case, torque of sprocket 76 can be prevented from changing suddenly. As a result of this structure and arrangement, the driving feeling when the motorcycle changes the speed can be improved. Also, when the gear position is switched, transfer of torque from crankshaft 60 to sprocket 76 is not blocked, making a quick and smooth gear change operation possible.

Gear reduction ratios of first input gear 40 and second input gear 50 may be the same or may be different.

If the gear reduction ratio of first input gear 40 and the gear reduction ratio of second input gear 50 are made the same, the clutch capacity (the maximum torque at which clutch slippage is prevented) of first clutch 74 and the clutch capacity of second clutch 75 can be made equal. As a result of this structure and arrangement, commonality of parts can be achieved for first clutch 74 and second clutch 75, and the production cost of motorcycle 100 can be reduced.

On the other hand, if the gear reduction ratio of first input gear 40 and the gear reduction ratio of second input gear 50 are made different, the difference between the gear ratio of torque transferred to drive shaft 73 via first clutch 74 and the gear ratio of torque transferred to drive shaft 73 via second clutch 75 can be made large. As a result of this structure and arrangement, the range of gear ratios in transmission mechanism 700 can be increased, and the running performance of motorcycle 100 is improved.

Also, the clutch capacity of the clutch that is not normally used when motorcycle 100 starts moving, that is, second clutch 75, may be made smaller than the clutch capacity of first clutch 74. In this case, it is possible to make transmission mechanism 700 smaller and lighter. Moreover, the moment of inertia about the axis extending in the front-back direction of transmission mechanism 700 can be made smaller, improving the running performance of motorcycle 100.

In the above-described preferred embodiment, torque of crankshaft 60 is transferred to first and second clutches 74 and 75 via crank webs 61*a* and 61*b*, but the method of torque transfer from crankshaft 60 to first and second clutches 74 and 75 is not limited to the above example. For example, two gears for torque transfer may be provided on crankshaft 60, and torque of crankshaft 60 may be transferred to first and second clutches 74 and via those two gears.

Thus, transmission 7 of this preferred embodiment achieves good compactness, and, without deviation in lateral weight balance, allows smooth gear changing, and can be mounted easily on a motorcycle.

(4) Lubricating Oil Supply Path

Next, a lubricating oil supply path and supply method for supplying lubricating oil to first and second clutches 74 and 75 will be described using FIG. 4.

First main shaft 71 and second main shaft 72 have internal cavities 781 and 782 respectively that extend in the axial direction and open. Cavity 781 communicates with oil duct hole 781*a* that opens in first main shaft front end 71*b*, and cavity 782 is formed so as to communicate with oil duct hole 782*a* that opens in one end (here, front end) 72*b* of second main shaft 72. These oil duct holes 781*a* and 782*a* conduct lubricating oil supplied from the drive unit chassis side to cavities 781 and 782 in first main shaft 71 and second main shaft 72.

Also, a plurality of throughholes 783 communicating between cavity 781 and the exterior of first main shaft 71 are formed in first main shaft 71, and a plurality of throughholes 784 communicating between cavity 782 and the exterior of second main shaft 72 are formed in second main shaft 72.

Figure 27:
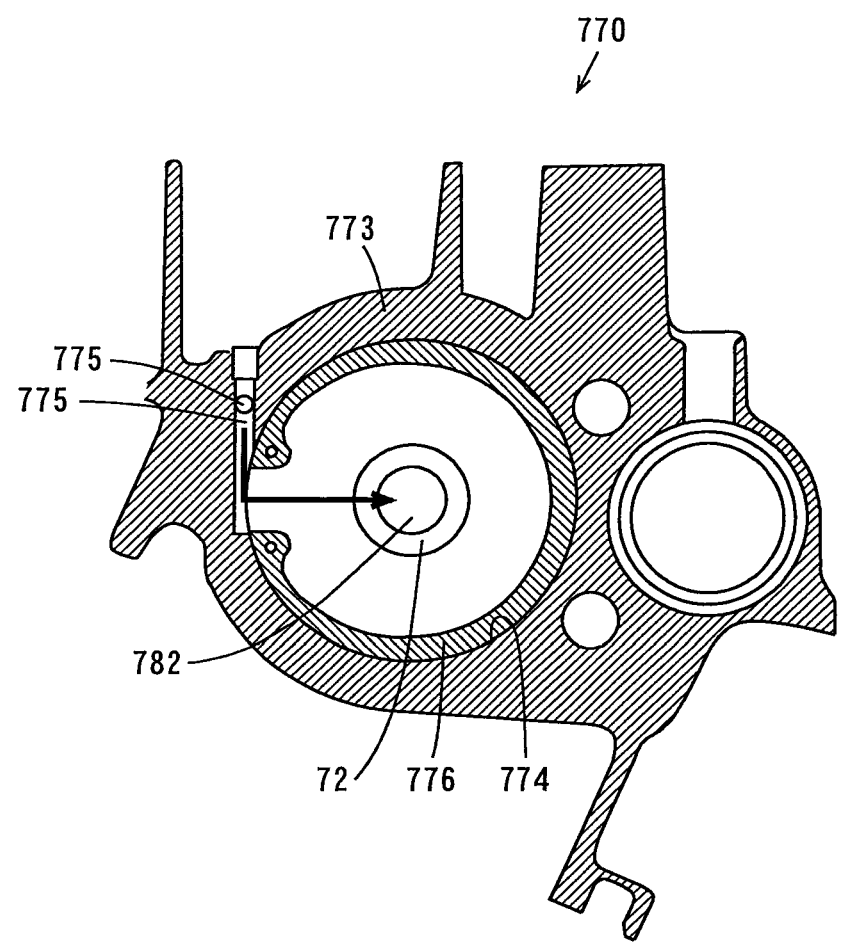
FIG. 27 is a cross-sectional view through line A-A in FIG. 4.

FIG. 27 is a cross-sectional view through line A-A in FIG. 4. As shown in FIG. 4 and FIG. 27, flange 773 inside mission case 770 has ring-shaped groove 774 in the center portion in the axial direction in the inner peripheral surface of the opening, fitting inside bearings 771 and 772. Also, lubricating oil supply path 775 is formed in flange 773 so as to communicate with groove 774. Lubricating oil supply path 775 is connected to a lubricating oil supply source (not shown).

Circlip 776 for securing bearings 771 and 772 is fitted into groove 774. In this preferred embodiment, circlip 776 is fitted in groove 774 so as not to block the communication section between groove 774 and lubricating oil supply path 775.

With this kind of configuration, lubricating oil supplied to lubricating oil supply path 775 from the lubricating oil supply source is supplied to the space inside flange 773 from one end of center hub 755 as shown by the arrow in FIG. 27. Lubricating oil supplied inside flange 773 flows from one end 71*b* of first main shaft 71 (FIG. 4) and one end 72*b* of second main shaft 72 into cavity 781 (FIG. 4) and cavity 782 via oil duct holes 781*a* and 782*a*. Lubricating oil that has flowed into cavity 781 is supplied to the interior of first clutch 74 and the outer periphery of first main shaft 71 via plurality of throughholes 783 (FIG. 4). As a result of this structure and arrangement, a rise in temperature of first clutch 74 is prevented, and fixed gear 711, fifth gear 85, and spline gear 712 are lubricated. Also, lubricating oil that has flowed into cavity 782 is supplied to the interior of second clutch 75 and the outer periphery of second main shaft 72 via plurality of throughholes 784 (FIG. 4). As a result of this structure and arrangement, a rise in temperature of second clutch 75 is prevented, and spline gear 722, sixth gear 86, and fixed gear 721 are lubricated.

Thus, in transmission 7 of this preferred embodiment, lubricating oil supplied to the space inside flange 773 is divided into two by cavity 781 and cavity 782, and is supplied to first clutch 74 and second clutch 75. As a result of this structure and arrangement, lubricating oil can be supplied uniformly to first clutch and second clutch 75. In this case, inadequate lubrication of either one of first and second clutches 74 and 75 can be prevented, and an improvement in the durability of first and second clutches 74 and 75 can be achieved.

(5) Shift Mechanism

Next, shift mechanism 701 will be described.

FIG. 28 is a simplified table of the relationships between the gear positions, odd-numbered gears, and even-numbered gears shown in FIG. 15.

As shown in FIG. 28, in this preferred embodiment, when transmission mechanism 700 is shifted up or shifted down, the odd-numbered gear group and even-numbered gear group are set to a neutral position. To be specific, when the gear position in transmission mechanism 700 is set to first gear, third gear, or fifth gear, the even-numbered gear group is set to the neutral position, and when the gear position in transmission mechanism 700 is set to second gear, fourth gear, or sixth gear, the odd-numbered gear group is set to the neutral position.

Therefore, when transmission mechanism 700 is shifted up one gear or shifted down one gear, a spline gear is connected to a transmission gear from among the odd-numbered gear group set to the neutral position or a transmission gear from among the even-numbered gear group set to the neutral position.

Of the above-described transmission gear connected to a spline gear and that spline gear, rotation of crankshaft 60 (see FIG. 2) is transferred to one gear, and rotation of drive shaft 73 is transferred to the other gear. Consequently, the spline gear rotation speed and the transmission gear rotation speed are different. In order to fit and connect a spline gear and a transmission gear in this state, it is necessary to move the spline gear toward the transmission gear at high speed. In order to do this, shift cam 14 must be rotated with large torque.

According to shift mechanism 701 of this preferred embodiment (see FIG. 2), shift cam 14 can be rotated with large torque. Consequently, a spline gear can be moved at high speed. As a result, a spline gear and a transmission gear can be fitted and connected dependably. Shift mechanism 701 will now be described in detail using accompanying drawings.

(5-1) General Configuration

First, the general configuration of shift cam drive unit 800 will be described using accompanying drawings.

Figure 29:
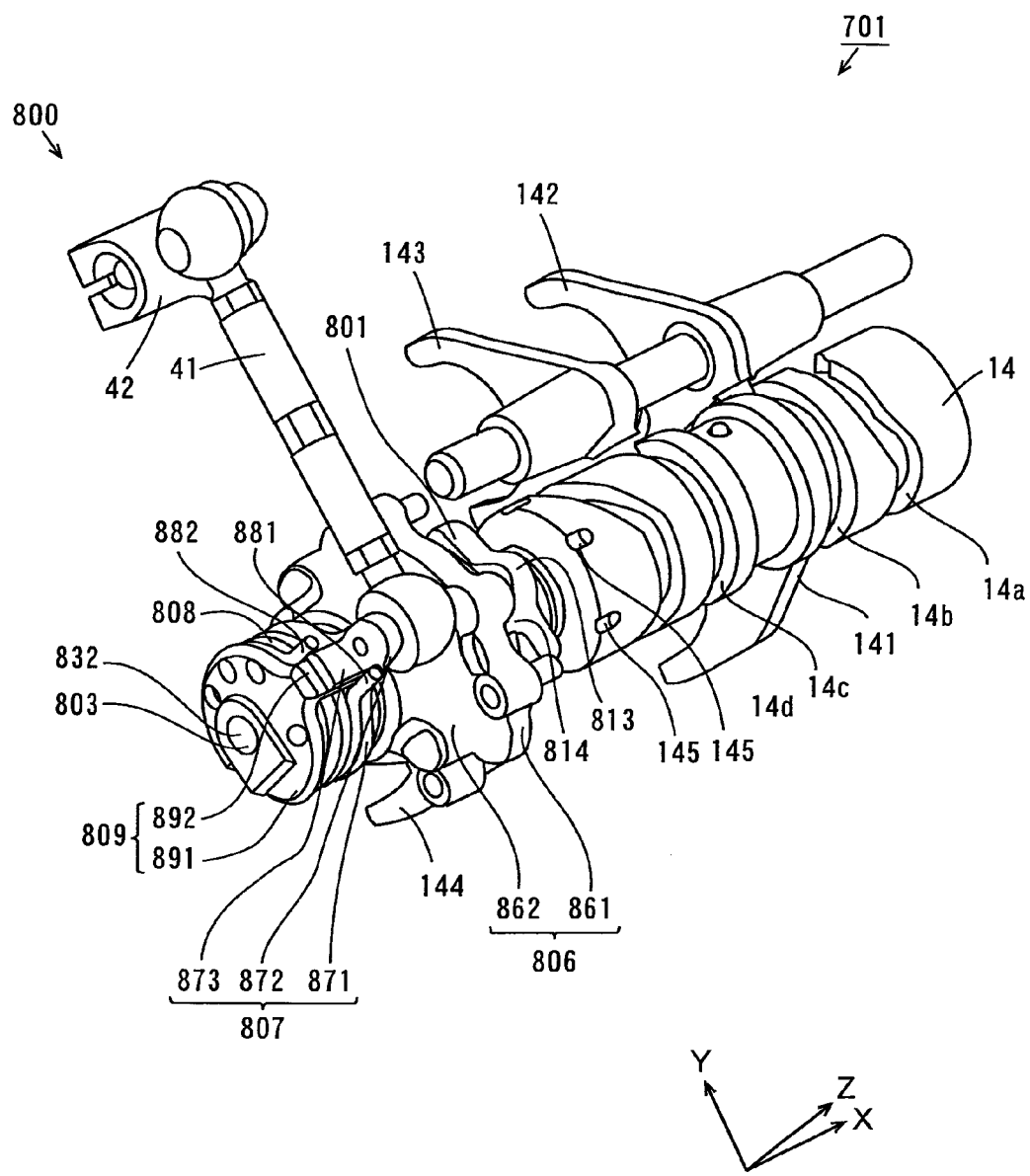
FIG. 29 is a perspective view of a shift mechanism.
Figure 30:
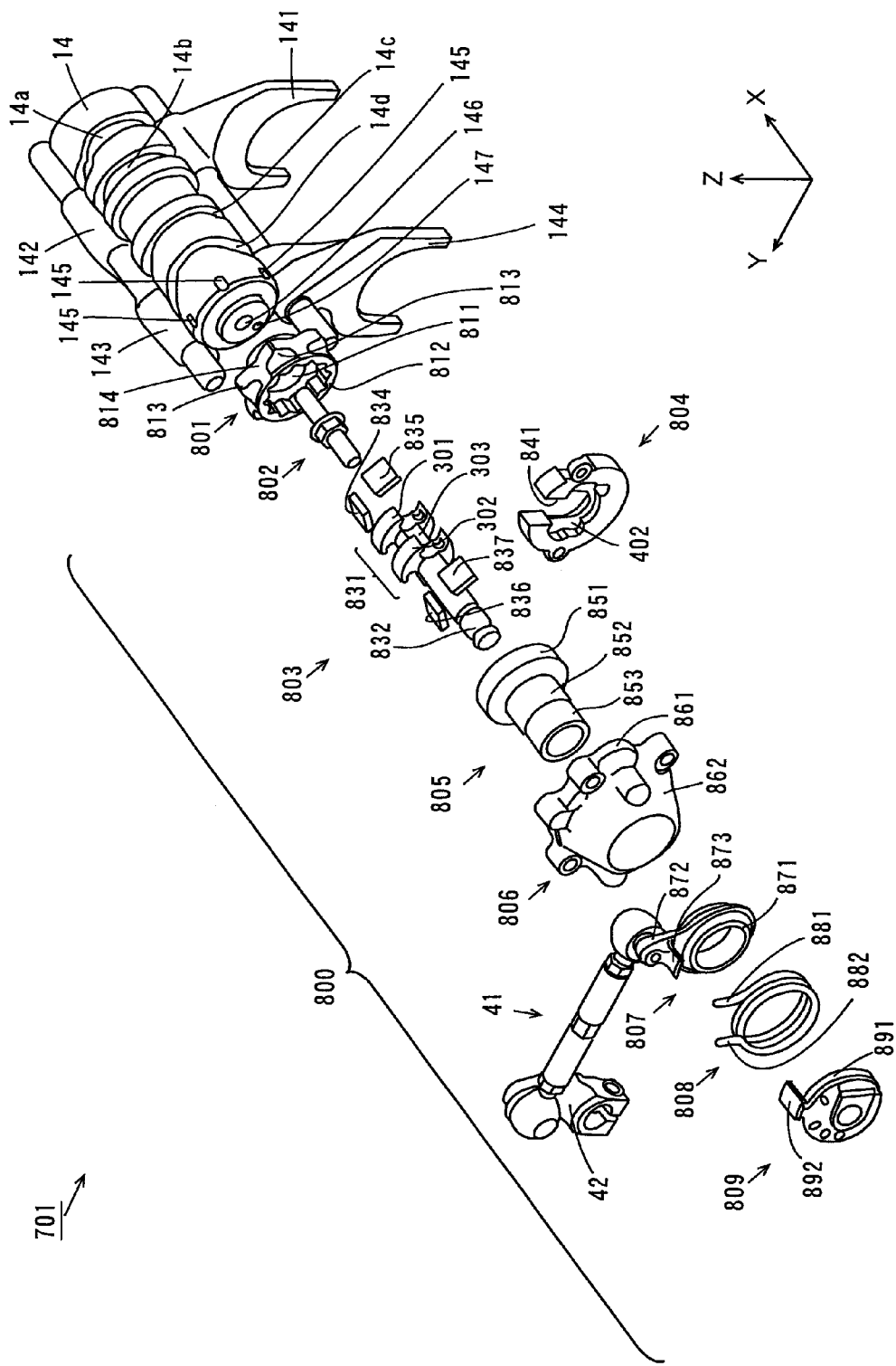
FIG. 30 is an exploded perspective view of the shift mechanism.
Figure 31:
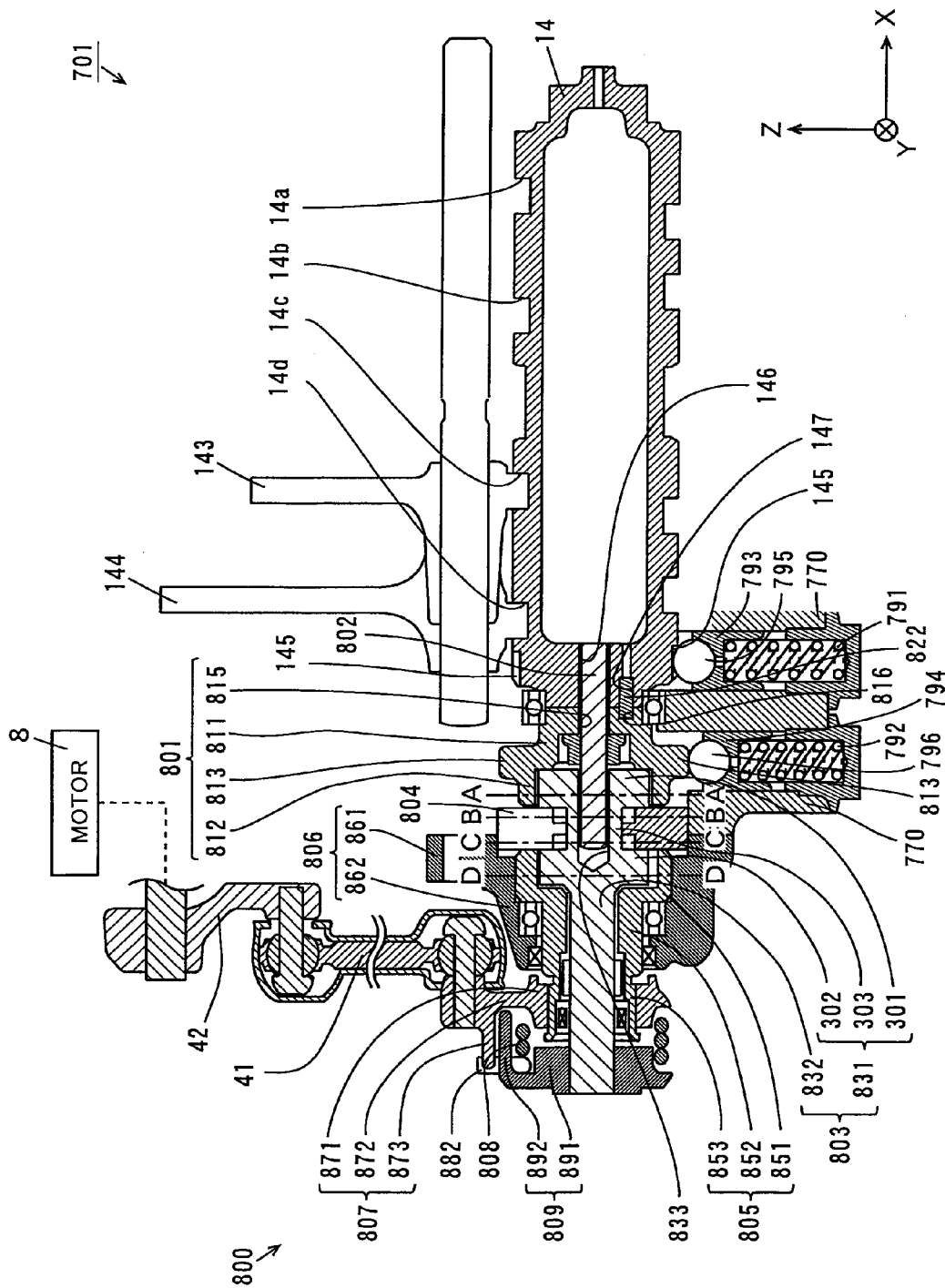
FIG. 31 is a cross-sectional view of the shift mechanism.

FIG. 29 is a perspective view of shift mechanism 701, FIG. 30 is an exploded perspective view of shift mechanism 701, and FIG. 31 is a cross-sectional view of shift mechanism 701.

Figure 32:
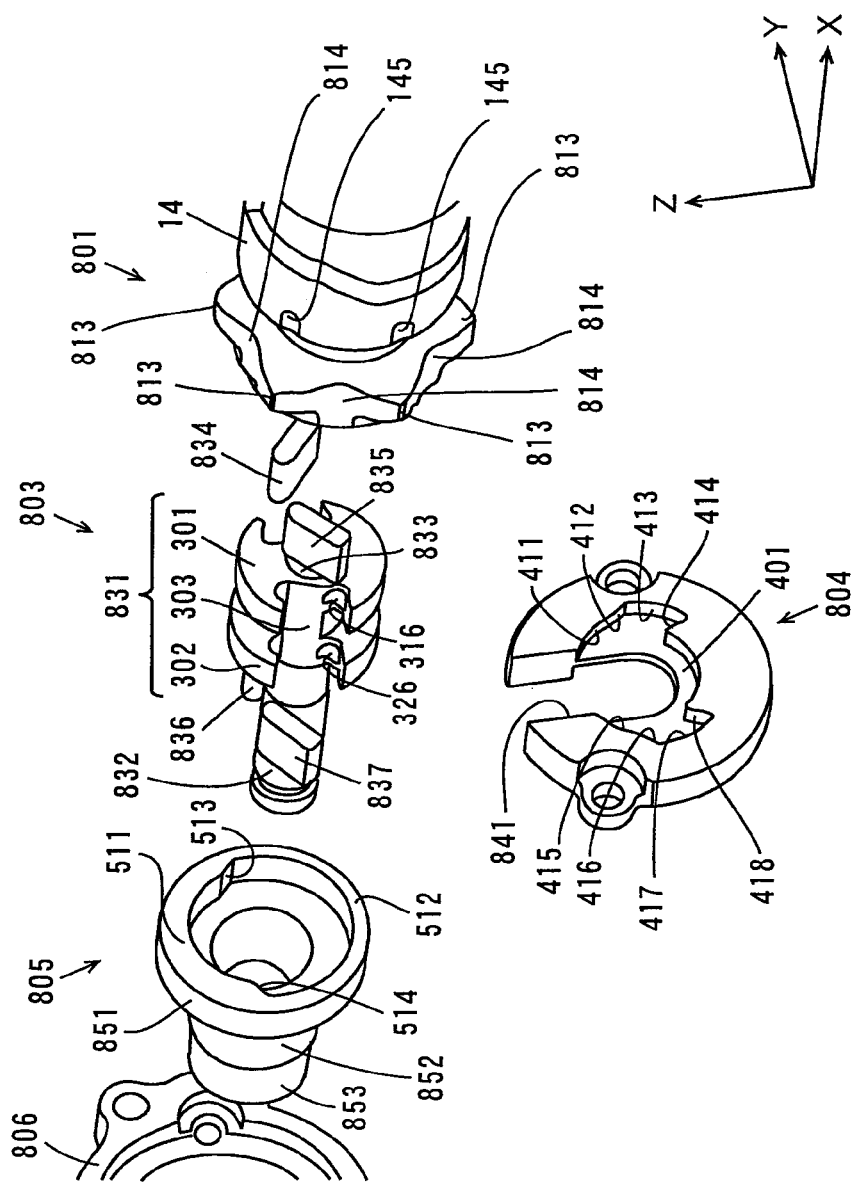
FIG. 32 is a partial exploded perspective view showing a portion of the shift mechanism.

FIG. 32 is a partial exploded perspective view showing a portion of shift mechanism 701 viewed from a different direction to that in FIG. 29. In FIG. 29 through FIG. 32, and in following FIG. 33 through FIG. 41, shift mechanism 701 is illustrated in a standard state (see FIG. 15).

In FIG. 29 through FIG. 32, and in following FIG. 33 through FIG. 51, mutually orthogonal X-direction, Y-direction, and Z-direction arrows are provided to clarify positional relationships. The X direction and Y direction are mutually orthogonal in the horizontal plane, and the Z direction corresponds to the vertical direction. For each direction, the direction in which an arrow is pointed denotes the + direction, and the opposite direction denotes the − direction. For the Z direction, the direction in which an arrow is pointed denotes the upward direction, and the opposite direction denotes the downward direction.

As shown in FIG. 29 through FIG. 31, shift mechanism 701 includes shift cam 14, shift forks 141 through 144, and shift cam drive unit 800.

Shift cam 14 has a cylindrical shape. A plurality of groove sections 145 are formed in one end of the outer peripheral surface of shift cam 14. In this preferred embodiment, six groove sections 145 are formed at 60° intervals around the axial center of shift cam 14. As shown in FIG. 30 and FIG. 31, throughhole 146 is formed in the center portion of one side surface of shift cam 14. Also, latch hole 147 is formed at a position deviating from the center portion of the other side surface of shift cam 14.

As shown in FIG. 29 through FIG. 31, shift cam drive unit 800 includes first rotating member 801, positioning shaft 802 (FIG. 30 and FIG. 31), second rotating member 803, regulating member 804 (FIG. 30 and FIG. 31), third rotating member 805 (FIG. 30 and FIG. 31), accommodating member 806, first transferring member 807, torsion spring 808, and second transferring member 809.

As shown in FIG. 30 and FIG. 31, first rotating member 801 has small-diameter cylindrical section 811 and large-diameter cylindrical section 812. As shown in FIG. 29 through FIG. 32, a plurality of projecting sections 813 with an approximately triangular cross-section are formed on the outer periphery of first rotating member 801 so as to project radially outward. In this preferred embodiment, six projecting sections 813 are formed at 60° intervals around the axial center of first rotating member 801. Also, concave sections 814 formed by adjacent projecting sections 813 are formed in the circumferential direction.

As shown in FIG. 31, throughhole 815 is formed in the center portion of a side surface of cylindrical section 811. Also, latch hole 816 is formed at a position deviating from the center portion of a side surface of cylindrical section 811.

One end of positioning shaft 802 is inserted into throughhole 146 and throughhole 815. As a result of this structure and arrangement, the rotation axis of shift cam 14 and the rotation axis of first rotating member 801 are provided on the same axis line. Also, cylindrical section 811 and shift cam 14 are coupled so that latch member 822 is fitted into latch hole 147 and latch hole 816. As a result of this structure and arrangement, it becomes possible for shift cam 14 and first rotating member 801 to rotate integrally.

Springs 791 and 792 are provided inside mission case 770. Moving member 793 is abutted against one end of spring 791. Moving member 793 is provided so as to be movable in the axial direction of spring 791. Also, moving member 794 is abutted against one end of spring 792. Moving member 794 is provided so as to be movable in the axial direction of spring 792.

Ball 795 is provided between moving member 793 and one end of the outer peripheral surface of shift cam 14. Ball 795 is biased toward shift cam 14 by spring 791 via moving member 793. Also, ball 796 is provided between moving member 794 and the outer peripheral surface of first rotating member 801 (an area formed by projecting section 813 and concave section 814 (FIG. 30)). Ball 796 is biased toward first rotating member 801 by spring 792 via moving member 794. Details of first rotating member 801 will be given later herein. First rotating member 801, projecting section 813, concave section 814, springs 791 and 792, balls 795 and 796 and so on correspond to a cam phase holding device arranged to hold shift cam 14 in phases determined per a certain rotation angle (30° with the present preferred embodiment). Groove section 145, concave section 814, springs 791 and 792, balls 795 and 796 and so on correspond to a torque supply section for supplying torque to shift cam 14. In this case, the set of spring 792, moving member 794, ball 796, projecting section 813 and concave section 814, and the set of spring 791, moving member 793, ball 795, and groove section 145 are each able to supply torque to the rotation direction while shaft cam 14 is rotating.

As shown in FIG. 30 through FIG. 32, second rotating member 803 has rotor 831 and shaft section 832 formed so as to extend in the axial direction of that rotor 831. As shown in FIG. 31 and FIG. 32, cylindrical hole 833 is formed in the axial center section of rotor 831.

As shown in FIG. 30 through FIG. 32, rotor 831 includes first ratchet 301, second ratchet 302, and cylindrical coupling section 303 that is provided so as to couple first ratchet 301 and second ratchet 302.

As shown in FIG. 30 and FIG. 32, lug plates 834 and 835 are attached to first ratchet 301, and lug plates 836 and 837 are attached to second ratchet 302.

As shown in FIG. 31, the other end of positioning shaft 802 is inserted into hole 833. As a result of this structure and arrangement, the rotation axis of shift cam 14, the rotation axis of first rotating member 801, and the rotation axis of second rotating member 803 are provided on the same axis line. First ratchet 301 is accommodated inside cylindrical section 812.

As shown in FIG. 30 and FIG. 32, regulating member 804 is disk-shaped. As shown in FIG. 32, first concave section 401 is formed in the center portion of the surface of regulating member 804 on the +X direction side. Also, as shown in FIG. 30, second concave section 402 is formed in the center portion of the surface of regulating member 804 on the −X direction side.

Also, as shown in FIG. 30 and FIG. 32, latch section 841 is formed on regulating member 804 so as to extend upward from the center portion. As shown in FIG. 31, coupling section 303 of second rotating member 803 is fitted into latch section 841.

As shown in FIG. 30 through FIG. 32, third rotating member 805 has first cylindrical section 851, second cylindrical section 852, and third cylindrical section 853. As shown in FIG. 31, second rotating member 803 is provided rotatably inside third rotating member 805, second ratchet 302 is accommodated inside first cylindrical section 851, and one end of shaft section 832 projects from one end of third cylindrical section 853.

As shown in FIG. 29 through FIG. 31, accommodating member 806 has flange 861 and cylindrical accommodating section 862. As shown in FIG. 31, flange 861 is attached to mission case 770. As a result of this structure and arrangement, accommodating member 806 is fixed. Regulating member 804 is fixed to accommodating member 806.

Third rotating member 805 is provided rotatably inside accommodating member 806. First cylindrical section 851 and second cylindrical section 852 are accommodated inside accommodating section 862. Third cylindrical section 853 projects from one end of accommodating member 806.

As shown in FIG. 29 through FIG. 31, first transferring member 807 has disk-shaped main unit 871 and coupling section 872. Coupling section 872 is formed so as to extend upward from the outer periphery of main unit 871. Plate-shaped latch section 873 is formed on coupling section 872 so as to extend in the −X direction.

As shown in FIG. 31, main unit 871 is fixed to third cylindrical section 853 in third rotating member 805. Also, as shown in FIG. 29 through FIG. 31, coupling section 872 is coupled to one end of drive mechanism 41. The other end of drive mechanism 41 is coupled to the rotating shaft (not shown) of motor 8 (FIG. 1). Third rotating member 805 and first transferring member 807 correspond to a transferring device arranged to rotate by rotation power of motor 8 (see FIG. 1) in one of the forward and reverse direction from the reference rotation position, and, by transferring that rotation to the rotating device, makes the rotating device rotate. Torsion spring 808, which increases bias following increase in the rotation angle of the rotation of third rotating member 805, first transferring member 807 or corresponding transmitting device in one direction, provides a bias accumulating device arranged to accumulate increasing bias of torsion spring 808, with regulating member 804, third rotating member 805, first transferring member 807, second rotating member 809, and engaging sections 873 and 892. Regulating member 804 and third rotating member 805 correspond to a regulating device arranged to regulate the rotation of the rotating device until a predetermined rotation angle is reached during rotation of third rotating member 805 and first transferring member 807 in one direction. Furthermore, regulating member 804 and third rotating member 805 enable third rotating member 805 and first transferring member 807 to rotate in one direction at or beyond a predetermined rotation angle. Regulating member 804 and third rotating member 805 correspond to an accumulated torque releasing device that, when the rotation angle of third rotating member 805 and first transferring member 807 reaches the predetermined rotation angle, releases the bias that is accumulated by torsion spring 808 and so on and transfers this in the form of torque to third rotating member 805 and first transferring member 807.

As shown in FIG. 29 through FIG. 31, torsion spring 808 has first latch section 881 (FIG. 29 and FIG. 30) and second latch section 882. First latch section 881 is formed by one bending end of torsion spring 808, and second latch section 882 is formed by the other bending end of torsion spring 808.

Second transferring member 809 has disk-shaped main unit 891 and latch section 892, having an approximately L-shaped cross-section, formed on the upper portion of main unit 891. Latch section 892 is formed so that its front end extends in the +X direction. Second transferring member 809 and second rotating member 803 correspond to a rotating device arranged to rotate shift cam 14 at a certain rotation angle (about 30°, for example). Second transferring member 809 and second rotating member 803 correspond to a rotating device, and, by the rotation of third rotating member 805 and first transferring member 807 to which torque is transferred from regulating member 804 and third rotating member 805, rotates shift cam 14 that is held in the cam phase holding device.

As shown in FIG. 29 and FIG. 31, main unit 891 of second transferring member 809 is fixed to one end of shaft section 832 in second rotating member 803. One end of main unit 871 in first transferring member 807 and one end of main unit 891 in second transferring member 809 are fitted inside the inner diameter of torsion spring 808. As a result of this structure and arrangement, main unit 871 and main unit 891 become the approximate rotation axis of torsion spring 808.

As shown in FIG. 29, latch section 873 of first transferring member 807 and latch section 892 of second transferring member 809 are provided between first latch section 881 and second latch section 882 of torsion spring 808. Also, as shown in FIG. 29 and FIG. 31, latch section 873 is provided above latch section 892, with a gap between the two.

(5-2) Internal Configuration of Shift Cam Drive Unit

The internal configuration of shift cam drive unit 800 will now be described using accompanying drawings.

Figure 33:
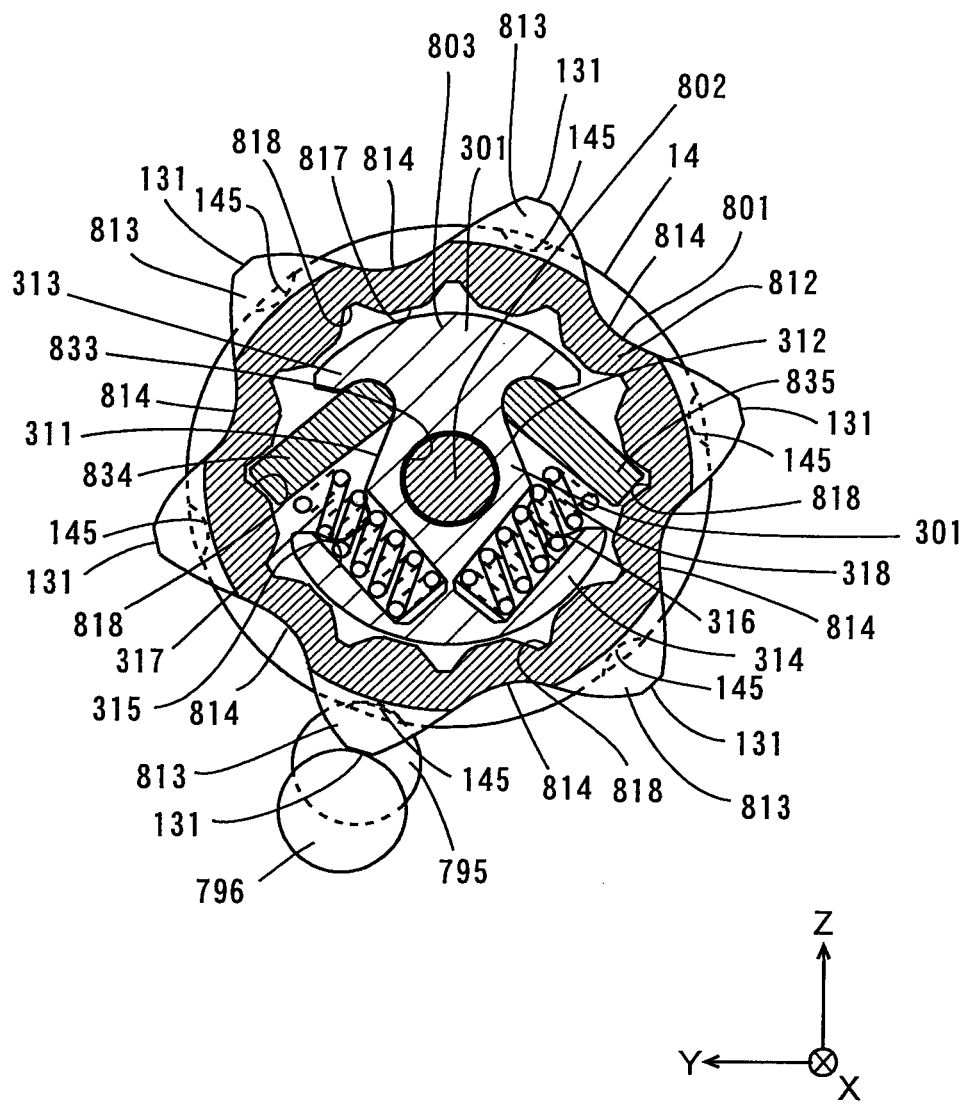
FIG. 33 is a cross-sectional view through line A-A in FIG. 31.
Figure 34:
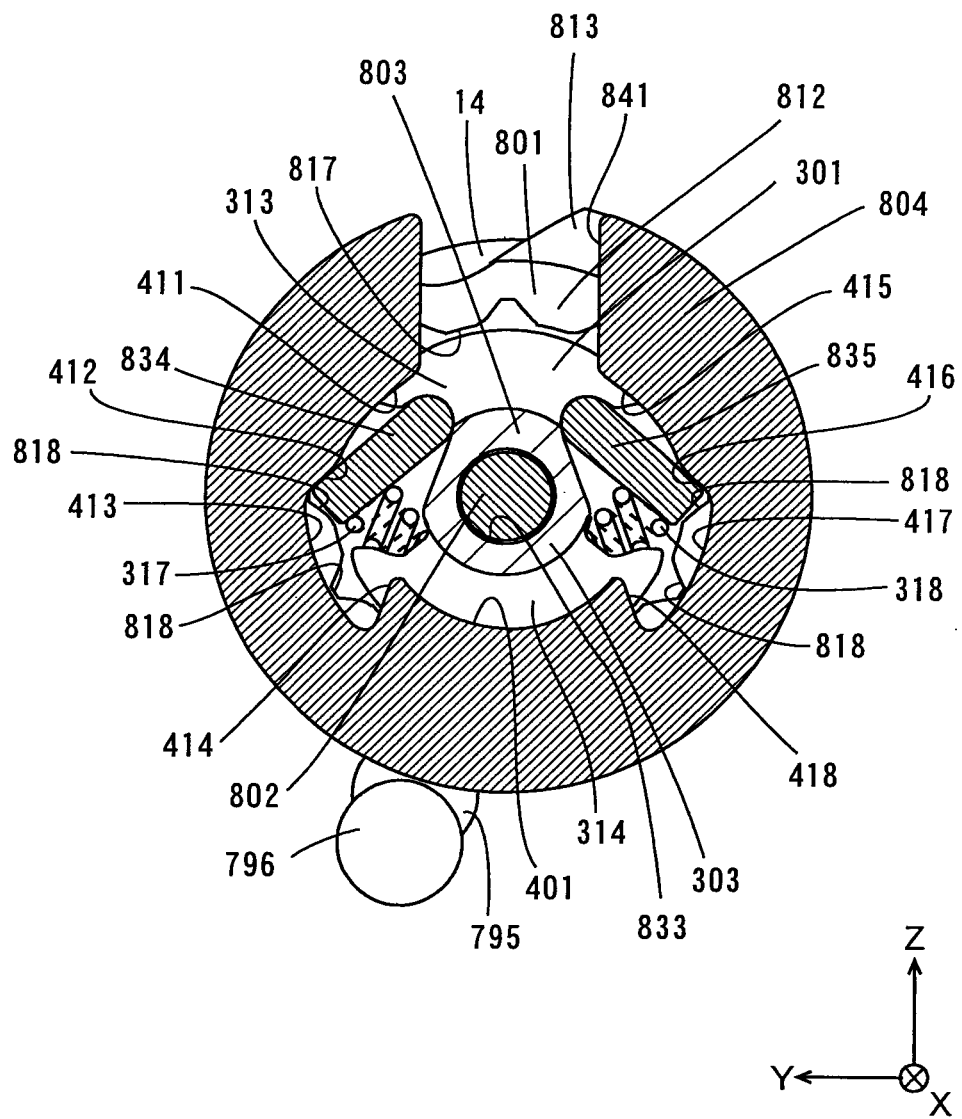
FIG. 34 is a cross-sectional view through line B-B in FIG. 31.
Figure 35:
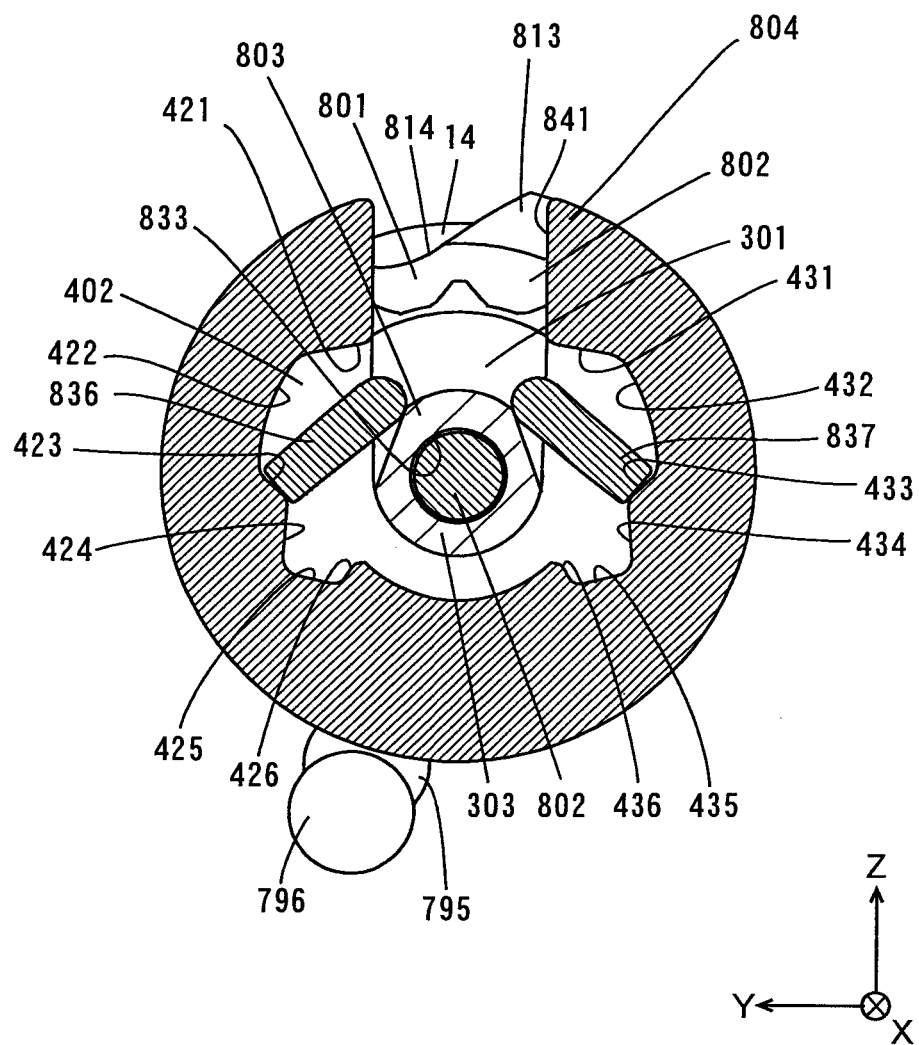
FIG. 35 is a cross-sectional view through line C-C in FIG. 31.
Figure 37:
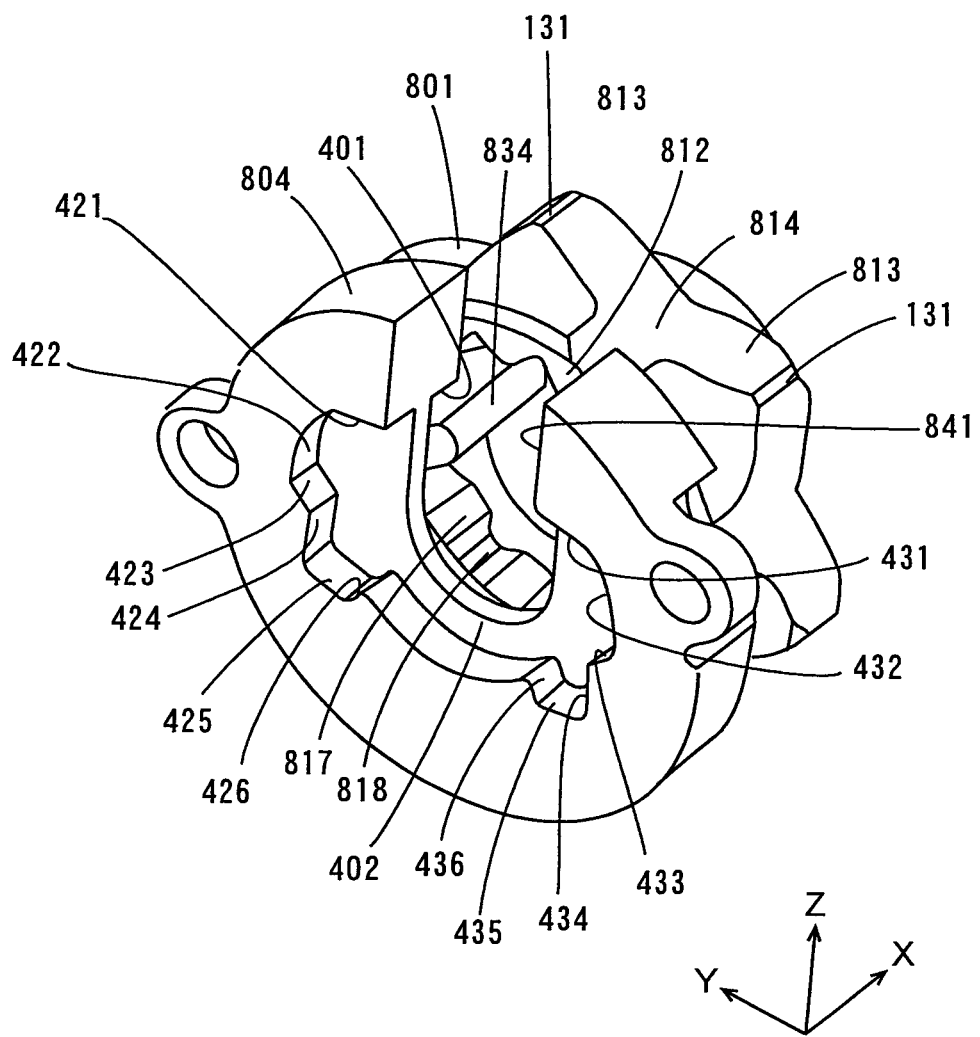
FIG. 37 is a perspective view showing a first rotating member and regulating member.
Figure 38:
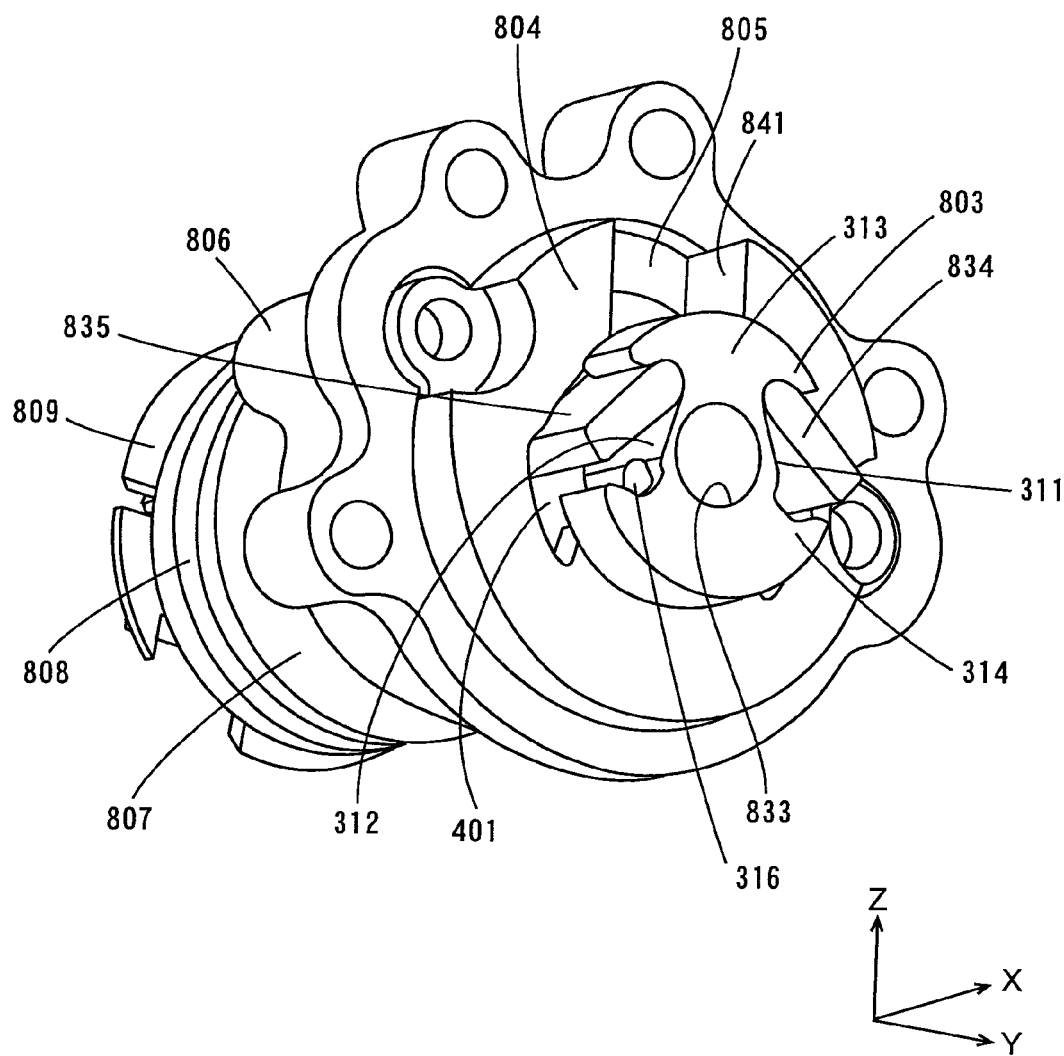
FIG. 38 is a perspective view showing a second rotating member, regulating member, third rotating member, accommodating member, first transferring member, torsion spring, and second transferring member.
Figure 39:
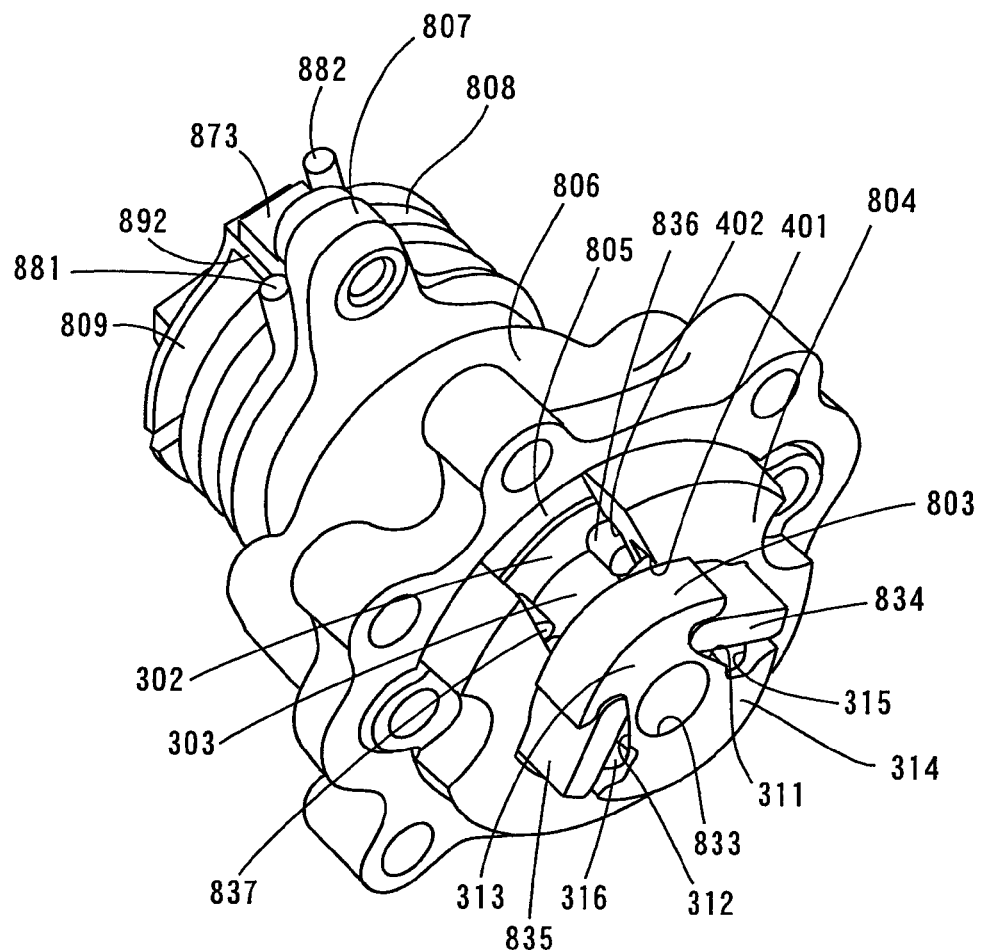
FIG. 39 is a perspective view showing the second rotating member, regulating member, third rotating member, accommodating member, first transferring member, torsion spring, and second transferring member.
Figure 40:
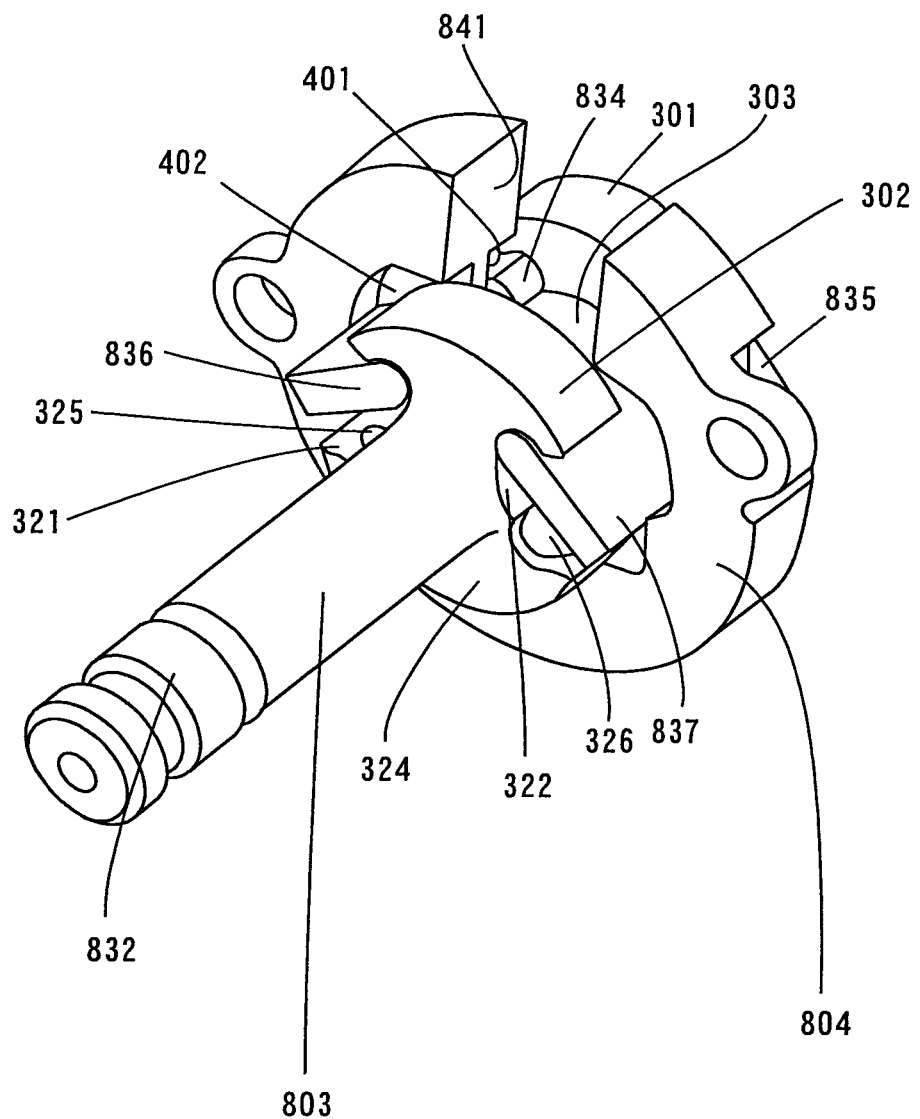
FIG. 40 is a perspective view showing a second rotating member and regulating member.
Figure 41:
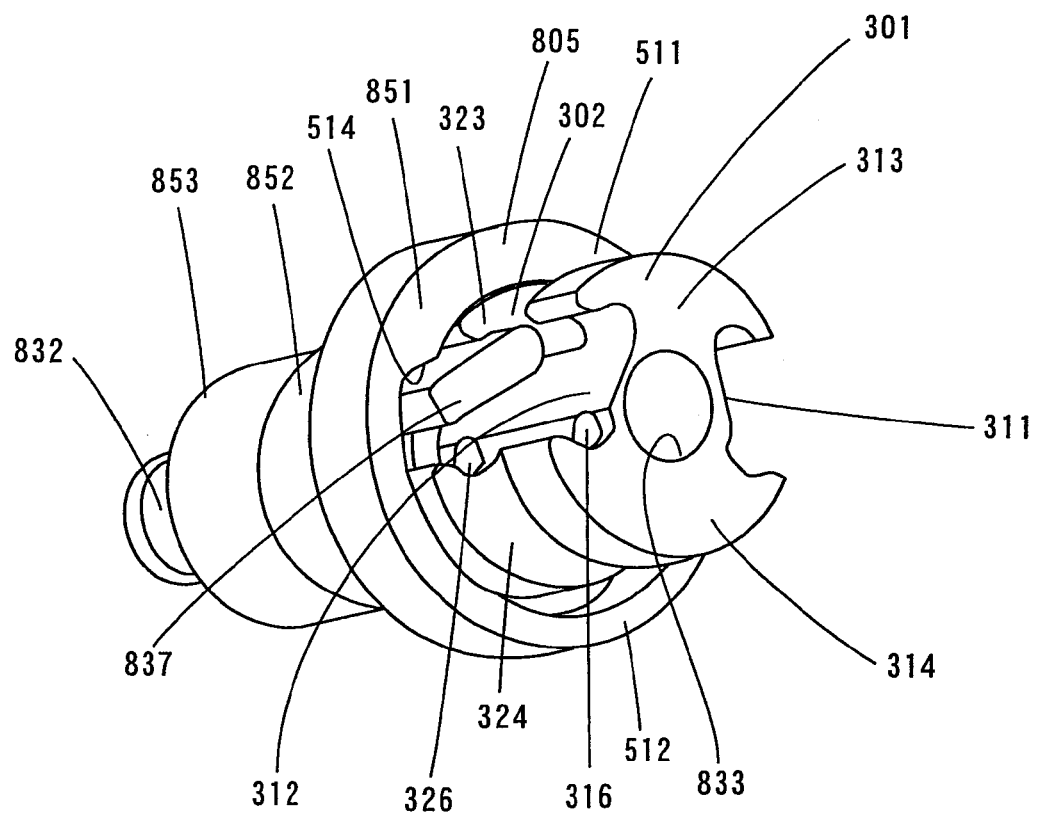
FIG. 41 is a perspective view showing the second rotating member and third rotating member.

FIG. 33 is a cross-sectional view of the portion of shift mechanism 701 indicated by line A-A in FIG. 31, FIG. 34 is a cross-sectional view of the portion of shift mechanism 701 indicated by line B-B in FIG. 31, FIG. 35 is a cross-sectional view of the portion of shift mechanism 701 indicated by line C-C in FIG. 31, and FIG. 35 is a cross-sectional view of the portion of shift mechanism 701 indicated by line D-D in FIG. 31. FIG. 37 is a perspective view showing first rotating member 801 and regulating member 804, and FIG. 38 and FIG. 39 are perspective views showing second rotating member 803, regulating member 804, third rotating member 805, accommodating member 806, first transferring member 807, torsion spring 808, and second transferring member 809. FIG. 40 is a perspective view showing second rotating member 803 and regulating member 804, and FIG. 41 is a perspective view showing second rotating member 803 and third rotating member 805.

As shown in FIG. 33, chamfering surface 131 is formed at the apex of each of projecting sections 813. Chamfering surface 131 is formed by a predetermined circumferential surface centered on the axial center of first rotating member 801. In this preferred embodiment, in the YZ plane, chamfering surfaces 131 and groove sections 145 are placed on approximately the same radius centered on positioning shaft 802, and first rotating member 801 and shift cam 14 are coupled.

Also, ball 795 and ball 796 are placed in the YZ plane so that the direction of the center point of ball 795 with respect to positioning shaft 802, and the direction of the center point of ball 796 with respect to positioning shaft 802, are identical.

As shown in FIG. 33 and FIG. 37, inner peripheral surface 817 of cylindrical section 812 has a concavo-convex shape. To be specific, concave surfaces 818 with an approximately V-shaped cross-section are formed in inner peripheral surface 817 at 30° intervals around the axial center of cylindrical section 812.

As shown in FIG. 33, FIG. 38, and FIG. 39, concave section 311 and concave section 312 are formed in first ratchet 301 (see FIG. 33) so as to curve inward. First fan-shaped section 313 is formed on the upper portion of first ratchet 301, and second fan-shaped section 314 is formed on the lower portion of first ratchet 301. First ratchet 301 is formed so as to be symmetrical with respect to a plane through the center in the YZ plane of fan-shaped section 313 including the rotation axis of second rotating member 803, and have a uniform shape in the X direction.

As shown in FIG. 33, one end of lug plate 834 is fitted into a curving corner on the upper side of concave section 311. and lug plate 834 is provided so as to be able to pivot about one end. Also, one end of lug plate 835 is fitted into a curving corner on the upper side of concave section 312, and lug plate 835 is provided so as to be able to pivot about one end. In the following description, the other end of lug plate 834 denotes the front end of lug plate 834, and the other end of lug plate 835 denotes the front end of lug plate 835.

Hole 315 is formed in second fan-shaped section 314 on the concave section 311 side. Hole 315 is formed so as to extend from the center portion of the lower portion of second fan-shaped section 314 toward the lower corner of concave section 311. Also, hole 316 is formed in second fan-shaped section 314 on the concave section 312 side. Hole 316 is formed so as to extend from the center portion of the lower portion of second fan-shaped section 314 toward the lower corner of concave section 312.

Spring 317 is provided inside hole 315. One end of spring 317 is abutted against the lower surface of lug plate 834. In this preferred embodiment, spring 317 dimensions are set so that, in a standard state, the front end surface of lug plate 834 faces the lower inclined surface of concave surface 818 positioned in the +Y direction of positioning shaft 802 in a state in which it is brought close thereto.

Also, spring 318 is provided inside hole 316.

One end of spring 318 is abutted against the lower surface of lug plate 835. In this preferred embodiment, the dimensions of spring 318 are set so that, in a standard state, the front end surface of lug plate 835 faces the lower inclined surface of concave surface 818 positioned in the −Y direction of positioning shaft 802 in a state in which it is brought close thereto.

As shown in FIG. 33, FIG. 37, and FIG. 38, the +X direction sides of lug plates 834 and 835 are accommodated inside cylindrical section 812. Also, as shown in FIG. 34 and FIG. 37 through FIG. 39, the −X direction sides of lug plates 834 and 835 are accommodated inside first concave section 401 of regulating member 804.

As shown in FIG. 34 and FIG. 35, first concave section 401 and second concave section 402 are formed so as to be symmetrical with respect to a plane passing through the center in the YZ plane of fan-shaped section 313 in a standard state including the rotation axis of second rotating member 803, and have a uniform shape in the X direction.

As shown in FIG. 32 and FIG. 34, first concave section 401 has guiding surface 411, auxiliary surface 412, partial cylindrical section 413, and latching surface 414 provided in order from above on the +Y direction side, together with guiding surface 415, auxiliary surface 416, partial cylindrical section 417, and latching surface 418 provided in order from above on the −Y direction side.

As shown in FIG. 34, guiding surface 411 is formed so as to extend downward obliquely from the latch section 841 side. Guiding surface 411 curves gently so as to become convex in the outward direction of regulating member 804 in the YZ plane. Also, guiding surface 411 is provided farther inward (on the inner diameter) than inner peripheral surface 817 of cylindrical section 812 in the YZ plane.

Auxiliary surface 412 is formed so as to become approximately coplanar with the upper inclined surface of concave surface 818 positioned to the side of positioning shaft 802 in a standard state. Partial cylindrical section 413 is formed so as to be positioned on the circumference of a predetermined circle with the axial center of second rotating member 803 as its center. Partial cylindrical section 413 is provided farther outward (on the outer diameter) than inner peripheral surface 817.

Latching surface 414 is formed so as to be approximately parallel or substantially parallel to the upper inclined surface in concave surface 818 one down from concave surface 818 positioned to the side of positioning shaft 802 in a standard state. Also, the distance between latching surface 414 and the above-mentioned inclined surface is set so as to be approximately equal to the thickness of lug plate 834. Latching surface 414 is formed so as to extend as far as a position farther inward (on the inner diameter) than inner peripheral surface 817 of cylindrical section 812 in the YZ plane.

Guiding surface 415, auxiliary surface 416, partial cylindrical section 417, and latching surface 418 are formed in the same way, respectively, as guiding surface 411, auxiliary surface 412, partial cylindrical section 413, and latching surface 414.

As shown in FIG. 35 and FIG. 37, second concave section 402 has upper surface 421, partial cylindrical section 422, trigger surface 423, open surface 424, bottom surface 425, and latching surface 426 provided in order from above on the +Y direction side, together with upper surface 431, partial cylindrical section 432, trigger surface 433, open surface 434, bottom surface 435, and latching surface 436 provided in order from above on the −Y direction side.

As shown in FIG. 35, upper surface 421 is formed so as to extend in the +Y direction from the side of latch section 841. Partial cylindrical section 422 is formed so as to be positioned on the circumference of a predetermined circle with the axial center of second rotating member 803 as its center.

Trigger surface 423 is formed so as to extend downward obliquely in an approximately horizontal direction of positioning shaft 802. Open surface 424 is formed so as to extend in an approximately vertical direction farther than partial cylindrical section 422 on the positioning shaft 802 side. Bottom surface 425 is formed so as to incline gently. Latching surface 426 is formed so as to extend upward obliquely.

Upper surface 431, partial cylindrical section 432, trigger surface 433, open surface 434, bottom surface 435, and latching surface 436 are formed in the same way, respectively, as upper surface 421, partial cylindrical section 422, trigger surface 423, open surface 424, bottom surface 425, and latching surface 426.

Figure 36:
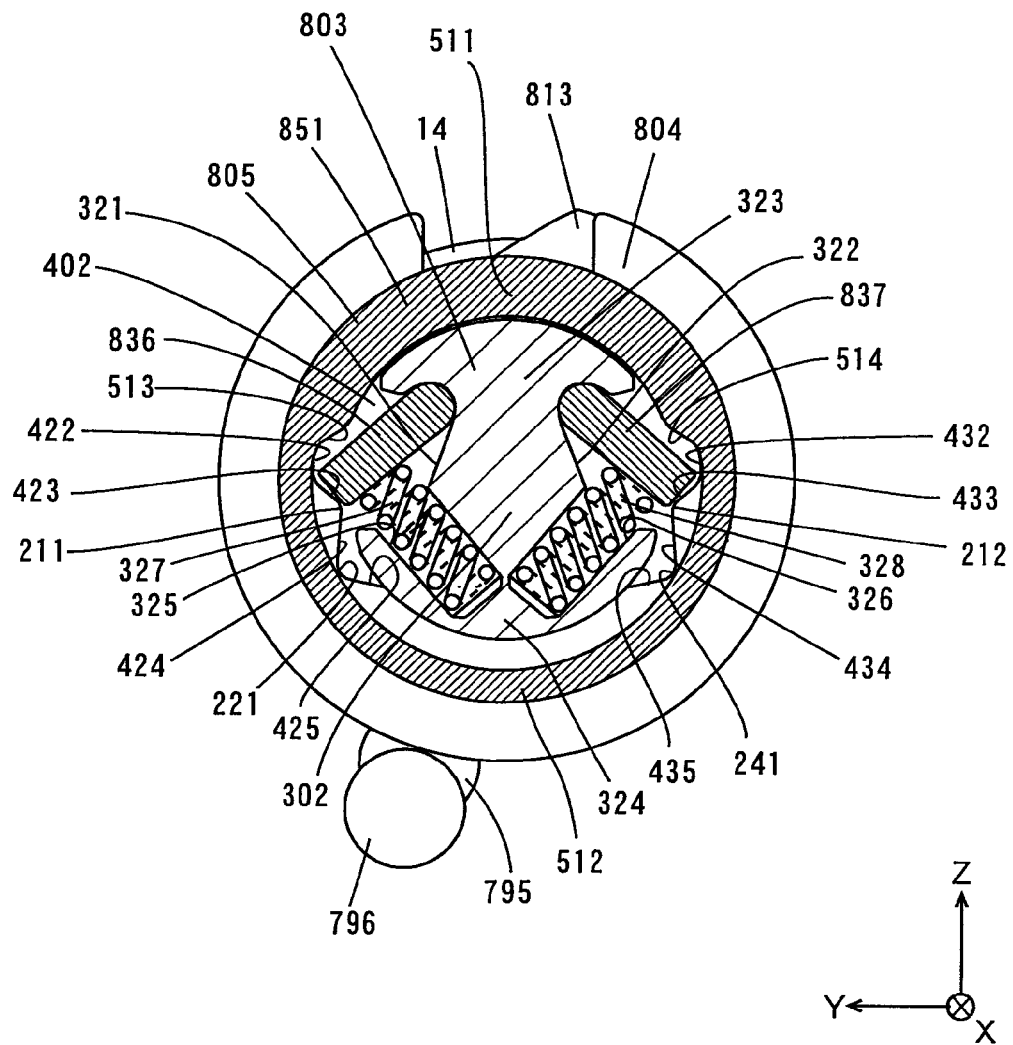
FIG. 36 is a cross-sectional view through line D-D in FIG. 31.

As shown in FIG. 32 and FIG. 36, first cylindrical section 851 has partial cylindrical section 511 and partial cylindrical section 512. Inclined surfaces 513 and 514 are formed on first cylindrical section 851 so as to connect the inner peripheral surface of partial cylindrical section 511 and the inner peripheral surface of partial cylindrical section 512.

As shown in FIG. 36, the inner peripheral surface of partial cylindrical section 511 is provided on the circumference of a predetermined circle with the axial center of second rotating member 803 as its center (hereinafter referred to as "first circle"). Also, the inner peripheral surface of partial cylindrical section 512 is provided on the circumference of a predetermined circle with the axial center of second rotating member 803 as its center and of greater diameter than the first circle (hereinafter referred to as "second circle").

The radius of the above-described first circle is smaller than the distance between corner 211 formed by trigger surface 423 and open surface 424 and the axial center of second rotating member 803, and is also smaller than the distance between corner 212 formed by trigger surface 433 and open surface 434 and the axial center of second rotating member 803.

The radius of the above-described second circle is greater than the distance between corner 221 formed by open surface 424 and bottom surface 425 and the axial center of second rotating member 803, and is also greater than the distance between corner 241 formed by open surface 434 and bottom surface 435 and the axial center of second rotating member 803.

Also, in third rotating member 805, partial cylindrical section 511 and partial cylindrical section 512 are formed so that inclined surfaces 513 and 514 are positioned higher than trigger surfaces 423 and 433 in a standard state.

As shown in FIG. 36 and FIG. 40, concave section 321 and concave section 322 are formed in second ratchet 302 so as to curve inward. Also, first fan-shaped section 323 is formed on the upper portion of second ratchet 302, and second fan-shaped section 324 is formed on the lower portion of second ratchet 302. Second ratchet 302 is formed so as to be symmetrical with respect to a plane through the center in the YZ plane of fan-shaped section 323 including the rotation axis of second rotating member 803, and have a uniform shape in the X direction.

As shown in FIG. 36, one end of lug plate 836 is fitted into a curving corner on the upper side of concave section 321, and lug plate 836 is provided so as to be able to pivot about one end. Also, one end of lug plate 837 is fitted into a curving corner on the upper side of concave section 322, and lug plate 837 is provided so as to be able to pivot about one end. In the following description, the other end of lug plate 836 denotes the front end of lug plate 836, and the other end of lug plate 837 denotes the front end of lug plate 837.

Hole 325 is formed in second fan-shaped section 324 on the concave section 321 side. Hole 325 is formed so as to extend from the center portion of the lower portion of second fan-shaped section 324 toward the lower corner of concave section 321. Also, hole 326 is formed in second fan-shaped section 324 on the concave section 322 side. Hole 326 is formed so as to extend from the center portion of the lower portion of second fan-shaped section 324 toward the lower corner of concave section 322.

Spring 327 is provided inside hole 325. One end of spring 327 is abutted against the lower surface of lug plate 836. In this preferred embodiment, the dimensions of spring 327 are set so that, in a standard state, the front end surface of lug plate 836 faces trigger surface 423 in a state in which it is brought close thereto.

Also, spring 328 is provided inside hole 326. One end of spring 328 is abutted against the lower surface of lug plate 837. In this preferred embodiment, the dimensions of spring 328 are set so that, in a standard state, the front end surface of lug plate 837 faces trigger surface 433 in a state in which it is brought close thereto.

As shown in FIG. 35 and FIG. 40, the +X direction sides of lug plates 836 and 837 are accommodated inside second concave section 402 of regulating member 804. Also, as shown in FIG. 36 and FIG. 41, the −X direction sides of lug plates 836 and 837 are accommodated inside first cylindrical section 851 in third rotating member 805.

(5-3) Operation of Shift Mechanism

The operation of shift mechanism 701 when gear shifting is performed will now be described in detail using accompanying drawings. A case will be described below in which the shift-up button of shift switch 15 (see FIG. 2) is depressed by the rider.

FIG. 42 through FIG. 51 are drawings for explaining the operation of shift mechanism 701 when gear shifting is performed.

Figure 42:
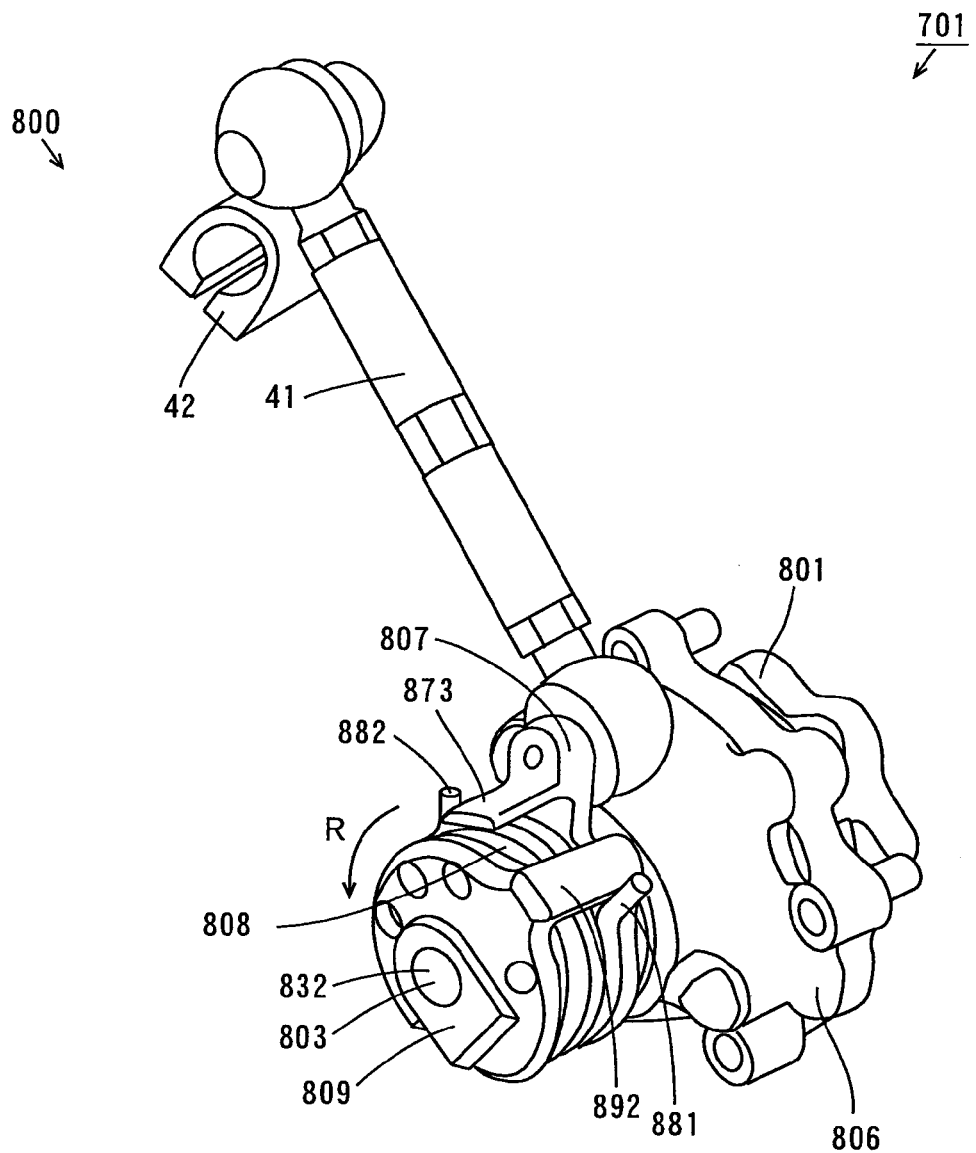
FIG. 42 is a drawing for explaining the operation of the shift mechanism.
Figure 43:
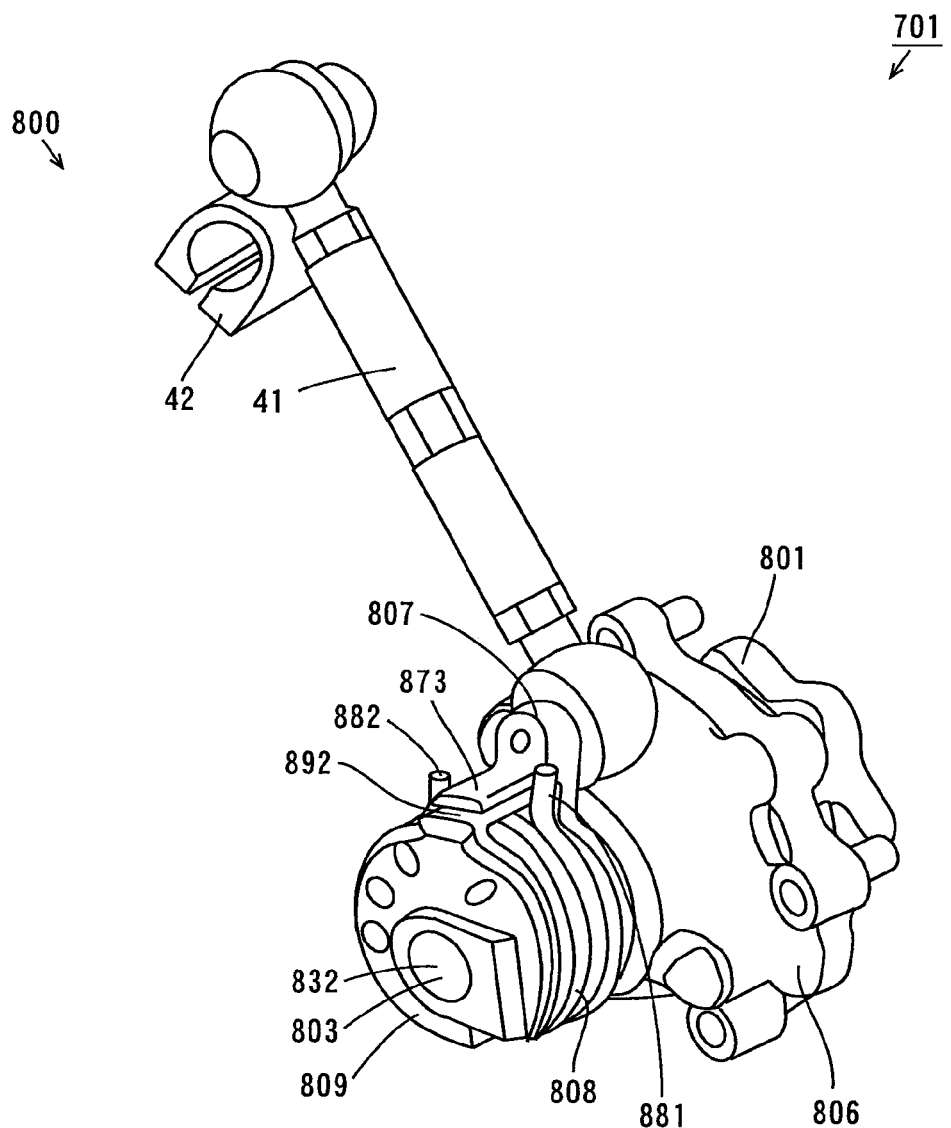
FIG. 43 is a drawing for explaining the operation of the shift mechanism.
Figure 44:
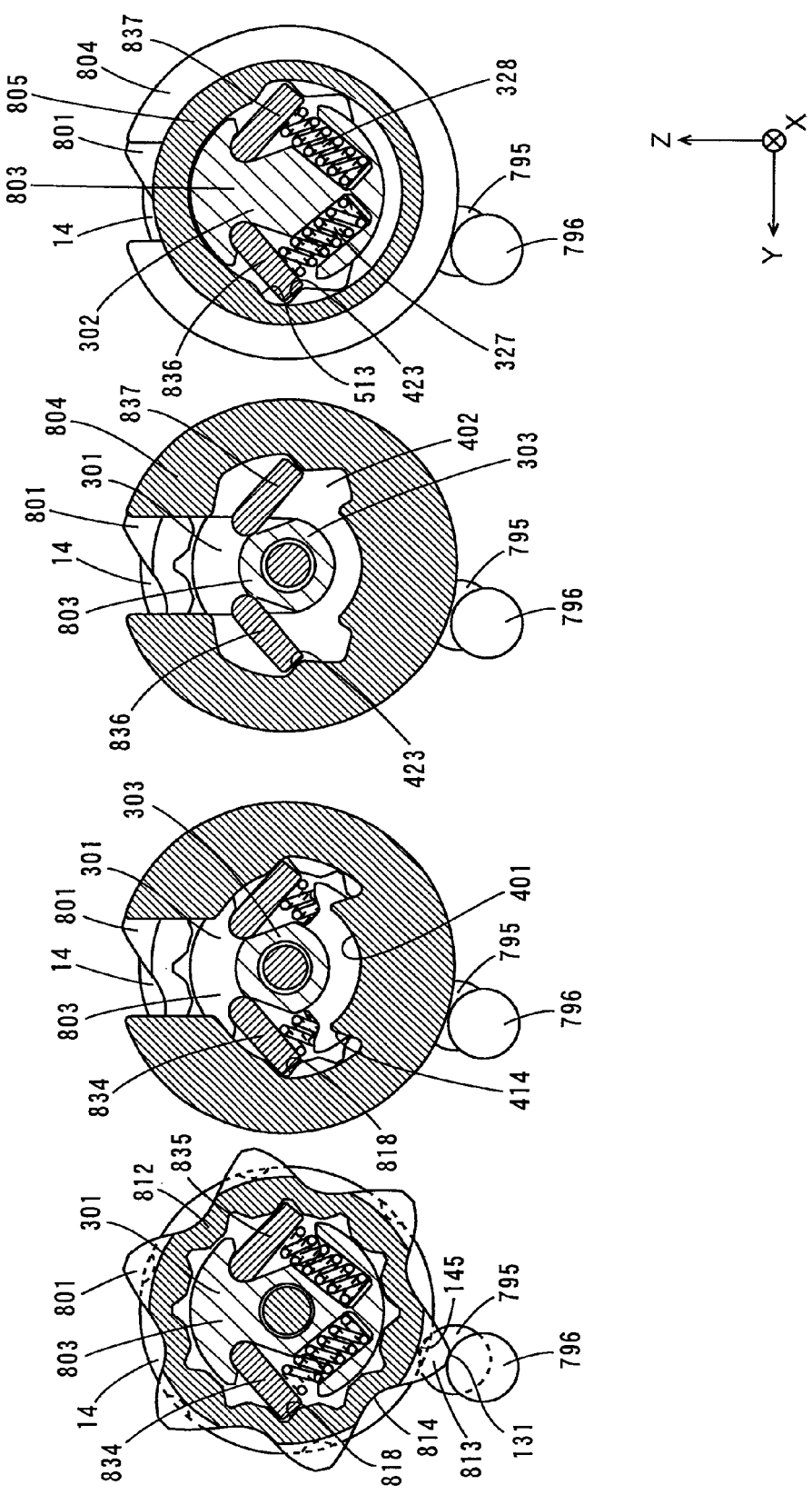
FIGS. 44A, 44B, 44C, and 44D are drawings for explaining the operation of the shift mechanism.
Figure 45:
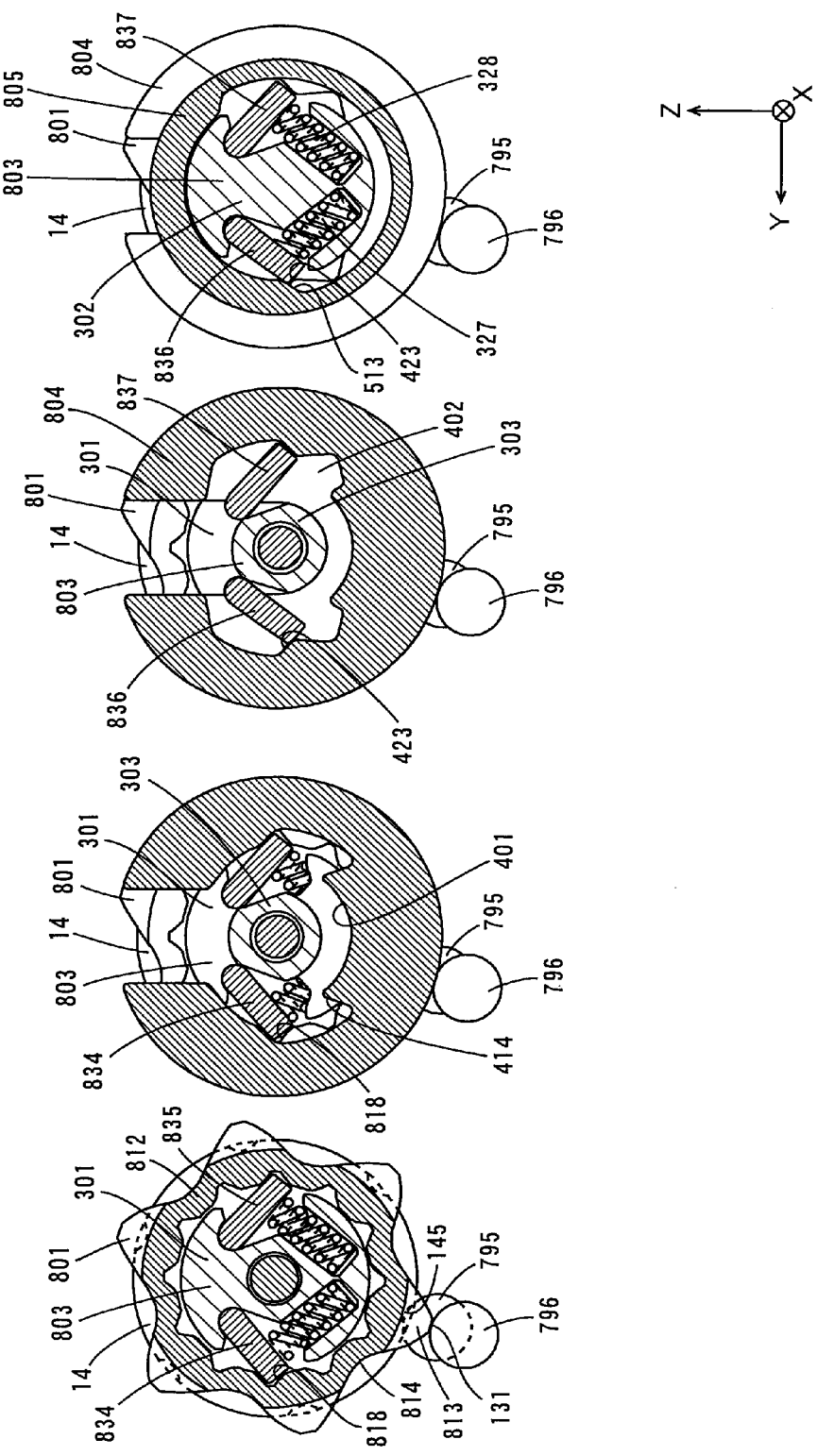
FIGS. 45A, 45B, 45C, and 45D are drawings for explaining the operation of the shift mechanism.
Figure 46:
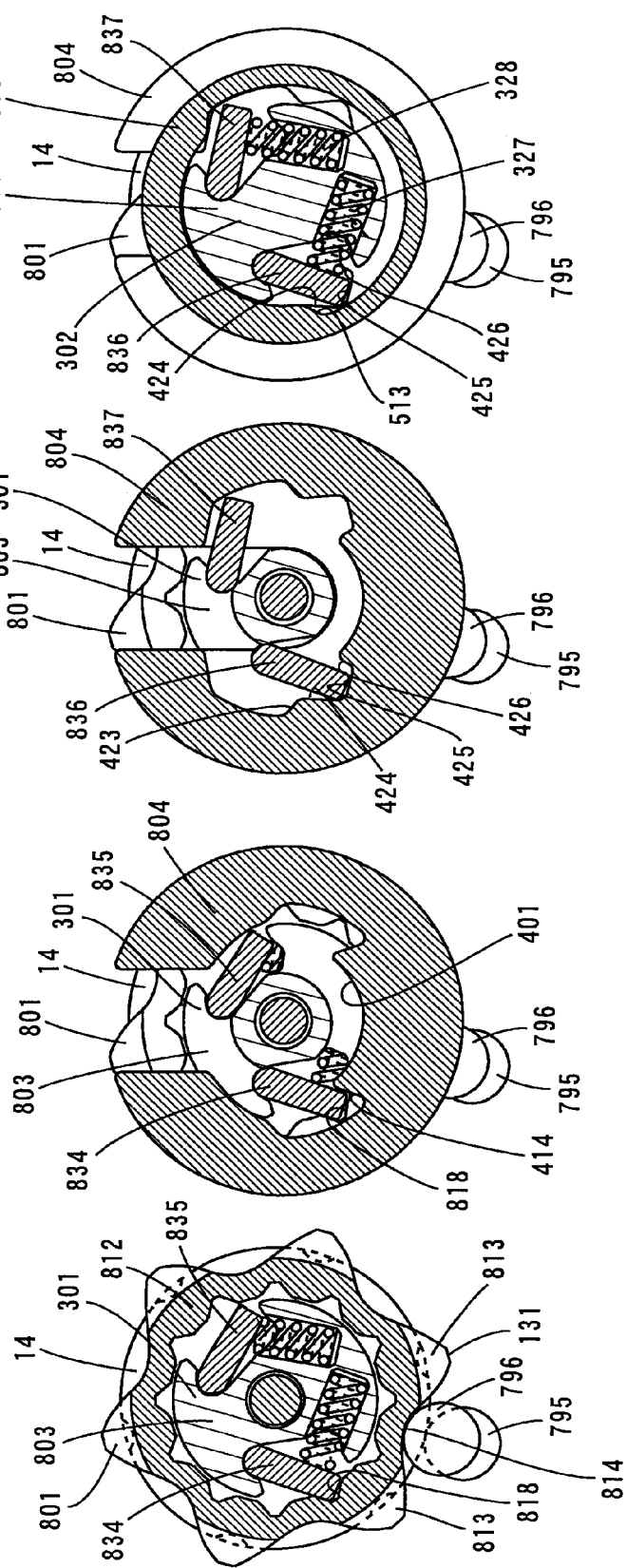
FIGS. 46A, 46B, 46C, and 46D are drawings for explaining the operation of the shift mechanism.

FIG. 42 and FIG. 43 are perspective views of shift cam drive unit 800. Drawings A through D in FIG. 44 through FIG. 51 are cross-sectional views of the portions of shift mechanism 701 indicated by line A-A, line B-B, line C-C, and line D-D in FIG. 31, respectively. For example, in FIG. 44 through FIG. 51, A is a cross-sectional view of the portion of shift mechanism 701 indicated by line A-A in FIG. 31, and B is a cross-sectional view of the portion of shift mechanism 701 indicated by line B-B in FIG. 31. Similarly, in FIG. 44 through FIG. 51, C is a cross-sectional view of the portion of shift mechanism 701 indicated by line C-C in FIG. 31, and D is a cross-sectional view of the portion of shift mechanism 701 indicated by line D-D in FIG. 31. FIG. 44A through D show cross-sections of the respective portions in a standard state (corresponding to the cross-sectional views in FIG. 33 through FIG. 36). In FIG. 31 and FIG. 44, shift cam 14 has its rotation constrained through ball 795 being biased toward shift cam 14 in groove section 145 by spring 791 via moving member 793. The torque that constrains the rotation of shift cam 14 due to ball 795 will be described in detail later herein.

When the rider depresses the shift-up button, motor 8 (see FIG. 2) is controlled by ECU 10 (see FIG. 2), and the rotating shaft (not shown) of motor 8 rotates through a predetermined angle (in this preferred embodiment, approximately 40°). As shown in FIG. 29 through FIG. 31 and FIG. 42, swing arm 42 is connected to the rotating shaft of motor 8, and through the rotation of the rotating shaft of motor 8, swing arm 42 is rotated. As a result of this structure and arrangement, as shown in FIG. 42, first transferring member 807 is rotated in the direction indicated by arrow R by first transferring member 807 or transferring mechanism 41. In the following description, rotation in the arrow R direction denotes counterclockwise rotation, and rotation in the opposite direction denotes clockwise rotation. Rotation in one of these clockwise and counterclockwise directions corresponds to rotation in the forward direction and rotation in the other direction corresponds to rotation in the reverse direction.

Through the counterclockwise rotation of first transferring member 807, second latch section 882 of torsion spring 808 is pressed in a counterclockwise direction by latch section 873. As a result, counterclockwise torque is generated in first latch section 881 of torsion spring 808.

The torque generated in torsion spring 808 is imparted to latch section 892 via first latch section 881. As a result of this structure and arrangement, counterclockwise torque is imparted to second transferring member 809. As described above, shaft section 832 of second rotating member 803 is fixed to second transferring member 809. Therefore, torque imparted to second transferring member 809 is imparted to second rotating member 803.

As shown in FIG. 44C and FIG. 44D, in a standard state, the front end surface of lug plate 836 faces trigger surface 423 of regulating member 804 in a state in which it is brought close thereto. In this case, even though second rotating member 803 rotates due to torque imparted by torsion spring 808 (see FIG. 42), the front end surface of lug plate 836 abuts trigger surface 423 immediately after the start of that rotation operation. Thus, movement of lug plate 836 is stopped, and rotation of second rotating member 803 is stopped.

Therefore, immediately after the start of a rotation operation of motor 8 (FIG. 31), third rotating member 805 alone rotates while second rotating member 803 is stopped, as shown in FIG. 44D and FIG. 45D. As a result, as shown in FIG. 42, latch section 873 and latch section 892 are distanced from each other, and counterclockwise torque is accumulated in torsion spring 808.

As shown in FIG. 45D, when third rotating member 805 rotates, inclined surface 513 of third rotating member 805 moves so as to intersect trigger surface 423 of regulating member 804. At this time, inclined surface 513 presses against lug plate 836. As a result, lug plate 836 presses against spring 327 and moves over inclined surface 513 so as to be folded in the inward direction of third rotating member 805.

When third rotating member 805 rotates through a predetermined angle (for example, approximately 32.5°) from a standard state, lug plate 836 is fully pushed out from the top of trigger surface 423. As a result of this structure and arrangement, the torque accumulated in torsion spring 808 is released. As a result, as shown in FIG. 46C and FIG. 46D, second rotating member 803 rotates counterclockwise while moving the front end surface of lug plate 836 toward bottom surface 425 along open surface 424.

As shown in FIG. 44A, in a standard state, the front end surface of lug plate 834 faces the lower inclined surface in predetermined concave surface 818 in first rotating member 801 in a state in which it is brought close to that inclined surface. Consequently, as shown in FIG. 46A and FIG. 46B, concave surface 818 is pressed by the front end surface of lug plate 834 through the counterclockwise rotation of second rotating member 803, and first rotating member 801 rotates counterclockwise.

Also, shift cam 14 rotates due to the rotation of first rotating member 801. Torque biased in a counterclockwise direction on the first rotating member and shift cam 14 from torsion spring 808 via second transferring member 809, second rotating member 803, and lug plate 834 at this time is set larger than torque whereby ball 795 constrains the rotation of shift cam 14 in the standard state.

As a result of this structure and arrangement, one of shift forks 141 through 144 (see FIG. 2) moves. As a result, as explained with reference to FIG. 15, FIG. 17, and FIG. 18, a transmission gear in the odd-numbered gear group set to a neutral position or a transmission gear of the even-numbered gear group set to a neutral position is coupled.

As shown in FIG. 46B, lug plate 834 abuts latching surface 414 when second rotating member 803 rotates counterclockwise through approximately 30°. As a result of this structure and arrangement, the rotation angle of second rotating member 803 is limited to approximately 30°. Also, as shown in FIG. 47D, lug plate 836 abuts latching surface 426 when third rotating member 805 rotates counterclockwise through approximately 45°. As a result of this structure and arrangement, the rotation angle of third rotating member 805 is limited to approximately 45°.

Thus, in this preferred embodiment, the possible rotation angle of third rotating member 805 is set larger than the possible rotation angle of second rotating member 803. In this case, the rotating shaft of motor can be rotated so that the rotation angle of third rotating member 805 becomes 30° or more, facilitating control of motor 8 (see FIG. 2) by ECU 10 (see FIG. 2). As a result of this structure and arrangement, it is possible to ensure that an inadequate rotation amount of third rotating member 805 is prevented. As a result, second rotating member 803 can be rotated dependably, and shift cam 14 can be rotated dependably.

Following this, motor 8 is again controlled by ECU 10, and the rotating shaft of motor 8 rotates through a predetermined angle (in this preferred embodiment, approximately 40°). In other words, the rotating shaft is restored to its original position. As a result of this structure and arrangement, first transferring member 807 and third rotating member 805 rotate clockwise through approximately 45°. As a result, third rotating member 805 returns to its original position (the same position as in the standard state) as shown in FIG. 48.

Also, latch section 892 of second transferring member 809 has its rotation constrained by latch section 873 of first transferring member 807 and latch sections 881 and 882 of torsion spring 808, and rotates clockwise together with first transferring member 807. Torque that constrains the relative rotation of latch section 892 and latch section 873 by torsion spring 808 at this time is set larger than torque regulating the relative rotation of second rotating member 803 and first rotating member 801 through lug plate 834 pressing against inner peripheral surface 817 due to the extension of spring 317 when second rotating member 803 moves from the position in FIG. 47 to the position in FIG. 48. As a result, second rotating member 803 returns to its original position (the same position as in the standard state) together with third rotating member 805.

Figure 47:
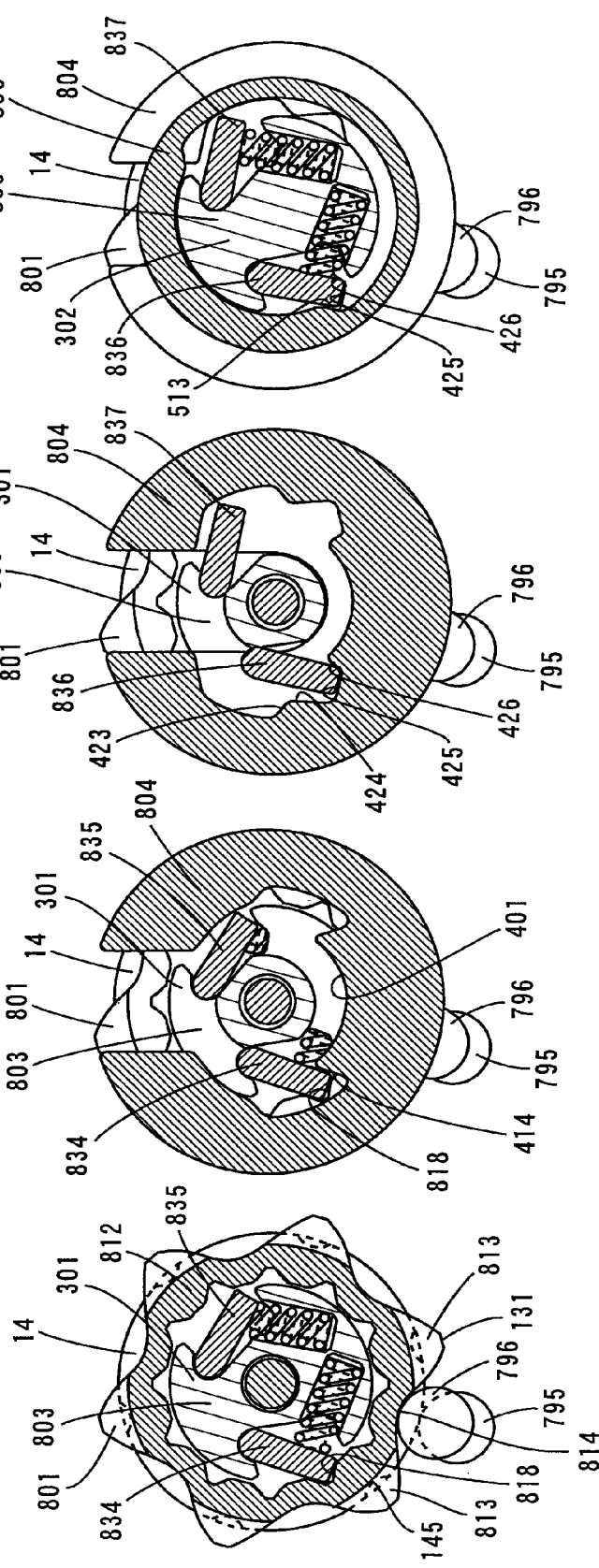
FIGS. 47A, 47B, 47C, and 47D are drawings for explaining the operation of the shift mechanism.
Figure 48:
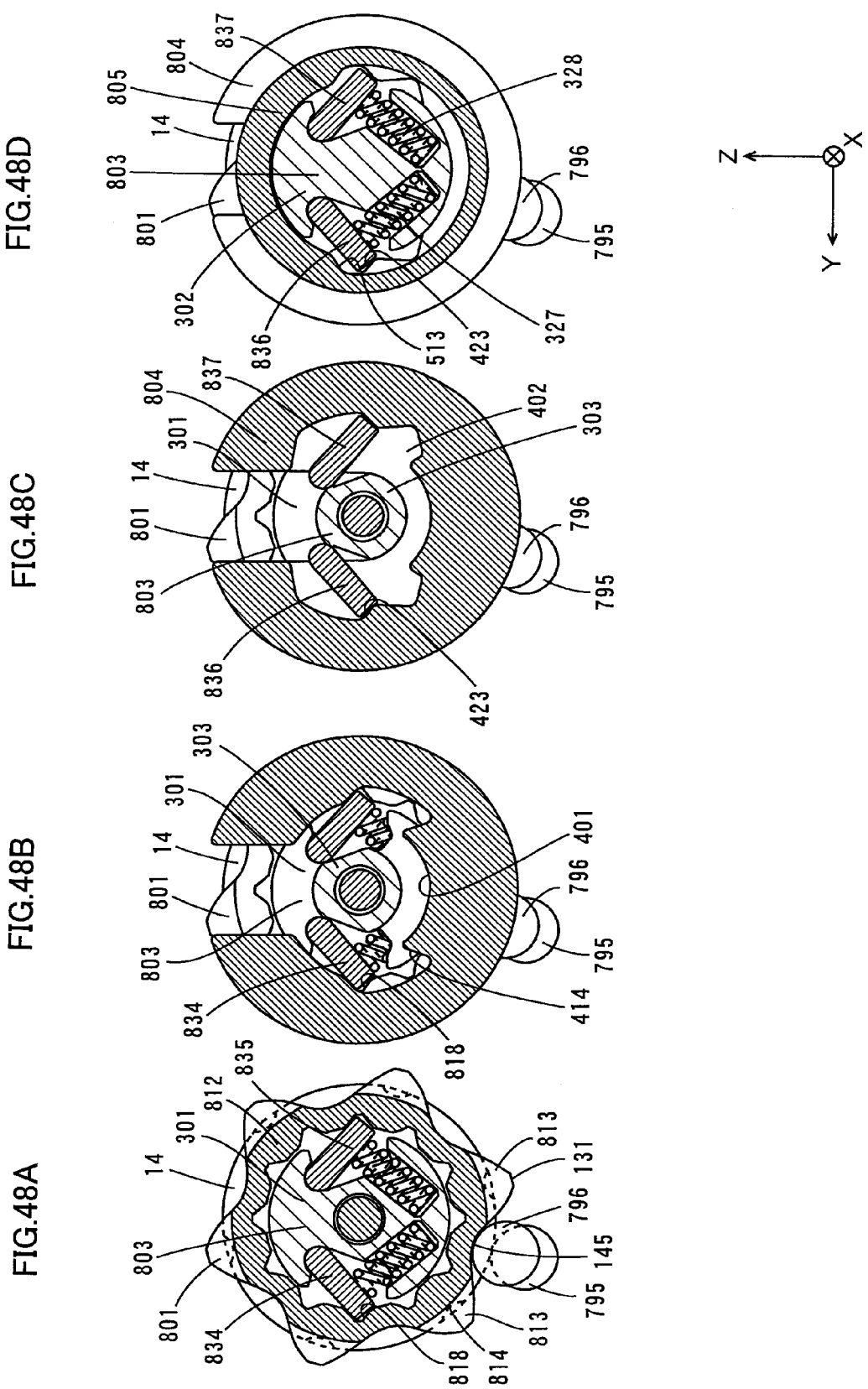
FIGS. 48A, 48B, 48C, and 48D are drawings for explaining the operation of the shift mechanism.
Figure 49:
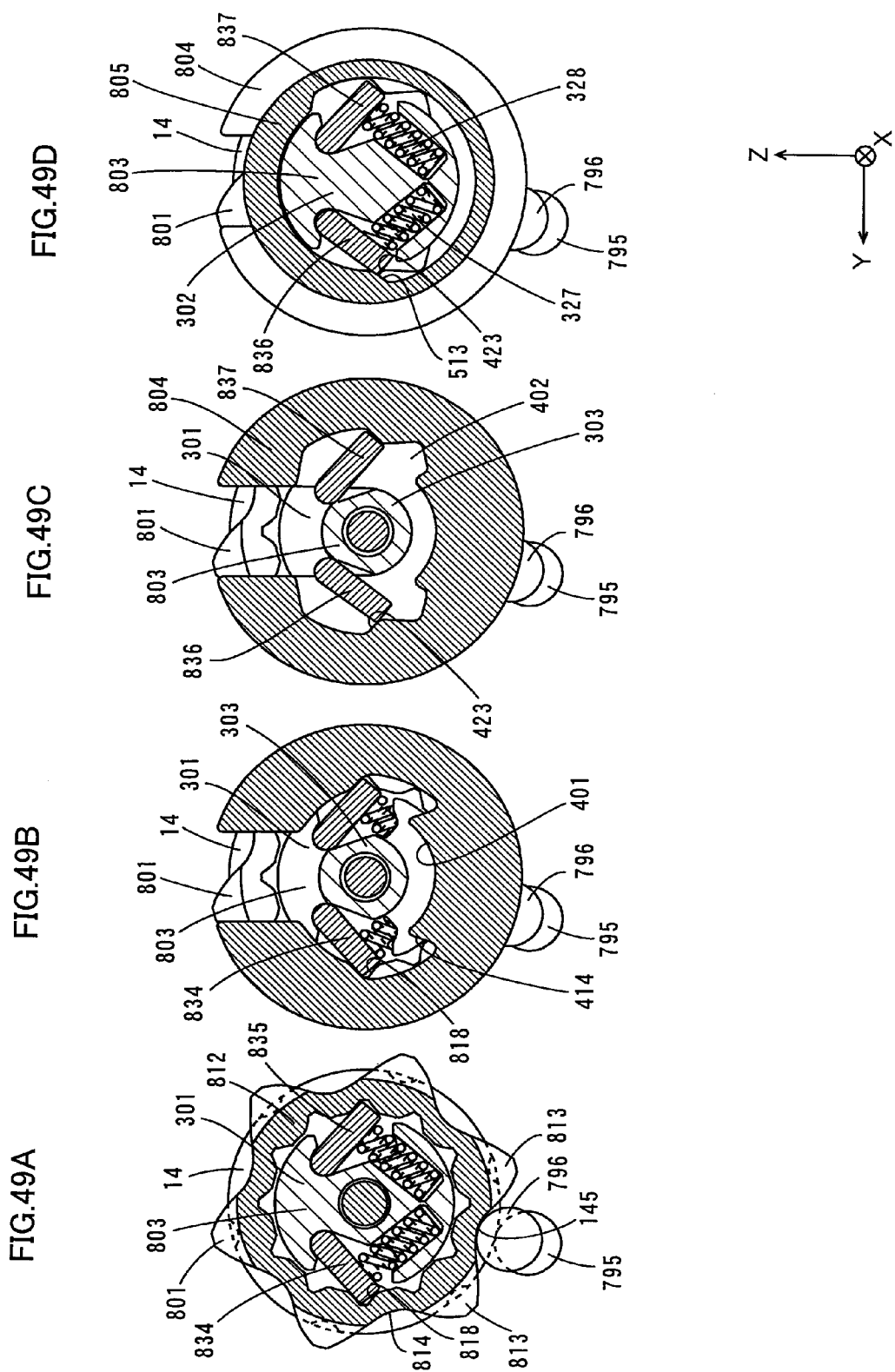
FIGS. 49A, 49B, 49C, and 49D are drawings for explaining the operation of the shift mechanism.
Figure 50:
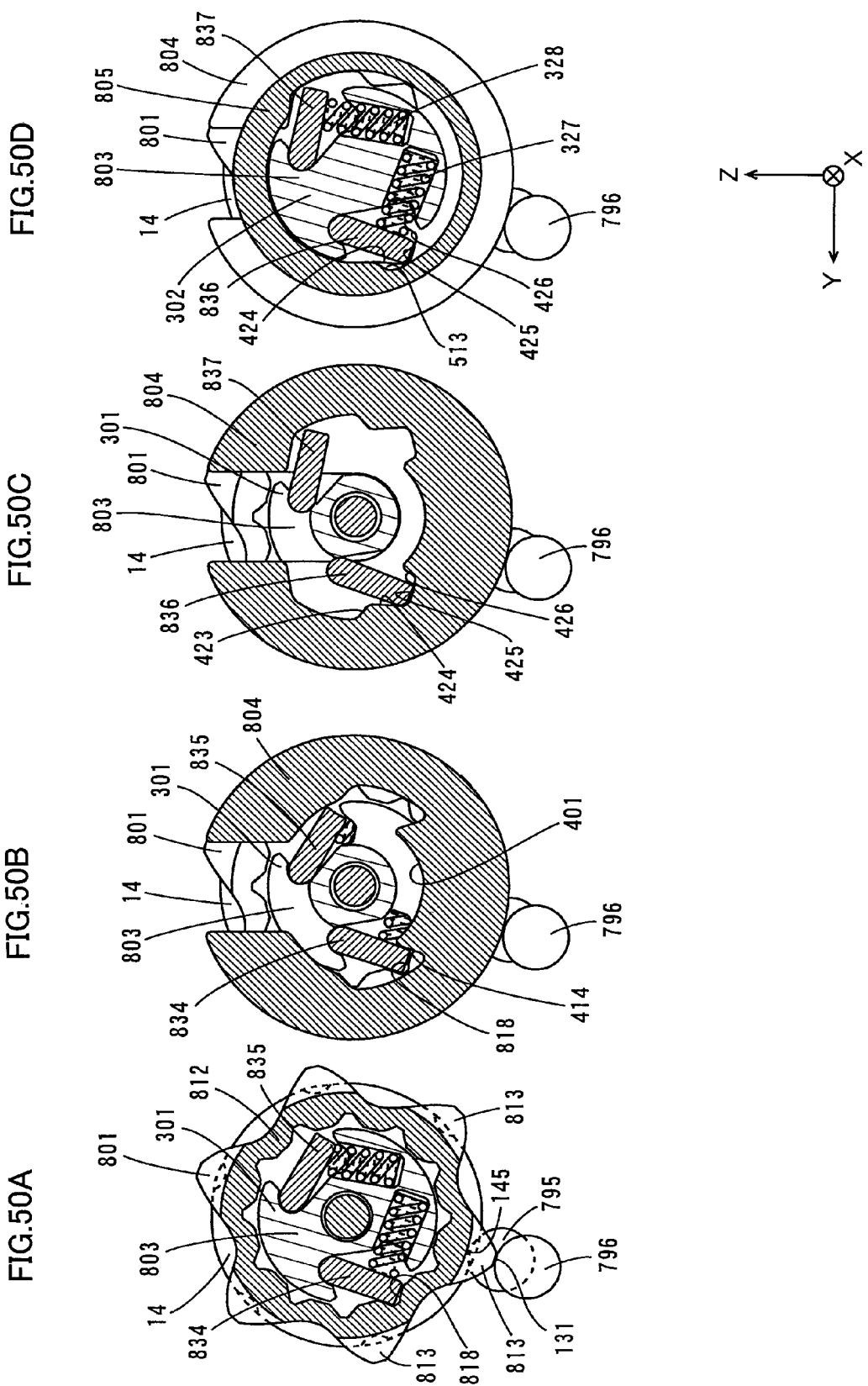
FIGS. 50A, 50B, 50C, and 50D are drawings for explaining the operation of the shift mechanism.
Figure 51:
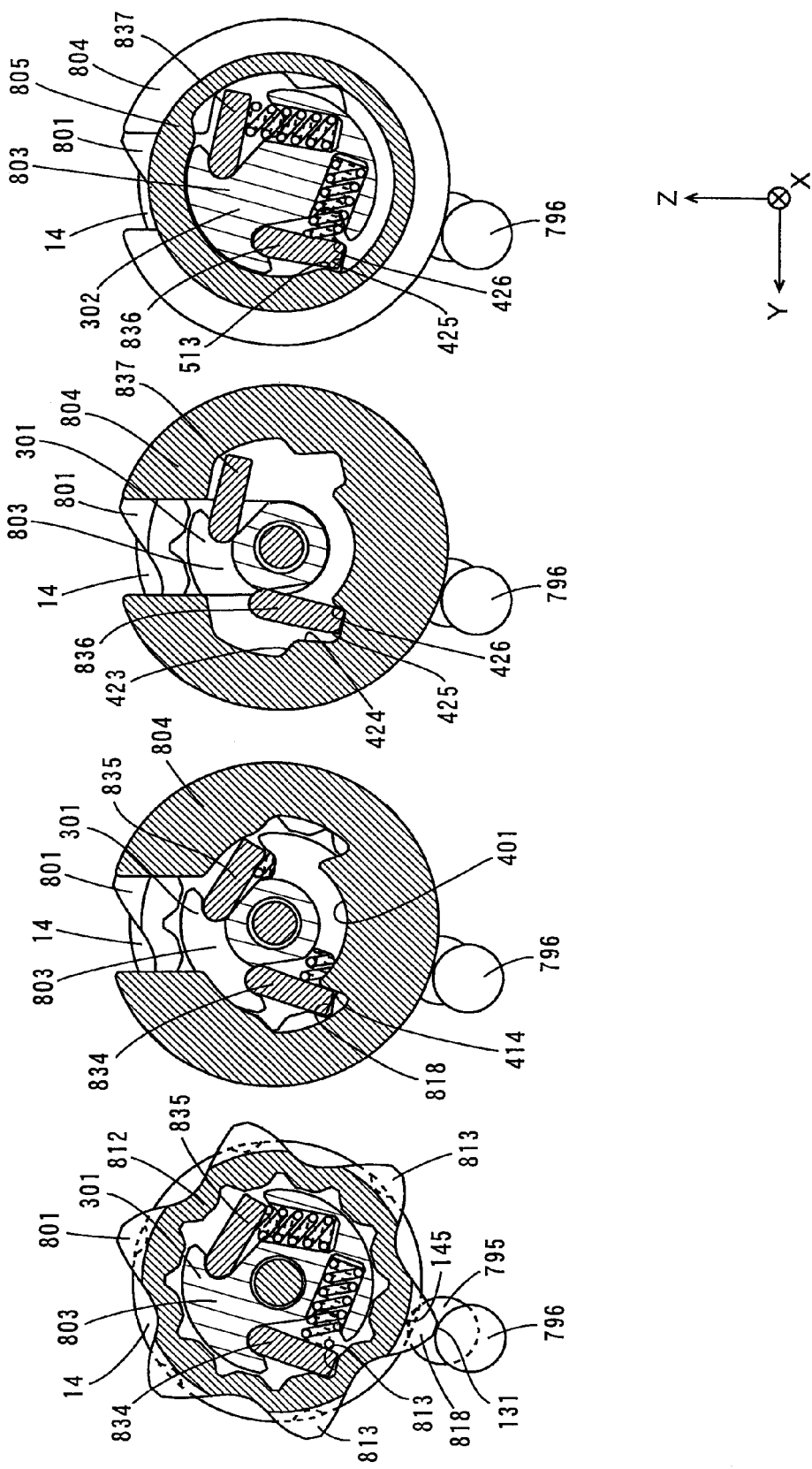
FIGS. 51A, 51B, 51C, and 51D are drawings for explaining the operation of the shift mechanism.

When second rotating member 803 moves from the position in FIG. 47 to the position in FIG. 48, first rotating member 801 has its rotation constrained by ball 796 being biased toward first rotating member 801 by spring 792 via moving member 794 in concave section 814 of the outer peripheral surface of first rotating member 801. Torque that constrains the rotation of first rotating member 801 by ball 796 at this time is set larger than torque regulating the relative rotation of second rotating member 803 and the first rotating member through lug plate 834 pressing against inner peripheral surface 817 due to the extension of spring 317. The torque whereby ball 796 constrains the rotation of first rotating member 801 will be described in detail later herein.

As a result of this structure and arrangement, when second rotating member 803 moves from the position in FIG. 47 to the position in FIG. 48, lug plate 834 moves along inner peripheral surface 817 while extending spring 317. Therefore, when second rotating member 803 moves from the position in FIG. 47 to the position in FIG. 48, rotation of first rotating member 801 via lug plate 834 is stopped.

Also, when second rotating member 803 moves from the position in FIG. 47 to the position in FIG. 48, the front end of lug plate 835 moves along guiding surface 415 and auxiliary surface 416. Here, guiding surface 415 is provided farther inward than inner peripheral surface 817 of cylindrical section 812 in the YZ plane. Also, auxiliary surface 416 is formed so as to be approximately coplanar with the upper inclined surface of concave surface 818. Therefore, when second rotating member 803 moves from the position in FIG. 47 to the position in FIG. 48, rotation of first rotating member 801 via lug plate 835 is stopped.

As a result of the above, as shown in FIG. 47 and FIG. 48, it is possible for second rotating member 803 alone to be rotated while first rotating member 801 and shift cam 14 are stopped.

Following this, motor 8 (see FIG. 2) is again controlled by ECU 10 (see FIG. 2), and, as shown in FIG. 48 through FIG. 51, first rotating member 801 and shift cam 14 rotate counterclockwise through approximately 30° in the same way as in FIG. 44 through FIG. 47. As a result of this structure and arrangement, one of shift forks 141 through 144 (see FIG. 2) moves. As a result, as explained with reference to FIG. 15, FIG. 20, and FIG. 21, either the odd-numbered gear group or the even-numbered gear group is set to a neutral position.

Following this, motor 8 (see FIG. 2) is again controlled by ECU 10 (see FIG. 2), and third rotating member 805 rotates clockwise through approximately 45°. As a result of this structure and arrangement, as explained with reference to FIG. 47 and FIG. 48, second rotating member 803 is returned to its position in the standard state (the state in FIG. 44) while shift cam 14 and first rotating member 801 are stopped. As a result, a gear shift in transmission mechanism 700 ends.

When transmission mechanism 700 is shifted down, second rotating member 803 is rotated in the opposite direction to the rotation direction described with reference to FIG. 44 through FIG. 51.

(5-4) Torque Imparted to Shift Cam

Torque imparted to shift cam 14 will now be described.

Figure 52:
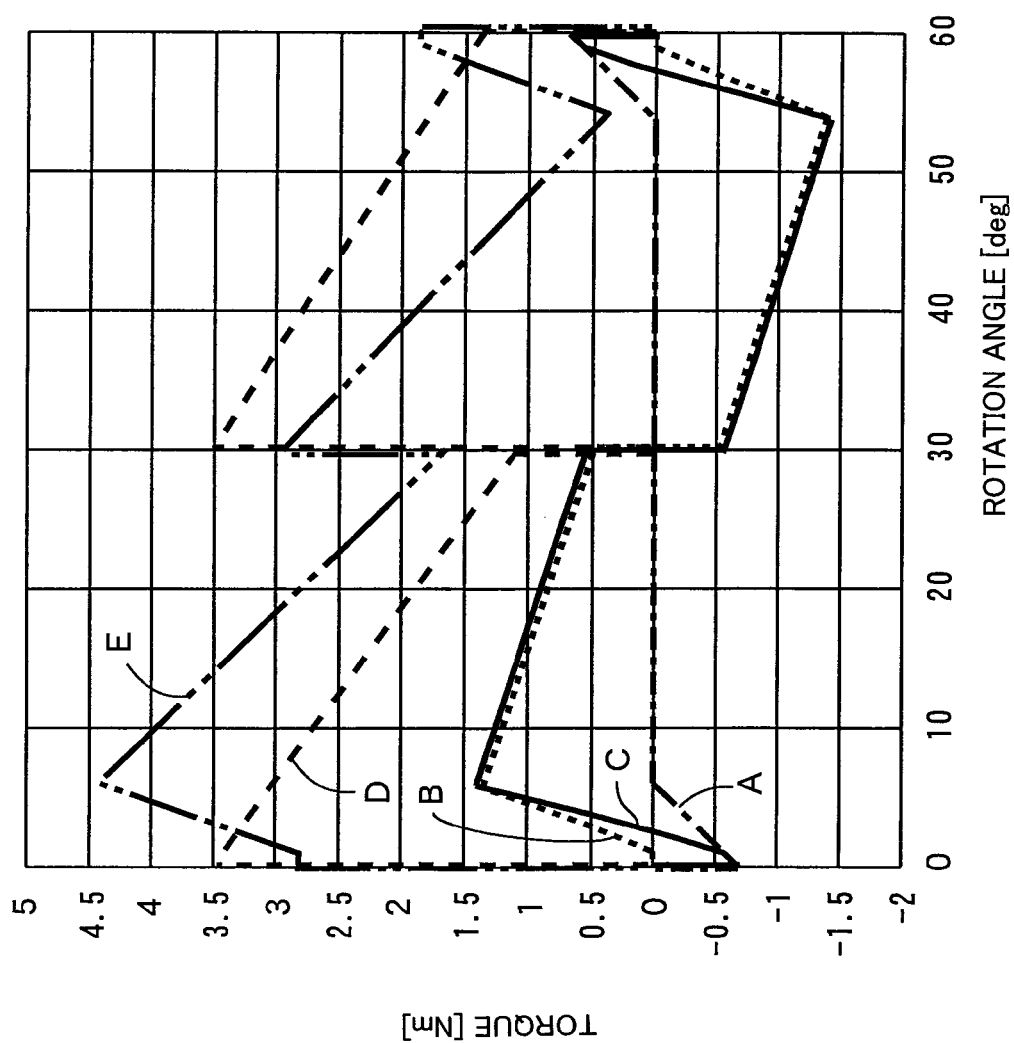
FIG. 52 is a drawing showing torque imparted to the shift cam and first rotating member.

FIG. 52 is a drawing showing torque imparted to shift cam 14 and first rotating member 801 when shift cam 14 rotates through 60° from one standard state to the next standard state.

The vertical axis in FIG. 52 indicates torque [Nm] imparted to shift cam 14 and first rotating member 801, and the horizontal axis indicates the rotation angle [deg] from a standard state of shift cam 14 and first rotating member 801. Therefore, rotation angles 0° and 60° in FIG. 52 indicate standard states of shift cam 14 and first rotating member 801. In FIG. 52, torque in a counterclockwise direction is shown as a positive value, and torque in a clockwise direction is shown as a negative value.

In FIG. 52, dash-dot line A indicates torque imparted to shift cam 14 from spring 791 (see FIG. 31) via ball 795 (see FIG. 31), and dotted line B indicates torque imparted to first rotating member 801 from spring 792 (see FIG. 31) via ball 796 (see FIG. 31). Also, in FIG. 52, solid line C indicates composite torque comprising the torque indicated by dash-dot line A and the torque indicated by dotted line B, dashed line D indicates torque imparted to shift cam 14 and first rotating member 801 from torsion spring 808, and dash-dot-dot line E indicates composite torque comprising the torque indicated by solid line C and the torque indicated by dashed line D. Therefore, the actual torque imparted to shift cam 14 is the value indicated by dash-dot-dot line E.

In the standard state shown in FIG. 33, ball 795 is stopped in the center of groove section 145. In this case, the direction of force imparted to shift cam 14 from spring 791 (see FIG. 31) via ball 795 coincides with the radial direction of shift cam 14. Consequently, torque is not imparted to shift cam 14 from ball 795.

Also, in the standard state, ball 796 is positioned on chamfering surface 131 of projecting section 813. In this case, the direction of force imparted to first rotating member 801 from spring 792 (see FIG. 31) via ball 796 coincides with the radial direction of first rotating member 801. Consequently, torque is not imparted to first rotating member 801 from ball 796.

(a) Torque imparted to shift cam 14 from spring 791

First, torque imparted to shift cam 14 from spring 791 will be described.

When shift cam 14 rotates counterclockwise from a standard state, ball 795 is pushed out from groove section 145. At this time, the point of contact between ball 795 and shift cam 14 moves along the left corner edge of that groove section 145. At this time, a moment acts upon shift cam 14 due to normal force at the point of contact between ball 795 and shift cam 14 receiving pressure from spring 791. That is to say, negative torque is imparted to shift cam 14 from spring 791 as indicated by dash-dot line A in FIG. 52.

Negative torque imparted to shift cam 14 from spring 791 reaches a maximum immediately after the start of a shift cam 14 rotation operation. Thereafter, the negative torque imparted to shift cam 14 from spring 791 decreases as the rotation angle of shift cam 14 increases.

Ball 795 (see FIG. 33) is pushed completely out of groove section 145 when shift cam 14 has rotated through approximately 6° from the standard state (immediately before portions of a transmission gear and spline gear that fit together and are coupled through a dog mechanism come into contact). When the point of contact between ball 795 and shift cam 14 is not positioned inside groove section 145, the direction of force imparted to shift cam 14 from spring 791 via ball 795 coincides with the radial direction of shift cam 14. Consequently, torque imparted to shift cam 14 from spring 791 at this time is 0, as indicated by dash-dot line A in FIG. 52.

In this preferred embodiment, groove section 145 is formed in such a way that ball 795 is pushed completely out of groove section 145 by the rotation of shift cam 14 through approximately ±6° or more from a standard state. Therefore, as indicated by dash-dot line A in FIG. 52, when the rotation angle from a standard state (hereinafter abbreviated simply to "rotation angle") of shift cam 14 is within a range of approximately 6° to approximately 54°, torque imparted to shift cam 14 from spring 791 is 0.

As shown in FIG. 50A, when the rotation angle of shift cam 14 exceeds 54°, the point of contact between ball 795 and shift cam 14 moves into groove section 145 again. At this time, the point of contact between ball 795 and shift cam 14 moves along the right corner edge of groove section 145 shown in FIG. 50A. At this time, a moment acts upon shift cam 14 due to normal force at the point of contact between ball 795 and shift cam 14 receiving pressure from spring 791, that is, positive torque is imparted to shift cam 14 from spring 791 as indicated by dash-dot line A in FIG. 52.

As indicated by dash-dot line A in FIG. 52, positive torque imparted to shift cam 14 from spring 791 increases as the rotation angle of shift cam 14 increases until the rotation angle of shift cam 14 reaches 60°, that is, until ball 795 is stopped in the center of adjacent groove section 145 to groove section 145 that has been engaged earlier.

When the rotation angle of shift cam 14 reaches 60°, ball 795 comes into contact with shift cam 14 at the left and right corner edges of groove section 145. At this time, moments in both circumferential directions acting upon shift cam 14 through normal force at the left and right points of contact are in balance. That is to say, through pressure from spring 791, shift cam 14 is held in a stable state in which there is holding torque in both directions.

(b) Torque imparted to first rotating member 801 from spring 792. Next, torque imparted to first rotating member 801 from spring 792 (FIG. 31) will be described.

Immediately after first rotating member 801 starts counter-clockwise rotation, the point of contact between ball 796 and first rotating member 801 is positioned on chamfering surface 131 (see FIG. 33). In this case, the direction of force imparted to first rotating member 801 from spring 792 via ball 796 coincides with the radial direction of first rotating member 801. Consequently, torque is not imparted to first rotating member 801 from spring 792. That is to say, torque imparted to 801 from spring 792 is maintained at 0 as indicated by dotted line B in FIG. 52.

In FIG. 33, the point of contact between ball 796 and first rotating member 801 moves along the left corner edge of projecting section 813 from chamfering surface 131 due to further rotation of first rotating member 801 in a counter-clockwise direction. At this time, a moment acts upon first rotating member 801 due to normal force at the point of contact between ball 796 and first rotating member 801 receiving pressure from spring 792. That is to say, positive torque is imparted to first rotating member 801 from spring 792 as indicated by dotted line B in FIG. 52.

The positive torque imparted to first rotating member 801 from spring 792 indicated by dotted line B reaches a maximum when first rotating member 801 has rotated through approximately 6° from the standard state (immediately before portions of a transmission gear and spline gear that fit together and are coupled through a dog mechanism come into contact), and gradually decreases thereafter. The variability characteristic of torque imparted to first rotating member 801 from spring 792 and the rotation angle of first rotating member 801 at which the torque reaches a maximum are decided by the shape of projecting section 813.

As shown in FIG. 46A, when first rotating member 801 rotates through approximately 30° from a standard state, ball 796 and first rotating member 801 come into contact with both sides of an undulating inclined surface reaching projecting sections 813 on the left and right of concave section 814 sandwiching the center of that concave section 814. At this time, moments in both directions acting upon first rotating member 801 through normal force at the left and right points of contact are in balance. Consequently, through pressure from spring 792, first rotating member 801 is held in a stable state in which there is holding torque in both directions circumferentially, as indicated by dotted line B in FIG. 52.

Through further counterclockwise rotation of first rotating member 801 from the position shown in FIG. 46A, the point of contact between ball 796 and first rotating member 801 moves to an undulating surface on the left side of concave section 814 shown by FIG. 46A. At this time, a moment acts upon first rotating member 801 due to normal force at the point of contact between ball 796 and first rotating member 801 receiving pressure from spring 792. That is to say, negative torque is imparted to first rotating member 801 from spring 792 as indicated by dotted line B in FIG. 52.

When first rotating member 801 has rotated through approximately 54° from the standard state, the negative torque imparted to first rotating member 801 from spring 792 indicated by dotted line B reaches a negative maximum. Thereafter, the torque imparted to first rotating member 801 from spring 792 becomes 0 when the point of contact between ball 796 and first rotating member 801 moves to a position on chamfering surface 131 (see FIG. 50A).

(c) Composite torque of torque imparted from spring 791 and torque imparted from spring 792

As indicated by dotted line C in FIG. 52, composite torque of torque imparted to shift cam 14 from spring 791 and torque imparted to first rotating member 801 from spring 792 is a negative value in the rotation angle range for shift cam 14 from 0° to approximately 2.5°, a positive value in the rotation angle range for shift cam 14 from approximately 2.5° to 30°, a negative value in the rotation angle range for shift cam 14 from 30° to approximately 57.5°, and a negative value in the rotation angle range for shift cam 14 from approximately 57.5° to 60°. Also, at the phases at which the rotation angle of shift cam 14 is 0°, 30°, and 60°, shift cam 14 is held in a stable state in which there is holding torque in both rotation directions. As a result of this structure and arrangement, it is possible to stabilize gears in the transmission. As a result, a vehicle is able to drive smoothly.

(d) Torque imparted to first rotating member 801 and shift cam 14 from torsion spring 808

As explained with reference to FIG. 44 through FIG. 51, in this preferred embodiment torque accumulated in torsion spring 808 is imparted to first rotating member 801 and shift cam 14 each time third rotating member 805 rotates through approximately 30° from a standard state. As a result of this structure and arrangement, first rotating member 801 and shift cam 14 rotate through 30°.

Therefore, as indicated by dashed line D in FIG. 52, torque imparted to first rotating member 801 and shift cam 14 from torsion spring 808 reaches a maximum at first rotating member 801 and the rotation angle of shift cam is 0° and 30°.

(e) Torque imparted from spring 791, spring 792, and torsion spring 808 In shift mechanism 701 according to this preferred embodiment, torque combining torque imparted to shift cam 14 from springs 791 and 792 (solid line C in FIG. 52) and torque imparted to shift cam 14 from torsion spring 808 (dashed line D in FIG. 52) is imparted to shift cam 14. That is to say, the value indicated by dash-dot-dot line E in FIG. 52 is imparted to shift cam 14.

As explained above, composite torque of torque imparted to shift cam 14 from spring 791 and torque imparted to first rotating member 801 from spring 792 (the solid line C value) in FIG. 52 has mostly a positive value in the rotation angle range for shift cam 14 from 0° to 30°, and mostly a negative value in the rotation angle range for shift cam 14 from 30° to 60°. Therefore, as indicated by dash-dot-dot line E, torque imparted to shift cam 14 in the rotation angle range for shift cam 14 from 0° to 30° is greater than torque imparted to shift cam 14 in the rotation angle range for shift cam 14 from 30° to 60°.

Also, torque imparted to shift cam 14 reaches a maximum when the rotation angle of shift cam 14 is approximately 6° (immediately before portions of a transmission gear and spline gear that fit together and are coupled through a dog mechanism come into contact).

(6) Effects of Shift Mechanism

In this preferred embodiment, large torque is temporarily accumulated in torsion spring 808, and shift cam 14 is rotated by releasing that accumulated torque. Therefore, large torque can be imparted to shift cam 14 at the start of rotation of shift cam 14. As a result, a spline gear can be moved at high speed, enabling a spline gear and transmission gear to be coupled and separated dependably as soon as the transmission operation has started.

Also, torque imparted to shift cam 14 in the rotation angle range for shift cam 14 from 0° to 30° is greater than torque imparted to shift cam 14 in the rotation angle range for shift cam 14 from 30° to 60°. In this case, a spline gear can be moved at higher speed when shift cam 14 is rotated through 30° from a standard state. Therefore, a spline gear and transmission gear can be coupled dependably even in the event of a large difference between the rotation speed of the spline gear and the rotation speed of the transmission gear.

Furthermore, torque imparted to shift cam 14 reaches a maximum immediately before portions of a transmission gear and spline gear that fit together and are coupled through a dog mechanism come into contact (in this preferred embodiment, when the rotation angle of shift cam 14 is approximately 6°). In this case, a spline gear can be moved at high speed when a spline gear and transmission gear come into contact. As a result, a spline gear and transmission gear can be coupled dependably.

It is desirable for the rotation angle of shift cam 14 at which torque imparted to shift cam 14 reaches a maximum to be set appropriately according to the rotation angle of shift cam 14 when fitting and coupling sections of a spline gear and transmission gear come into contact. For example, if contact between a spline gear and transmission gear is started by a dog mechanism when shift cam 14 has rotated through approximately 8°, maximum torque may be imparted to shift cam 14 when the rotation angle of shift cam 14 reaches 8° (the angle immediately before the transmission gear and transmission gear are brought into contact by the dog mechanism).

Also, it is desirable for the magnitude of torque imparted to shift cam 14 to be set appropriately according to the configuration of shift mechanism 701 and the like. The magnitude of torque imparted to shift cam 14 can be changed by changing the spring constants and/or attachment loads of spring 791, spring 792, and torsion spring 808 as appropriate.

Furthermore, when shift cam 14 is stopped between a standard state (see FIG. 15) and other standard states, that is, when the rotation angle of shift cam 14 is stopped at 30°-interval phases of 0°, 30°, 60°, . . . , shift cam 14 has its rotation constrained by the pressure of spring 791 and spring 792, and is held in a stable state.

In this preferred embodiment, spring 791, spring 792, and torsion spring 808 are provided so that torque in the opposite direction to the rotation direction of shift cam 14 in composite torque is not imparted to shift cam 14 when shift cam 14 is rotated.

(7) Other Preferred Embodiments

In the above preferred embodiments, a case has been described in which a preferred embodiment of the present invention is applied to a motorcycle as an example of a vehicle, but the present invention may also be similarly applied to other vehicles, such as a 3-wheeled motor vehicle or a 4-wheeled motor vehicle.

In the above preferred embodiments, transmission 7 has been described that enables the gear ratio to be changed in six steps (first gear through sixth gear), but the gear rations of transmission 7 may also be set to five steps or less, or to seven steps or more. The number of gears provided on first main shaft 71, second main shaft 72, and drive shaft 73 is adjusted appropriately according to the number of gear ratio steps set in transmission 7.

In the above preferred embodiments, six groove sections 145 and six projecting sections 813 are formed at 60° intervals around the axial center of shift cam 14 and first rotating member 801, but the number of groove sections 145 and projecting sections 813 is set appropriately according to the number of gear ratio steps set in transmission 7.

In the above preferred embodiments, shift cam 14 is rotated through approximately 30° at a time by shift cam drive unit 800, but the rotation angle of shift cam 14 is set appropriately according to the number of gear ratio steps set in transmission 7.

In the above preferred embodiments, torsion spring 808 is used as a biasing member to accumulate torque, but a different elastic material such as a torsion bar, compression coil spring, air spring, or the like may also be used.

In the above preferred embodiments, coil springs 791 and 792 are used to impart torque to shift cam 14 and first rotating member 801, but a different elastic material such as a leaf spring or the like may also be used.

Also, in the above preferred embodiments, first clutch 74 and second clutch 75 are assumed to be of wet multi-plate friction transmission type, but they may be of single plate, multi-plate, wet, or dry type, and may also be centrifugal clutches or the like.

A shift mechanism according to a preferred embodiment of the present invention can be made sufficiently small and can easily be mounted on a motorcycle without biasing the lateral weight balance, and is suitable for use as a transmission employed in a drive unit mounted on a motorcycle. Reference Signs List While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A shift mechanism that moves shift forks connected to a gear of a transmission and changes a gear position of the transmission, the shift mechanism comprising:
 a shift cam that has, on an outer periphery, cam grooves to which the shift forks are connected, and rotates at a predetermined rotation angle and moves the shift forks at a certain rotation angle;
 a cam phase holding section that holds the shift cam at phases determined per the certain rotation angle;

a rotating section that is provided so as to be able to rotate in forward and reverse directions from a reference rotation position, and rotates and moves the shift cam through the certain rotation angle;

a transferring section that rotates by section of motor rotation, rotates in one of the forward and reverse directions from the reference rotation position, and, by transferring that rotation to the rotating section, rotates the rotating section;

a regulating section that, while the transferring section is rotating in one direction in response to the motor rotation, regulates the rotation of the rotating section until the transferring section has reached a predetermined rotation angle, and allows the rotation of the rotating section at or above the certain rotation angle;

a bias accumulating section that comprises a biasing member that increases bias following an increase in a rotation angle of the transferring section in the one direction; and an accumulated torque releasing section that, when the rotation angle of the transferring section reaches the predetermined rotation angle, releases the bias accumulated in the bias accumulating section and transfers torque to the transferring section, wherein the rotating section makes the shift cam held by the cam phase holding section rotate by the rotation caused by the accumulated torque releasing section.

2. The shift mechanism according to claim 1, wherein:

every time a transmission gear of the transmission is shifted one gear, the shift cam consecutively rotates twice in a first direction, in accordance with the rotating section;

the cam phase holding section applies rotation torque of the first direction, to the shift cam that is rotating; and when the shift cam consecutively rotates twice in the first direction, torque that is supplied from the torque supply section to the shift cam in a first rotation is greater than the rotation torque supplied from the torque supply section to the shift cam in a second rotation.

3. The shift mechanism according to claim 1, further comprising a torque transferring section that transfers torque from the rotating section to the shift cam, wherein:

after the transferring section rotates through a predetermined rotation angle or more in one of forward and reverse directions from the reference rotation position, the transferring section rotates in the other one of the forward and reverse directions and returns to the reference rotation position;

after the rotating section rotates in one of the forward and reverse directions from the reference rotation position in accordance with the transferring section, the rotating section rotates in the other one of the forward and reverse direction and returns to the reference rotation position; and the torque transferring section transfers torque from the rotating section to the shift cam when the rotating section rotates from the reference rotation position in accordance with the transferring section, and does not transfer torque from the rotating section to the shift cam when the rotating section rotates and returns to the reference rotation position.

4. The shift mechanism according to claim 1, wherein:

the transmission comprises:

a first clutch that inputs rotation power transferred from a crankshaft to a first main shaft and outputs the rotation power to a driving wheel via an odd-numbered transmission gear mechanism set as odd-numbered transmission gears;

a second clutch that inputs the rotation power transferred from the crankshaft to a second main shaft and outputs the rotation power to the driving wheel via an even-numbered transmission gear mechanism set as even-numbered transmission gears;

the first and second main shafts are provided in a mutually rotatable fashion on an axis parallel to the crankshaft; and a part in the second main shaft where drive to be output to the driving wheel via the even-numbered transmission gear mechanism has substantially a same outer diameter as a part in the first main shaft where drive to be output to the driving wheel via the odd-numbered transmission gear mechanism, and is located not to coaxially overlap the part in the first main shaft; and the shift cam changes the gear positions of the odd-numbered transmission gear mechanism and the even-numbered transmission gear mechanism alternately, via the shift forks, per the certain rotation angle.

5. A vehicle comprising:

an engine;

a driving wheel; and a transmission that transmits torque produced in the engine to the driving wheel at a plurality transmission gear ratio, wherein the transmission comprises the shift mechanism comprising:

a shift cam that has, on an outer periphery, cam grooves to which the shift forks are connected, and rotates at a predetermined rotation angle and moves the shift forks at a certain rotation angle;

a cam phase holding section that holds the shift cam at phases determined per the certain rotation angle;

a rotating section that is provided so as to be able to rotate in forward and reverse directions from a reference rotation position, and rotates and moves the shift cam through the certain rotation angle;

a transferring section that rotates by section of motor rotation, rotates in one of the forward and reverse directions from the reference rotation position, and, by transferring that rotation to the rotating section, rotates the rotating section;

a regulating section that, while the transferring section is rotating in one direction in response to the motor rotation, regulates the rotation of the rotating section until the transferring section has reached a predetermined rotation angle, and allows the rotation of the rotating section at or above the certain rotation angle;

a bias accumulating section that comprises a biasing member that increases bias following an increase in a rotation angle of the transferring section in the one direction; and an accumulated torque releasing section that, when the rotation angle of the transferring section reaches the predetermined rotation angle, releases the bias accumulated in the bias accumulating section and transfers torque to the transferring section, wherein the rotating section makes the shift cam held by the cam phase holding section rotate by the rotation caused by the accumulated torque releasing section.

6. A shift mechanism that moves shift forks connected to a gear of a transmission and changes a gear position of the transmission, the shift mechanism comprising:

a shift cam that has, on an outer periphery, cam grooves to which the shift forks are connected, and rotates at a predetermined rotation angle and moves the shift forks at a certain rotation angle;

a cam phase holding section that holds the shift cam at phases determined per the certain rotation angle;

a rotating section that is provided so as to be able to rotate in forward and reverse directions from a reference rotation position, and rotates and moves the shift cam through the certain rotation angle;

a transferring section that rotates by section of motor rotation, rotates in one of the forward and reverse directions from the reference rotation position, and, by transferring that rotation to the rotating section, rotates the rotating section;

a regulating section that, while the transferring section is rotating in one direction in response to the motor rotation, regulates the rotation of the rotating section until the transferring section has reached a predetermined rotation angle, and allows the rotation of the rotating section at or above the certain rotation angle;

a bias accumulating section that comprises a biasing member that increases bias following an increase in a rotation angle of the transferring section in the one direction; and an accumulated torque releasing section that, when the rotation angle of the transferring section reaches the predetermined rotation angle, releases the bias accumulated in the bias accumulating section and transfers torque to the transferring section, wherein the rotating section rotates due to the released bias, thereby rotating the cam phase holding section, and the cam phase holding section rotates due to the released bias, and the shift cam rotates due to the rotation of the cam phase holding section.

7. The shift mechanism according to claim 6, wherein:

every time a transmission gear of the transmission is shifted one gear, the shift cam consecutively rotates twice in a first direction, in accordance with the rotating section;

the cam phase holding section applies rotation torque of the first direction, to the shift cam that is rotating; and when the shift cam consecutively rotates twice in the first direction, torque that is supplied from the torque supply section to the shift cam in a first rotation is greater than the rotation torque supplied from the torque supply section to the shift cam in a second rotation.

8. The shift mechanism according to claim 6, further comprising a torque transferring section that transfers torque from the rotating section to the shift cam, wherein:

after the transferring section rotates through a predetermined rotation angle or more in one of forward and reverse directions from the reference rotation position, the transferring section rotates in the other one of the forward and reverse directions and returns to the reference rotation position;

after the rotating section rotates in one of the forward and reverse directions from the reference rotation position in accordance with the transferring section, the rotating section rotates in the other one of the forward and reverse direction and returns to the reference rotation position; and the torque transferring section transfers torque from the rotating section to the shift cam when the rotating section rotates from the reference rotation position in accordance with the transferring section, and does not transfer torque from the rotating section to the shift cam when the rotating section rotates and returns to the reference rotation position.

9. The shift mechanism according to claim 6, wherein:
the transmission comprises:
a first clutch that inputs rotation power transferred from a crankshaft to a first main shaft and outputs the rotation power to a driving wheel via an odd-numbered transmission gear mechanism set as odd-numbered transmission gears;

a second clutch that inputs the rotation power transferred from the crankshaft to a second main shaft and outputs the rotation power to the driving wheel via an even-numbered transmission gear mechanism set as even-numbered transmission gears;

the first and second main shafts are provided in a mutually rotatable fashion on an axis parallel to the crankshaft; and a part in the second main shaft where drive to be output to the driving wheel via the even-numbered transmission gear mechanism has substantially a same outer diameter as a part in the first main shaft where drive to be output to the driving wheel via the odd-numbered transmission gear mechanism, and is located not to coaxially overlap the part in the first main shaft; and the shift cam changes the gear positions of the odd-numbered transmission gear mechanism and the even-numbered transmission gear mechanism alternately, via the shift forks, per the certain rotation angle.

10. A shift mechanism that moves shift forks connected to a gear of a transmission and changes a gear position of the transmission, the shift mechanism comprising:

a shift cam that has, on an outer periphery, cam grooves to which the shift forks are connected, and rotates at a predetermined rotation angle and moves the shift forks at a certain rotation angle;

a cam phase holding section that holds the shift cam at phases determined per the certain rotation angle;

a rotating section that is provided so as to be able to rotate in forward and reverse directions from a reference rotation position, and rotates and moves the shift cam through the certain rotation angle;

a transferring section that rotates by section of motor rotation, rotates in one of the forward and reverse directions from the reference rotation position, and, by transferring that rotation to the rotating section, rotates the rotating section;

a regulating section that, while the transferring section is rotating in one direction in response to the motor rotation, regulates the rotation of the rotating section until the transferring section has reached a predetermined rotation angle, and allows the rotation of the rotating section at or above the certain rotation angle;

a bias accumulating section that comprises a biasing member that increases bias following an increase in a rotation angle of the transferring section in the one direction; and an accumulated torque releasing section that, when the rotation angle of the transferring section reaches the predetermined rotation angle, releases the bias accumulated in the bias accumulating section and transfers torque to the transferring section, wherein the rotating section and the regulating section form a first ratchet mechanism and a second ratchet mechanism, wherein the second ratchet mechanism regulates the rotation of the rotating section until the predetermined rotation angle is reached, and allows the rotation of the rotating section at or above the predetermined rotation angle.

11. The shift mechanism according to claim 10, wherein:
every time a transmission gear of the transmission is shifted one gear, the shift cam consecutively rotates twice in a first direction, in accordance with the rotating section;
the cam phase holding section applies rotation torque of the first direction, to the shift cam that is rotating; and
when the shift cam consecutively rotates twice in the first direction, torque that is supplied from the torque supply section to the shift cam in a first rotation is greater than the rotation torque supplied from the torque supply section to the shift cam in a second rotation.

12. The shift mechanism according to claim 10, further comprising a torque transferring section that transfers torque from the rotating section to the shift cam, wherein:
after the transferring section rotates through a predetermined rotation angle or more in one of forward and reverse directions from the reference rotation position, the transferring section rotates in the other one of the forward and reverse directions and returns to the reference rotation position;
after the rotating section rotates in one of the forward and reverse directions from the reference rotation position in accordance with the transferring section, the rotating section rotates in the other one of the forward and reverse direction and returns to the reference rotation position; and
the torque transferring section transfers torque from the rotating section to the shift cam when the rotating section rotates from the reference rotation position in accordance with the transferring section, and does not transfer torque from the rotating section to the shift cam when the rotating section rotates and returns to the reference rotation position.

13. The shift mechanism according to claim 10, wherein:
the transmission comprises:
a first clutch that inputs rotation power transferred from a crankshaft to a first main shaft and outputs the rotation power to a driving wheel via an odd-numbered transmission gear mechanism set as odd-numbered transmission gears;
a second clutch that inputs the rotation power transferred from the crankshaft to a second main shaft and outputs the rotation power to the driving wheel via an even-numbered transmission gear mechanism set as even-numbered transmission gears;
the first and second main shafts are provided in a mutually rotatable fashion on an axis parallel to the crankshaft; and
a part in the second main shaft where drive to be output to the driving wheel via the even-numbered transmission gear mechanism has substantially a same outer diameter as a part in the first main shaft where drive to be output to the driving wheel via the odd-numbered transmission gear mechanism, and is located not to coaxially overlap the part in the first main shaft; and
the shift cam changes the gear positions of the odd-numbered transmission gear mechanism and the even-numbered transmission gear mechanism alternately, via the shift forks, per the certain rotation angle.

* * * * *